(12) United States Patent
Bong et al.

(10) Patent No.: US 6,297,472 B1
(45) Date of Patent: Oct. 2, 2001

(54) WELDING SYSTEM AND METHOD

(75) Inventors: William L. Bong, Walnut Creek; Charles A. Bock, Suisun; Michael D. Glenn-Lewis, Davis, all of CA (US)

(73) Assignee: Aromatic Integrated Systems, Inc., Vallejo, CA (US)

( * ) Notice: Subject to any disclaimer, the term of this patent is extended or adjusted under 35 U.S.C. 154(b) by 0 days.

(21) Appl. No.: 09/058,741

(22) Filed: Apr. 10, 1998

(51) Int. Cl.$^7$ ................................... B23K 9/12
(52) U.S. Cl. ........................................ 219/125.12
(58) Field of Search .................... 219/73, 125.1, 219/125.11, 125.12, 126, 136, 137.61, 146.41, 160, 73.1, 73.2

(56) References Cited

U.S. PATENT DOCUMENTS

| | | | |
|---|---|---|---|
| 2,818,494 | * 12/1957 | Bernard | 219/125.1 |
| 3,170,430 | 2/1965 | Bistak . | |
| 3,204,082 | * 8/1965 | Dudko et al. | 219/73 |
| 3,211,944 | 10/1965 | Fein . | |
| 3,243,568 | 3/1966 | Burden . | |
| 3,306,116 | 2/1967 | Ross et al. . | |
| 3,339,068 | 8/1967 | Hasegawa . | |
| 3,432,915 | * 3/1969 | Doyle | 219/160 |
| 3,436,519 | 4/1969 | Weisselberg et al. . | |
| 3,466,421 | 9/1969 | Belfor et al. . | |
| 3,518,397 | 6/1970 | Hannahs . | |
| 3,543,810 | 12/1970 | Scheller . | |
| 3,576,966 | 5/1971 | Co . | |

(List continued on next page.)

FOREIGN PATENT DOCUMENTS

| | | |
|---|---|---|
| 166617 | * 5/1954 | (AU) . |
| 408747 | 3/1968 | (AU) . |
| 886174 | 11/1971 | (CA) . |
| 1263151 | 11/1989 | (CA) . |
| 1203893 | * 10/1965 | (DE) . |
| 1048264 | 11/1966 | (GB) . |
| 1208289 | 11/1968 | (GB) . |
| 1569358 | 6/1980 | (GB) . |
| 46-16403 | 6/1971 | (JP) . |
| 53-147641 | 5/1977 | (JP) . |
| 52-69838 | 10/1977 | (JP) . |
| 56-168987 | 12/1981 | (JP) . |
| 57-7382 | 1/1982 | (JP) . |
| 59-18151 | 4/1984 | (JP) . |
| 1-245973 | 2/1989 | (JP) . |
| 3-297587 | 12/1991 | (JP) . |
| 200688 | 8/1967 | (SU) . |
| 339359 | 7/1972 | (SU) . |
| 795800 | * 1/1981 | (SU) ................ 219/137.61 |
| 927435 | 5/1982 | (SU) . |
| 1039679 | 7/1983 | (SU) . |
| 1731537 | 4/1988 | (SU) . |
| 1558605 | 4/1990 | (SU) . |

Primary Examiner—Clifford C. Shaw

(57) ABSTRACT

A welding system and method of use which allows a single welding operator to perform quick, easy and high quality vertical welds. The welding system comprises a welding fixture with a pair opposing, positionally adjustable welding shoes, and lock screws for attaching to a workpiece such as an I-beam. The welding fixture is located adjacent the end of an articulating boom, and a welding torch and oscillator are included on the welding fixture. A rotary straight wire feeder removes the cant and helix from welding wire as it is fed to the welding torch. The welding torch prevents welding wire from fusing to a guide tube in a manner which would interrupt a welding operation. The invention includes a distributed welding control system comprising a plurality of controller modules interfaced with a common bus. The control system allows a welding operator to program automated welding cycles for various welding operations. The welding system of the invention is particularly useful for installing stiffener plates onto structural beams.

31 Claims, 27 Drawing Sheets

U.S. PATENT DOCUMENTS

| | | |
|---|---|---|
| 3,602,688 | 8/1971 | Sibley . |
| 3,681,564 | 8/1972 | Hiyama et al. . |
| 3,715,559 | 2/1973 | Norcross et al. . |
| 3,745,294 * | 7/1973 | Arikawa et al. ............... 219/73 |
| 3,799,215 | 3/1974 | Willems . |
| 3,806,695 | 4/1974 | Carroll et al. . |
| 3,825,716 | 7/1974 | Kokura et al. . |
| 3,909,585 | 9/1975 | Sanders et al. . |
| 3,910,321 | 10/1975 | McKeever . |
| 3,975,614 | 8/1976 | Toth et al. . |
| 4,035,605 | 7/1977 | Taniguchi et al. . |
| 4,074,105 | 2/1978 | Minehisa et al. . |
| 4,095,085 | 6/1978 | Tomita et al. . |
| 4,125,758 | 11/1978 | Oishi et al. . |
| 4,194,541 | 3/1980 | Ditges . |
| 4,321,448 | 3/1982 | Shiozawa et al. . |
| 4,355,526 | 10/1982 | Miles . |
| 4,368,375 | 1/1983 | Merrick et al. . |
| 4,429,207 | 1/1984 | Devletian et al. . |
| 4,575,606 | 3/1986 | Safonnikov et al. . |
| 4,608,481 | 8/1986 | Nomura et al. . |
| 4,631,385 | 12/1986 | Rothermel . |
| 4,635,206 | 1/1987 | Bhatia et al. . |
| 4,841,116 | 6/1989 | Kimura et al. . |
| 4,956,541 | 9/1990 | Hiltunen . |
| 5,148,000 * | 9/1992 | Tews ............... 219/125.11 |
| 5,175,405 | 12/1992 | Karimine et al. . |

\* cited by examiner

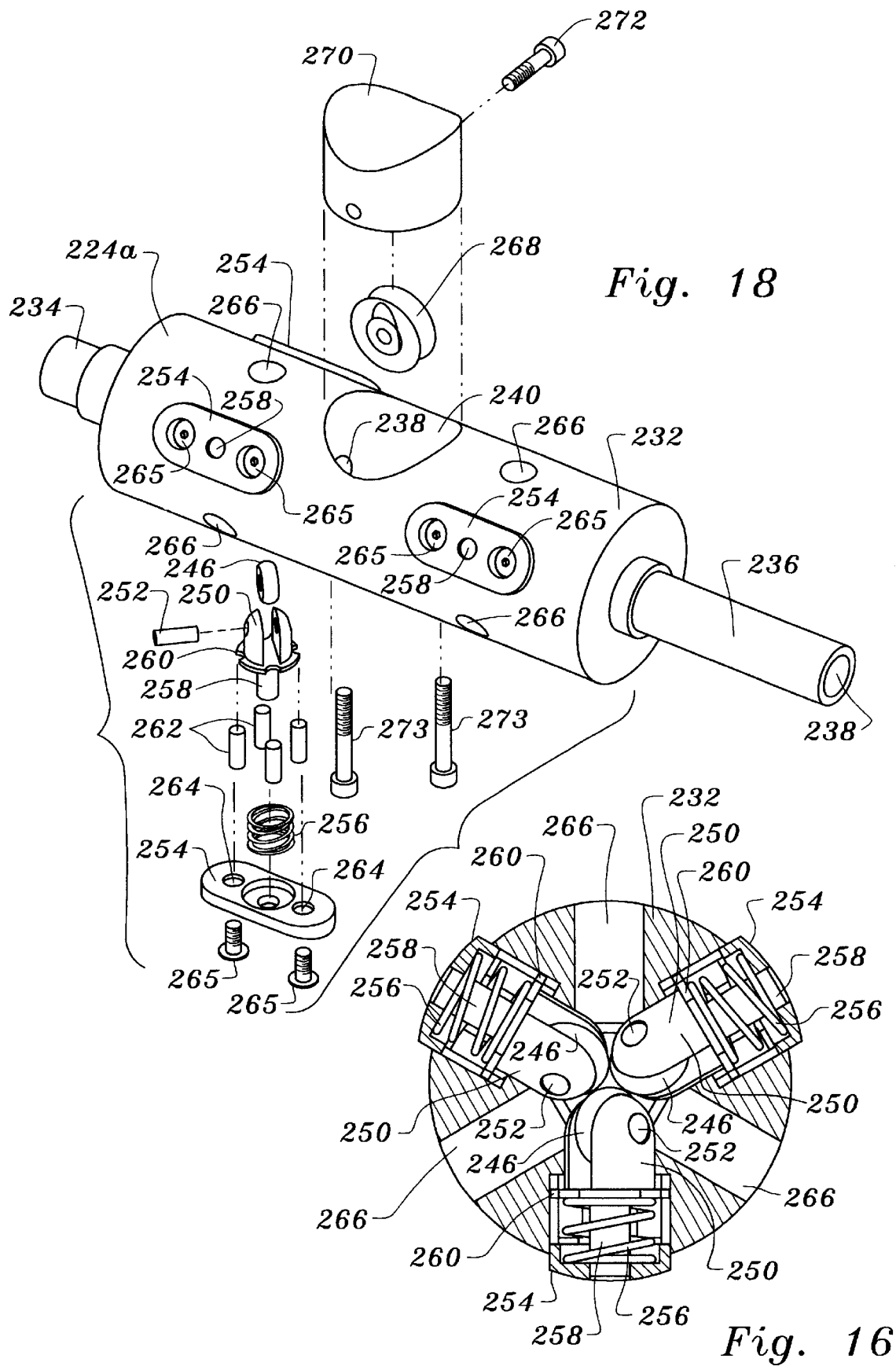

WELDING SYSTEM AND METHOD

BACKGROUND OF THE INVENTION

1. Field of the Invention

This invention pertains generally to devices and methods for metal welding, and more particularly to a welding system and method which provides for quick, easy and accurate vertical welds using a light weight, portable welding fixture and a distributed control system which allows an operator to control arc voltage, electrode oscillation, wire feed rate, seam tracking, and other functions during welding operations.

2. Description of the Background Art

When welding metal items together using arc or gas welding techniques, horizontal welding has traditionally been easier and less expensive to carry out than vertical welding. While welding metal substrates with conventional welding methods or plates together in a horizontal position, gravity assists in keeping the molten weld puddle in place and facilitates the formation of high quality welds. With vertical welding of metal substrates, the molten weld puddle is much more difficult to control, and the weld is correspondingly more expensive and time-consuming to perform. For this reason, structural steel fabricators go to great lengths to position metal substrates in a horizontal relationship during welding and thereby avoid vertical welds.

The problems associated with making vertical welds are particularly evident in the welding of "stiffener" plates into steel I beams or H columns for use in building construction. These stiffeners are used to transfer the moment load through a vertical column when a horizontal column is welded to it. The welding of stiffeners into structural beams is one of the most common welding operations and consumes thousands of man-hours per year for a typical structural steel fabricator. The stiffener plates are welded to the web and flanges of a column in a position which is normal to the web and flanges of the column. Thus, the weld connecting the stiffener plate to the web is at a right angle to the welds which join the stiffener plate to the flanges, and to complete all of the welds, the steel fabricator must either continually reposition the heavy steel beam to maintain a horizontal position for each weld, or must carry out difficult vertical welds.

Heretofore, the most common method of welding stiffeners into beams or columns has been through use of conventional "flux-cored" welding wire methods. Flux-cored welding generally involves filling weld joints with weld metal from a flux cored welding wire. The wire is made from a flat metal strip which is drawn into a hollow tube, filled with a powdered flux material, and rolled on a spool. During welding, the wire is unwound from the spool and fed through a flexible cable or conduit by a wire feeder device to a welding gun. When an operator presses the trigger on the gun, the wire is fed out of the gun and strikes an arc on the parent material to be welded. The arc energy melts the wire and parent material to form a homogeneous weld of fused wire and parent material.

In order to properly weld stiffeners in place on columns using flux-cored welding, the stiffener plate and weld joint must be properly prepared so that the weld will meet the AWS (American Welding Society) code requirements. Generally, the stiffener is first cut from a standard piece of mill plate and then bevel cut on three sides and ground clean to remove any mill scale. Back-up bars, which retain molten metal in place during welding, are then prepared for a fit-up operation wherein the stiffener plate is carefully positioned relative to the column. The person carrying out the fit-up operation must weld the stiffener and backup bars to the column such that a constant ⅜ inch gap is maintained between the stiffener plate and the parent material of the column. If the gap is too narrow, the stiffener must be ground until the proper gap is achieved. If the gap is too wide, the weld will require more metal (and thus more weld passes) to fill. Many welding or construction codes require that the backup bars be removed after the stiffener has been welded in place. Such removal is difficult and expensive, and generally requires gouging out the backup bars with a carbon arc, followed by additional weld passes to fill in the gouged areas.

Small structural steel fabricators generally weld stiffeners into columns using flux-cored wire welding while the columns are horizontally positioned between two upright supports, with the columns being continually flipped or repositioned for each weld to avoid vertical welding. Since the columns generally are very heavy, an overhead crane is used to lift the columns for repositioning. This process is very time consuming and expensive. Additionally, multiple weld passes are required to fill each weld joint, with thicker stiffener plates requiring more weld passes. After each weld pass, the operator must stop and chip off the slag covering the weld before the next weld pass. If any defects occur, the defect must be gouged out with a carbon arc and re-welded.

Larger structural steel fabricators sometimes use "pit welding" or "platform welding" for installing stiffeners, wherein columns are positioned vertically so that all three sides of the weld joint are in a horizontal or flat "hog-trough" position. Since the column is vertical, the stiffener is horizontal and the welds on all three sides are made in the horizontal position. This arrangement also allows a much larger puddle during welding, and requires fewer weld passes to fill each weld joint. However, the handling and positioning of vertically oriented columns is difficult and requires an overhead crane and the use of a pit and/or platform, thus requiring a large amount of work space. Further, the location of the welding operation is generally not at ground or floor level when using pit or platform welding techniques, and can require the welding operator to be awkwardly or precariously positioned on a platform or ladder during the welding operation.

A vertical welding technique known as "electroslag" welding (ESW) has been developed to overcome the difficulties associated with repositioning columns or other heavy substrates in order to permit horizontal welds. The electroslag method generally involves bringing the ends of two vertically-oriented plates or substrates together such that a ¾ inch to one inch gap remains between the ends of the plates. Copper welding shoes are then placed on each side of the gap to form a vertical channel or cavity between the plates and welding shoes. This cavity is filled with weld metal by placing a steel guide tube into the cavity to feed welding wire into the channel. When the welding wire feeds out the bottom end of the guide tube, an arc is struck against the parent material and a molten puddle is formed. A granular flux material is sprinkled into the channel during welding, which melts to form a conductive slag. The arc is extinguished by the conductive slag, which remains molten due to the resistance to the electric current passing between the welding wire and the substrates. Heat generated by the resistance of the molten slag melts the welding wire and fuses the molten metal to the substrates to form the weld. The welding wire is continually fed into the weld while the guide tube is oscillated or reciprocated within the cavity, and the cavity is filled with molten metal to join the plates together. The guide tube is consumable and contributes to the weld metal. The copper shoes retain the weld puddle in place, and are removed when the weld is completed. A comprehensive description of electroslag welding is provided in the American Welding Society Welding Handbook, eighth edition, which is incorporated by reference.

While the electroslag process permits vertical welds, it has previously not met with much success due to the large amount of time required to set up prior to welding. Particularly, it is difficult and time consuming to position and secure the copper shoes about the gap between the substrates which are to be welded. In the case of electroslag welding of stiffeners onto columns, "L"-brackets generally must be cut and welded into place between the flanges and stiffener in order to support the copper shoes, with two L-brackets required for each weld. After the L-brackets are welded in place, steel wedges are pounded in place between the L-brackets and copper shoes to hold the shoes in position. When the weld is finished, the brackets must be removed.

Another drawback associated with conventional electroslag welding is that that the guide tube must be carefully positioned within the gap to be welded, which requires careful alignment of the welding head and welding oscillator mechanism. Incorrect alignment of the guide tube can result in contact of the guide tube with tone of the copper shoes during welding, causing a 500 Amp short which will generally destroy the (expensive) copper welding shoe and interrupt the welding operation. Any such interruption of an electroslag weld operation is very inconvenient and generally requires gouging out the incomplete weld and starting the entire operation over.

Still another drawback of conventional electroslag welding is that the molten flux puddle in the weld cavity can cause the welding wire to fuse to the bottom of the guide tube during welding, which prevents wire from feeding into the weld. The welding then must be interrupted, the copper shoes removed, and the weld area cleaned or ground down to allow set up for a new weld start. As noted above, the interruption of an electroslag weld in such a manner requires expensive and time consuming cleanup of the incomplete weld followed by starting the weld operation over again.

Welding controllers or control systems have been developed to facilitate electroslag welding by controlling wire feed rate and oscillation, but such controllers generally bulky and heavy, and typically provide for only one type of weld condition. If the weld condition varies during welding, defects may occur to the weld, or a catastrophic short against one of the copper welding shoes may occur. For these reasons, electroslag welding of stiffeners onto columns has not proved economical, and the welding industry has continued to use the flux-cored wire welding method. Further, previously known welding control systems have been based on centralized control architectures having a star topology. These control systems are generally not scaleable or adaptable to changing needs or different types of welding operations. Generally, the central processor board for such systems must be re-designed and modified to meet new requirements.

Accordingly, there is a need for a welding system and method which overcomes the drawbacks presently associated with the currently-used flux-cored wire welding and electroslag welding methods, which eliminates the need for frequent re-positioning of heavy steel columns or other substrates during welding operations, which allows quick and easy vertical welding with minimal set up time, which uses light weight, portable equipment, which prevents unwanted interruption of welding operations, and which provides a distributed control system to allow defect free welds under a variety of weld conditions. The present invention satisfies these needs, as well as others, and generally overcomes the deficiencies of conventional electroslag welding and flux-cored wire welding methods, and the drawbacks found generally in the background art.

SUMMARY OF THE INVENTION

The present invention is a welding system and method which allows quick and easy fabrication of high quality vertical welds under varying conditions without requiring extensive set up time or use of heavy equipment. In general terms, the system of the invention comprises a portable welding fixture having means for adjustably positioning a pair of welding shoes about the center point of a weld, an interchangeable welding torch and oscillator detachably coupled to the welding fixture, a rotary wire feeder and straightener, a flux dispenser, and a distributed control system which allows an operator to control arc power supply, electrode oscillation, wire feed rate, flux dispensing rate, seam tracking, and other functions. The welding system preferably includes an articulating, multi-segment boom or arm which allows quick and easy positioning of the welding fixture with respect to large workpieces or substrates. The welding fixture is associated generally with the end of the articulating boom, and the wire feeder/straightener, flux dispenser and a welding wire source such as a spool of welding wire are preferably located on the articulating boom.

By way of example, and not of limitation, the welding fixture includes a pair of movable opposing welding shoes, means for positioning the welding shoes about a central point or center line, means for supporting an oscillator and welding torch, and means for releasibly coupling the fixture to a workpiece. The positioning means preferably comprises a pair of movable arms which are threadedly mounted on a right/left threaded positioning screw. The welding shoes are mounted on the movable arms in an opposing relationship, and rotation of the positioning screw by turning a knob brings the arms and welding shoes together or apart depending upon the direction of rotation. The welding shoes and movable arms preferably move symmetrically about the center line, so that the welding shoes remain equidistant from the center line during positional adjustment. The workpiece coupling means preferably comprises one or more hand-actuated screw clamps or locking screws which releasibly attach or clamp to a workpiece and securely hold the welding fixture onto the workpiece during welding operations. A plurality of perch screws are provided to allow adjustment of contact pressure and alignment of the fixture with respect to the workpiece. The oscillator supporting means preferably comprises a bracket which receives a detachable and interchangeable oscillator apparatus. A welding torch is coupled to the oscillator and is aligned generally with the centerline between the opposing welding shoes and movable arms. The welding torch supports a guide tube and welding wire which are located generally adjacent to the center line between the welding shoes and movable arms. The welding torch and oscillator are positioned on the welding fixture such that the guide tube and welding wire are generally located at the center point or axis between the opposing welding shoes. Preferably, the welding shoes are made of copper or like metal or metal alloy. The welding shoes preferably are water-cooled or air-cooled, and include an insulating ceramic coating on one or more surfaces of each of the welding shoes. The welding shoes may alternatively not include an insulating coating. The welding fixture is compact and lightweight, preferably under 50 lbs, and can be easily handled by a single person.

The welding torch of the invention includes means for preventing a welding wire from sticking or fusing to the end of a guide tube in a manner which would interrupt welding operations. The welding torch preferably comprises a central tube slidably mounted in an outer tube, a spring for applying an upward bias to the central tube, and a chuck for releasibly holding a guide tube onto the central tube. The central tube is slidably mounted in the outer tube by means of one or more linear bearings. The spring provides an upwardly directed bias to the central tube. A flexible conductor electrically connects the central tube to the welding power supply cable. Welding wire is fed from the wire feeder, down a flexible conduit, through the welding torch, and into the guide tube. The welding torch may be structured and configured to accommodate dual guide tubes and to allow two welding wires to simultaneously be directed through the welding torch.

The guide tube used with the welding torch can be a round guide tube or a winged guide tube structured and configured to spread the welding arc energy over the width of the weld. The winged guide tube comprises a pair of opposing elongated plates, with each plate having a longitudinal channel extending between the ends of the plate. The plate are joined together with the channels facing each other so that the channels define a guide tube for a welding wire, and the edges of the plates define wings.

The oscillator of the invention preferably comprises a pair of elongated parallel shafts rotatably mounted in a housing, with a pair of linear actuators or slide blocks movably mounted on the shafts, together with means for causing the linear actuators to travel longitudinally along the shafts as the shafts rotate. A motor or like drive means is provided to rotate the shafts and drive the linear actuators. Means for monitoring linear actuator movement are included with the oscillator, and preferably comprise an encoder that counts shaft or motor rotation and communicates encoder count pulses to the control system of the invention. In a first embodiment of the oscillator, the rotating shafts are smooth and each linear actuator includes a plurality of canted rollers that propel the linear actuators along the shafts as the shafts rotate. A linear or quadrature encoder is preferably included on one or both of the linear actuators to monitor rotation of the canted rollers and correct for slippage between the canted rollers and the rotating shaft. Oscillation is achieved by rotatably driving the shafts at a selected rate of rotation and periodically reversing the direction of rotation after a selected duration, to provide an oscillating motion to the linear actuators. Means for controlling the amplitude and period of oscillation are provided in the form of a detachable control module associated with the control system of the invention. A plate is coupled to the linear actuators and moves with the linear actuators. The welding torch is coupled to the plate and oscillates with the motion of the linear actuators and plate. The oscillator is detachably coupled to the welding fixture by a bracket.

In an alternative embodiment of the oscillator, the rotating shafts are threaded to provide lead screws, and the linear actuators each include an internally threaded plastic nut that allows the linear actuators to travel along the shafts or lead screws during rotation. A needle bearing is located on either side of the internally threaded plastic nut. The lead screws are precision ground to provide a flat surface on the outer race of the lead screws. The precision grinding of the lead screws further provide a bearing fit so that that the needle bearings can ride on the outer surface of each lead screw. This arrangement allows the needle bearings to carry a much heavier load than the plastic bearing nuts themselves. An encoder tracks rotation of the drive motor.

The wire feeder and straightener of the invention is a rotary straight wire feeder, and includes means for removing the "cast" and "helix" from welding wire as the wire is unwound from a spool or coil and feeding the wire to a welding torch. The rotary straight wire feeder includes two sets of canted bearings mounted in a rotor housing or body. Each bearing set includes three bearings which are laterally spaced apart about a bore extending along longitudinal axis of the rotor body, and which are each canted or skewed at about forty five degrees with respect to the longitudinal axis. A welding wire is placed through the bore of the rotor body such that the wire is in contact with the bearings in the two bearing sets. When the rotor body is rotated, the bearings exert a force on the wire which drives the wire forward. An adjustable offset bearing is positioned in the rotor housing between the two rotor sets. As the rotor body turns, the offset bearing bends and straightens the welding wire as it is advanced through the rotor body under the action of the canted bearings.

The distributed control system of the invention preferably comprises a plurality of control modules, one of which is an operator interface, and a bus for the plurality of modules. The control modules are preferably networked in series with communication and power cables. Each control module includes a local microcontroller that controls the functions of the module. The operator interface includes a data logging module or operator control panel with one or more rotatable control knobs that are monitored by digital encoders. The control knob is attached to the shaft of a manually positioned encoder and performs the same function that a potentiometer would in an analog control system. The encoder is preferably shaped, mounted and turned like a potentiometer. The operator control panel allows setting of "Initial", "Program" and "Final" weld conditions, as described in more detail below. The other control modules preferably comprise an oscillator controller, a servo amp or wire feed controller for the rotary straight wire feeder, and a welding power supply controller.

The control system includes network software which provides communication between the different components of the system. The software and provides a master slave system with communications error detection. The operator interface acts as master for the system while the other modules act as slave units which can eavesdrop on communications when one particular module needs control information from another module. Network communications use EIA RS-485 signaling and a standard 8-bit NRZ ASCII code set. Each byte is encoded with a single start and a single stop bit with no parity. Diagnostic information from each control module can be communicated back to the operator control module and displayed to the operator on an LCD or like display. The use of multiple control modules as provided by the invention allows the operator control module to quite small and portable because the individual modules carry out control operations for the separate function.

The control system includes means for creating digital data recordings of all of the welding parameters associated with each welding cycle carried out using the welding system of the invention. Preferably, the operator control panel includes a serial port which allows interfacing with a personal computer or a simple data storage device such as a flash memory card or a floppy disk drive. All of the welding parameters which are entered by the operator and which are monitored and controlled by the control system and displayed on the operator panel can be downloaded to an external personal computer or stored on flash memory cards or floppy disks for future evaluation. In this manner, a detailed record for each weld made with the invention is quickly and easily created and conveniently available for future use.

The welding fixture is preferably associated with the end of an extensible, articulating boom or articulating boom which allows extendable, articulating positioning of the fixture with respect to large workpieces such as steel beams or columns for building construction. The articulating boom is pivotally mounted on a base, and preferably comprises a plurality of pivotally joined segments which can be pivoted and extended or folded up as required to position the end of the arm. Flexible arc power cables and cooling water supply hoses run along the articulating boom and provide power to the welding torch and cooling water to the welding shoes. The fixture is preferably attached to the end of the articulating boom by a chain or cable, which supports the weight of the fixture, when the fixture is not attached to or resting on a workpiece.

The system of the invention preferably includes a flux dispenser for providing welding flux to a welding site. The flux dispenser preferably comprises a flux hopper and an input drop tube which gravity-feed flux powder to a generally horizontally-oriented drive belt. The drive belt is located in a recess or chamber in a belt housing. As the belt turns under the action of a motor, flux is conveyed from the belt and drops off into the recess in the belt housing and moves to the bottom of the recess. One or more output drop tubes communicate with the bottom of the recess, and convey the flux by gravity to the weld site. The rate of flux dispensing can be increased or decreased as desired by increasing or decreasing the rotation rate of the drive motor, and thus the rate of motion of the drive belt. The flux dispenser can be mounted on the articulating of the invention, may be detachably associated with the welding fixture, or can held by an external support near the welding operation.

The welding wire used with the invention preferably comprises between approximately 0.0001% and approximately 0.05% of boron, and/or between approximately 0.001% and approximately 0.08% of nickel. The boron included in the welding wire provides increased weld strength relative to welds made with conventional welding wire compositions.

The method of using the welding system of the invention generally comprises the steps of positioning the extensible arm relative to a workpiece, positioning the welding fixture on the workpiece, securing the welding fixture to the workpiece, positionally adjusting the opposing welding shoes relative to a center point to define a welding cavity adjacent the workpiece, straightening welding wire and feeding welding wire to a welding torch and through a guide tube, providing oscillating motion to the welding torch, striking an arc to initiate welding, and adding flux to the weld cavity during welding. The method of using the invention also preferably comprises the steps of controlling arc voltage and arc current from an operator interface control module, controlling the period and amplitude of oscillating motion from an operator control module, and controlling welding wire feed rate from an operator control module.

In using the system and method of the invention to weld stiffeners onto an I-beam, the I beam is horizontally positioned across supports at floor level, with the web of the beam generally parallel to the floor, and with the flanges of the beam generally perpendicular to the floor. A stiffener plate is cut to fit between the two flanges so that a suitable gap, such as ¾" to 1", remains between the side edges of the of the stiffener plate and the flanges of the I-beam. The lower edge of the plate adjacent to the web of the I-beam is beveled, and the stiffener plate is welded to the web using conventional flux-cored wire welding techniques, since the stiffener plate and web are horizontally oriented.

Following the horizontal welding of the stiffener plate to the web, the welding operator positions the welding fixture on the I-beam so that the center line between the welding shoes is located generally near the center of the gap between the one of the edges of the stiffener plate and the adjacent flange of the beam. Next, the welding fixture is secured to the beam by the hand-actuated clamping or locking screws. Then, the positioning screw is rotated by turning the knob or wheel to bring the welding shoes adjacent to the gap to define a vertical welding cavity, with the guide tube and welding wire located generally in the center of the welding cavity along the center line. The insulated faces on the welding shoes face the welding cavity, and cooling water or air is circulated through the welding shoes. The drop tubes from the flux dispenser are positioned above the weld cavity. The operator presets weld conditions into the operator control panel for arc voltage, arc current, wire feed rate and oscillator settings. After weld program variables or parameters have been entered into the operator control panel, the operator activates a "cycle start" button to activate the initial weld conditions, which continue until a molten flux puddle has formed in the weld. Following activation of the "cycle start button, welding wire is advanced to contact the base metal and strike an arc while the welding torch and guide tube oscillate according to the predetermined settings within the welding cavity. Flux is dispensed at a predetermined rate into the weld cavity from the flux dispenser during the welding operation. The control system then switches to the main or program weld conditions until the operator activates a "cycle stop" button on the operator control panel. Under the program weld conditions, the welding wire and guide tube are generally consumed and fill up the weld cavity to form a weld connecting the flange and the edge or side of the stiffener plate. The "cycle stop" button initiates final weld conditions. A timer associated with the control system holds preset parameters at final weld conditions until a power supply contactor is dropped to terminate the arc, and wire feeding stops. When the weld is thus completed, the copper welding shoes are drawn apart and the fixture is detached and moved to the opposite end of the stiffener and the above process is repeated to weld the opposite edge of the stiffener to the opposite flange. The welding operator may record all of the details of the weld cycle onto a flash memory card or floppy disk or other recording media for future use.

When both edges or sides of the stiffener have been welded to the opposing flanges of the beam as describe above, the fixture may be moved to another location on the beam for welding another stiffener plate thereon, or the beam may be rotated 180° so that a stiffener can be welded onto the other side of the beam. No backup bars or braces are required to hold the stiffener or welding shoes in place during the vertical welds, and the entire setup time for each weld generally takes less than one minute. No repositioning of the heavy I beam is required for any of the welds. Since the welding fixture and operator control module are light weight and portable, a single person can operate the welding system of the invention and install multiple stiffeners onto an I-beam in a relatively short time. The insulating coating on the copper welding shoes prevents catastrophic shorting of the guide tube against the copper shoes as occurs in previously used electroslag welding techniques. The welding torch of the invention prevents inadvertent fusing of the welding wire to the end of the guide tube because the downward force exerted on the welding wire by the wire straightener/feeder is forces the end of the guide tube into the molten flux puddle of the weld, causing the wire to melt and unfuse from the guide tube. The control system allows recording of all weld parameters involved in each individual weld.

In a variation of the above procedure as used for installing stiffeners onto I-beams, a slot is first cut in the web of the I-beam, and a stiffener plate is prepared with dimensions such that, when centrally positioned in the slot, the stiffener plate extends outward from the web on both sides of the I beam. Thus, a single plate provides stiffeners for both sides of the web, and the beam itself requires movement only once during the entire welding operation. Using this method, the plate is joined to the beam using two stiffener-to-flange welds and two stiffener-to web welds on each side. In the event that the stiffener-to-web fillet welds are unacceptable, the web can be single-beveled on either side and welded horizontally from either the first or second side with flux-cored wire. The vertical stiffener-to-flange welds are carried out using the system of the invention in generally the manner described above.

The system of the invention also preferably includes a welding shoe stiffener clamping assembly for use with the above-described stiffener installation wherein a slot is cut in the web of an I-beam. The welding shoe stiffener clamping assembly generally comprises first and second pairs of welding shoes, means for positionally adjusting the first pair of welding shoes relative to each other, means for positionally adjusting the second pair of welding shoes relative to each other, means for positionally adjusting the first pair of welding shoes relative to the second pair of welding shoes. The positioning means in each case preferably comprise right-handed/left-handed externally threaded positioning screws together with corresponding right-handed/left-handed internally threaded sleeves. A positioning screw is pivotally attached to each of the welding shoes in the first pair of welding shoes, and a positioning screw is likewise pivotally attached to each of the welding shoes in the second pair of welding shoes. A pair of positioning screws pivotally attach the first pair of welding shoes to the second pair of welding shoes. Rotation of the sleeves with respect to the corresponding positioning screws will increase or decrease (depending upon the direction of rotation) the distance between the welding shoes associated with the positioning screws.

The welding shoe stiffener clamping assembly is generally used by first positioning a stiffener plate within the slot in the web of the I-beam in a desired manner, with a gap located between each side or edge of the stiffener plate and the adjacent flange of the I-beam. The stiffener plate is then tack welded into position. The welding shoe stiffener clamping assembly is then positioned adjacent the stiffener plate, and the first pair of welding shoes are positioned about one edge of the stiffener plate and drawn together by rotating the appropriate sleeve on the corresponding positioning screw until the first pair of welding shoes are brought together about the stiffener plate to define a first lower welding cavity between the first pair of welding shoes. The second pair of welding shoes are then positioned about the other edge of the stiffener plate and drawn towards each other by rotating the appropriate sleeve on the corresponding positioning screw until the second pair of welding shoes are brought into contact with the stiffener plate to define a second lower welding cavity between the second pair of welding shoes. A sump block is placed between each of the welding shoes of the first pair and secured therebetween by tack welds to block or seal off the end of the first lower welding cavity, and a sump block is likewise is placed between each of the welding shoes of the second pair and secured therebetween by tack welds to block or seal off the end of the second lower welding cavity.

When the welding shoe stiffener clamping assembly is thus in place, the stiffener plate is welded to the web with four stiffener-to web fillet welds, with two such welds on the upper side of the web and two welds on the lower side. The four stiffener-to-web fillet welds are carried out with conventional flux-cored welding techniques, such as use of a welding "gun", without re-positioning the beam. The I-beam is positioned so that the welding shoe stiffener clamp assembly is positioned beneath or on the lower side of the I-beam, and the welding fixture is then attached to the upper edge of the flange in the manner described above, adjacent the edge of the stiffener plate and above the first lower welding cavity. The welding shoes of the fixture are positioned together about the stiffener plate to define a first upper welding cavity, which communicates with the first lower welding cavity directly below. The guide tube on the welding torch is of suitable length so that the guide tube extends the length of the combined upper and lower welding cavities. In this manner, the upper and lower welding cavities can be filled with weld metal in a single weld to join the stiffener plate to the flange on both the upper and lower sides of the beam, thereby eliminating the need to rotate the I-beam and perform two separate vertical welds to join the stiffener plate to the flange. The welding fixture is then re-positioned and secured to the opposite flange, and the welding shoes of the fixture are positioned to form a second upper welding cavity adjacent to and in communication with the second lower welding cavity, and the combined upper and lower welding cavities are filled in a single weld as described above.

The welding fixture and welding shoe stiffener clamping assembly of the invention thus can be used to install a stiffener plate which extends through to both sides of an I-beam without requiring any re-positioning of an I-beam. Further, the entire operation can be carried out by a single person, without the use of a crane for moving the I-beam or any other heavy equipment. The installation of two stiffener plates on opposite sides of an I-beam with conventional welding techniques would generally require re-positioning of the I-beam with a crane at least six times. The present invention thus greatly reduces the time and labor required for installing stiffener plates onto I-beams.

An object of the invention is to provide a welding system and method which allows quick and easy formation of high quality vertical welds.

Another object of the invention is to provide welding system and method which requires minimal set up time for vertical welds.

Another object of the invention is to provide welding system and method which utilizes light weight and portable equipment and can used by a single operator.

Another object of the invention is to provide welding system and method which allows welding to be carried out at floor or ground level on large workpieces such as structural beams and columns.

Another object of the invention is to provide welding system and method which minimizes the need for re-positioning of heavy workpieces during welding operations.

Another object of the invention is to provide welding system and method which eliminates shorting caused by contact of a welding wire guide tube with a welding shoe.

Another object of the invention is to provide welding system and method which prevents interruption of welding operations due to fusing of a welding wire to the end of a guide tube.

Another object of the invention is to provide welding system and method which eliminates the cast and helix from welding wire which has been unwound from a spool.

Another object of the invention is to provide welding system and method which provides for both straightening and feeding welding wire.

Another object of the invention is to provide welding system and method which allows a single stiffener plate to extend through a slot in the web of an I-beam so that the stiffener plate extends outward to both sides of the web.

Another object of the invention is to provide welding system and method in which a single stiffener plate extending through a slotted web in an I-beam can be welded to the I-beams without requiring any re-positioning of the I-beam.

Another object of the invention is to provide welding system and method which includes a distributed control system having a plurality of control modules.

Another object of the invention is to provide welding system and method which allows presetting of control parameters for arc voltage, arc current, welding wire feed rate, welding torch oscillation, and other functions from a portable, light weight operator control panel prior to welding.

Another object of the invention is to provide welding system and method which allow for overriding preset conditions during the welding operation.

Another object of the invention is to provide welding system and method which allows digital recording of all welding parameters for each weld carried out.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

FIG. 16 is an end view of the partial cross-sectional view shown in FIG. 15.

FIG. 18 is a partially exploded view of the rotary straight wire feeder of FIG. 14.

DETAILED DESCRIPTION OF THE PREFERRED EMBODIMENTS

Figure 32:
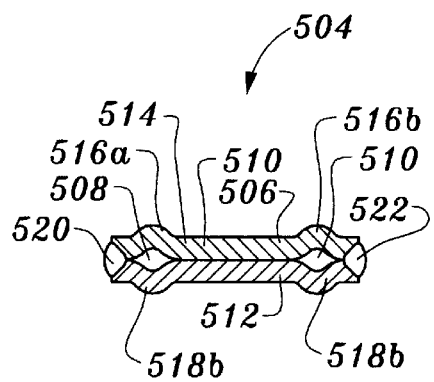
FIG. 32 is an alternative embodiment guide tube in accordance with the invention for use with two welding wires simultaneously.
Figure 33:
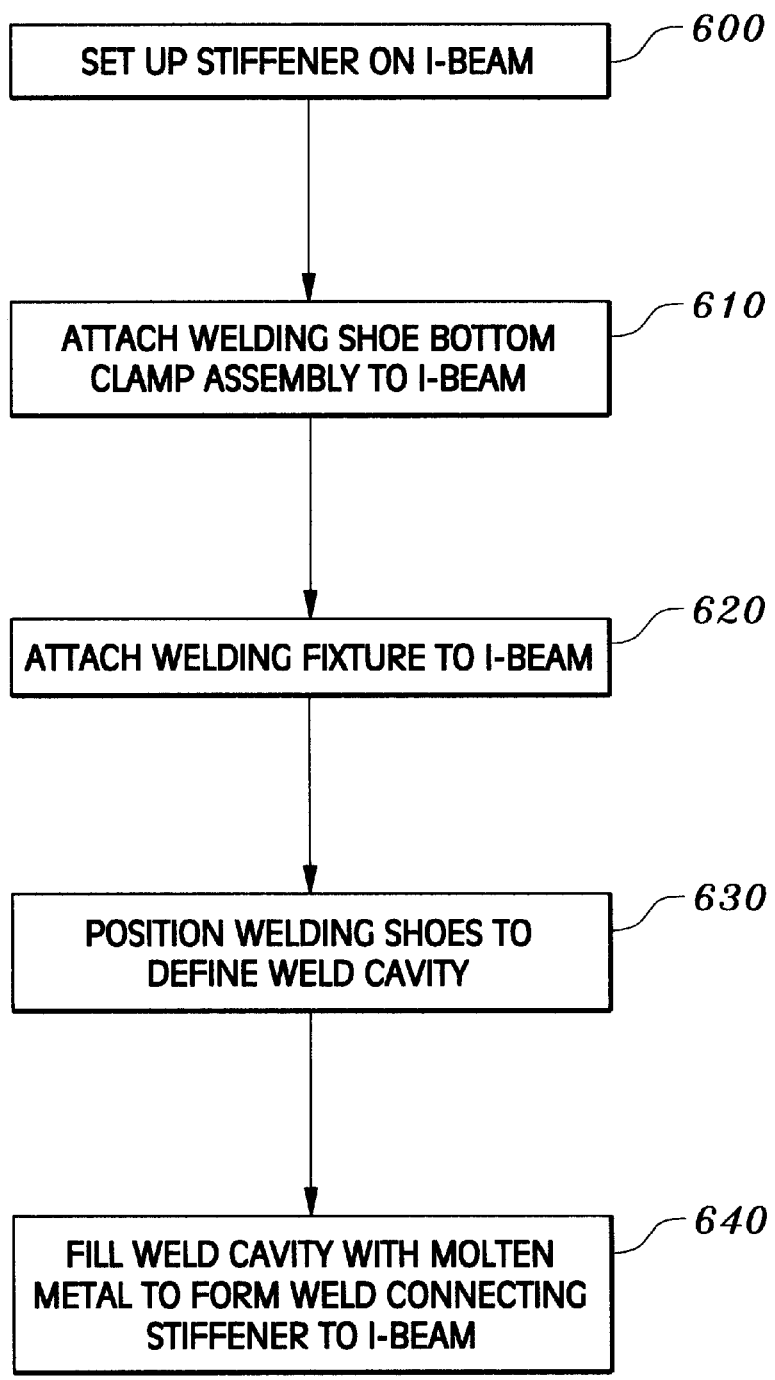
FIG. 33 is a flow chart illustrating generally the method of the invention.

Referring more specifically to the drawings, for illustrative purposes the present invention is embodied in the system and method shown generally in FIG. 1 through FIG. 32, and the method outlined generally in FIG. 33. It will be appreciated that the system may vary as to configuration and as to details of the parts, and that the method of using the system may vary as to details and to the order of steps, without departing from the basic concepts as disclosed herein. The invention is disclosed generally in terms of welding stiffener plates onto structural beams, as this particular type of welding operation is widely used. However, the invention may be used in a large variety of welding applications, as will be readily apparent to those skilled in the art.

Figure 1:
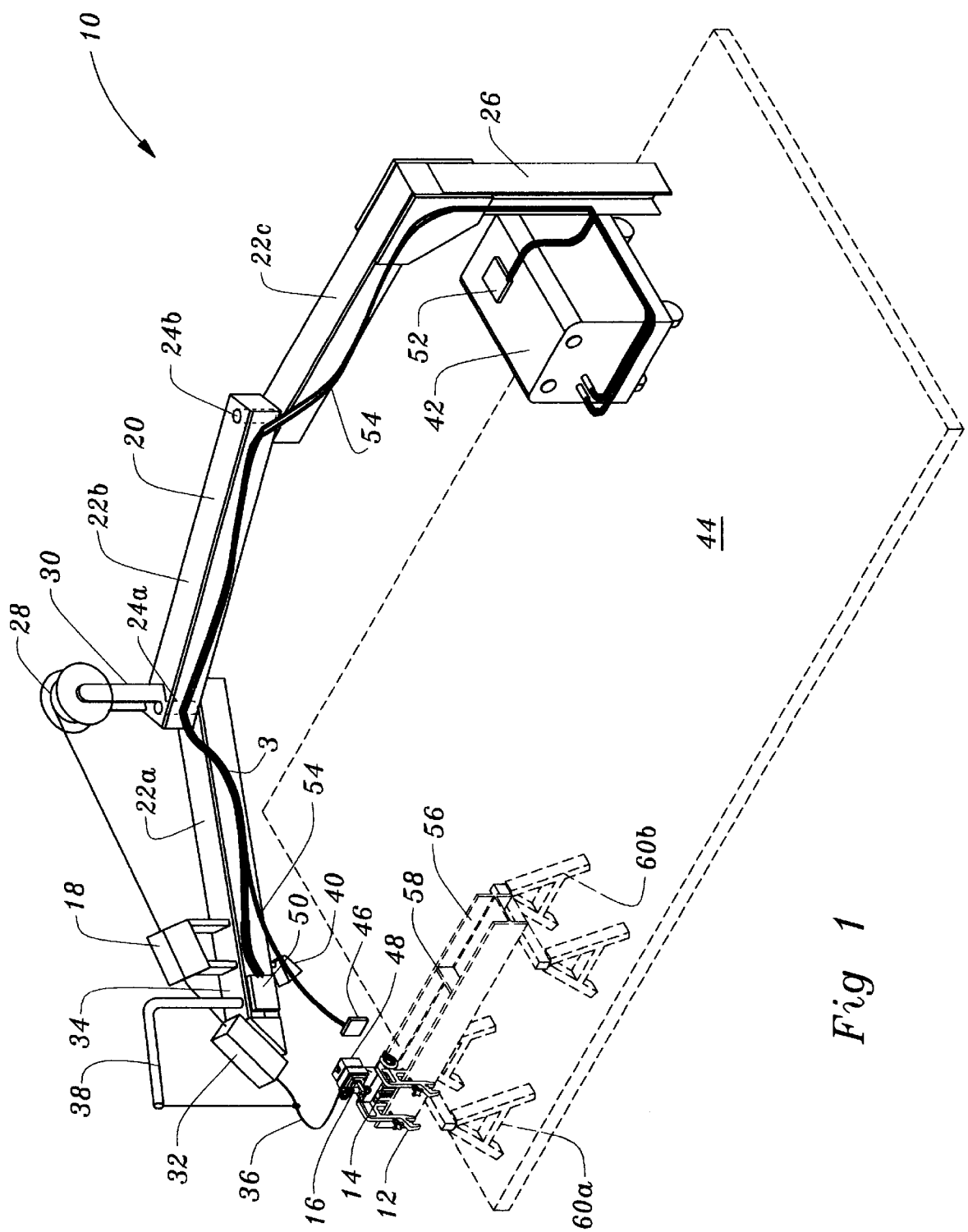
FIG. 1 is a perspective view of a welding system in accordance with the invention shown with an I beam and supports.
Figure 2:
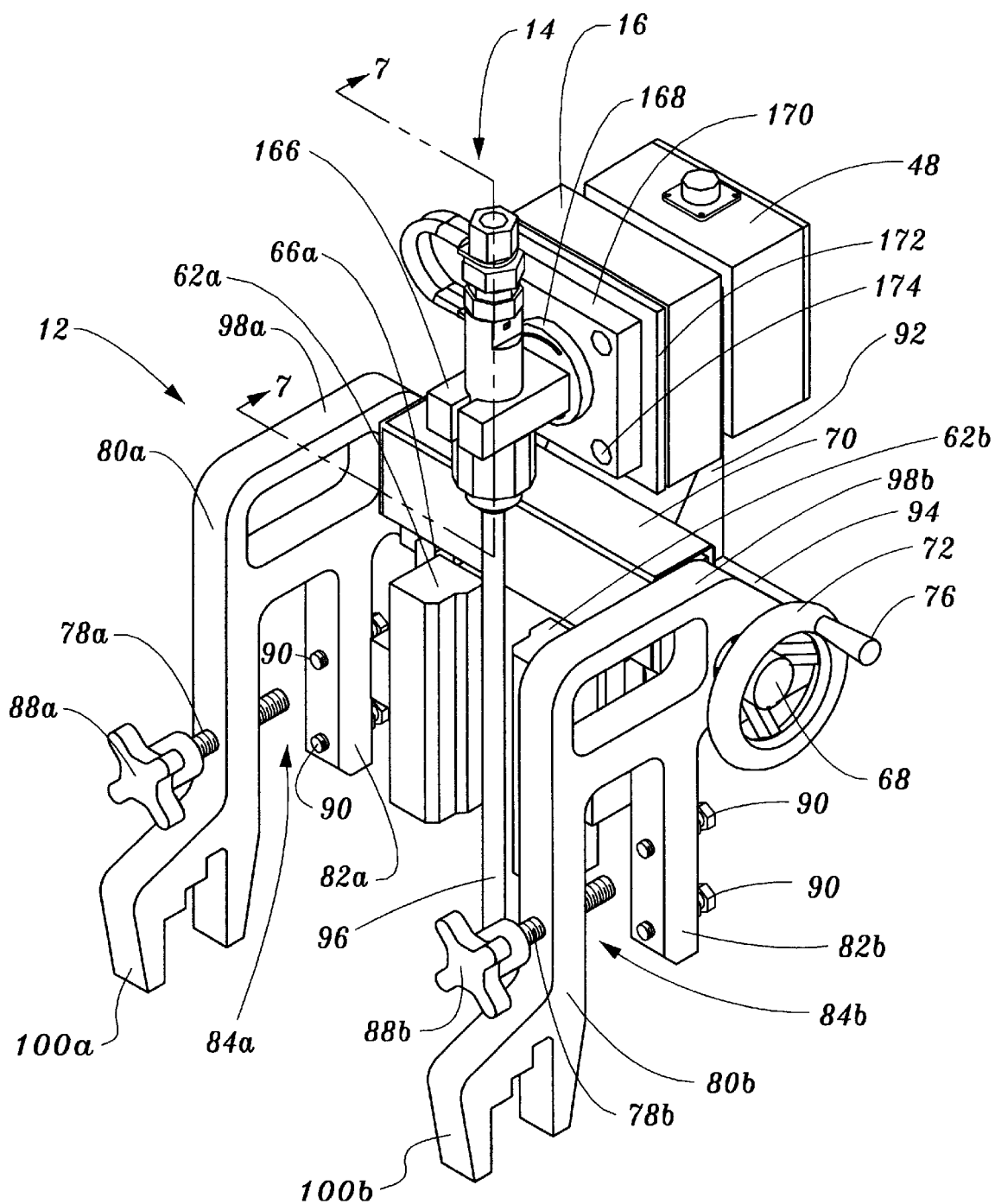
FIG. 2 is a perspective view of the welding fixture, welding torch and oscillator of FIG. 1.
Figure 3:
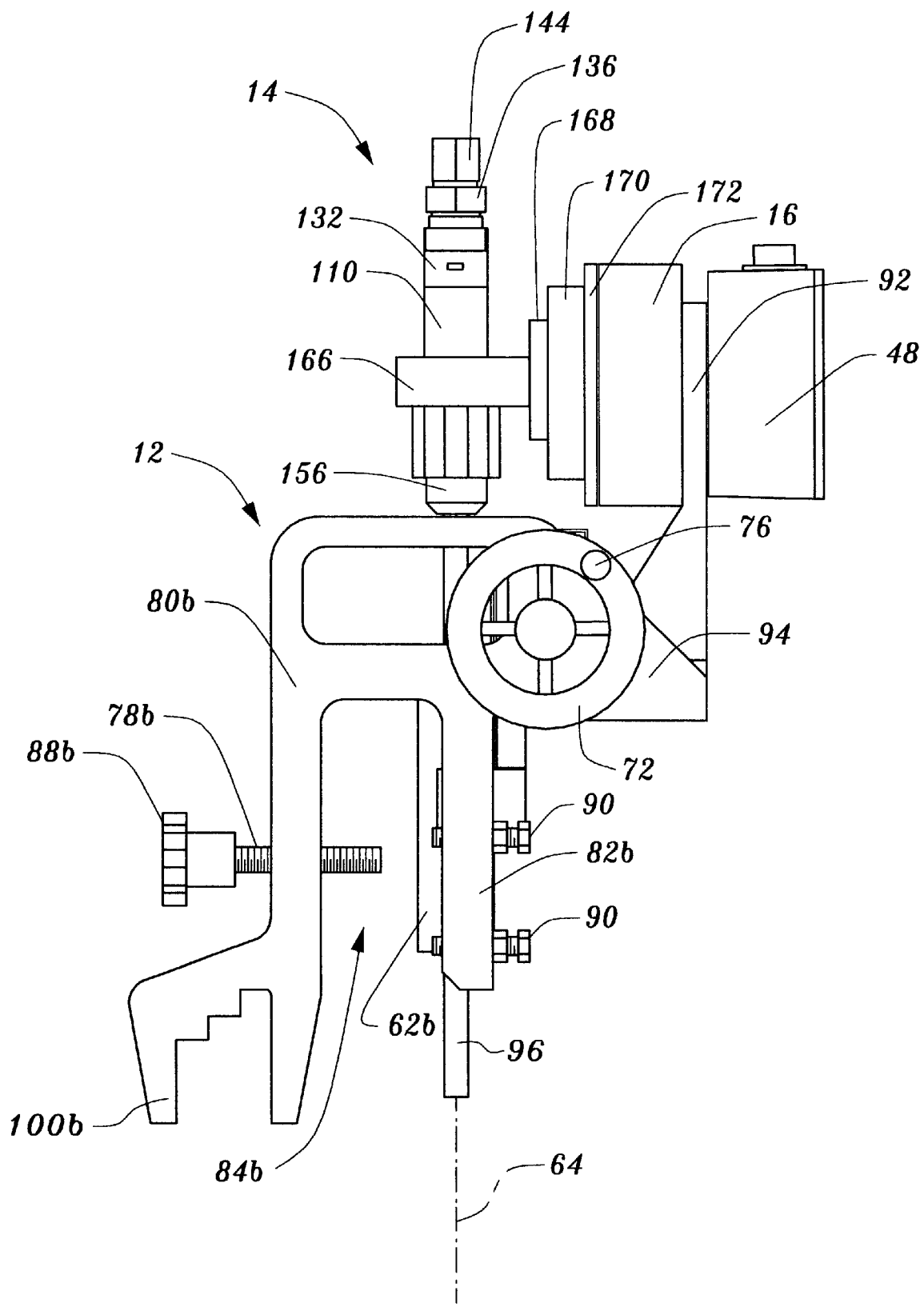
FIG. 3 is a side elevation view of the assembly of FIG. 2.
Figure 4:
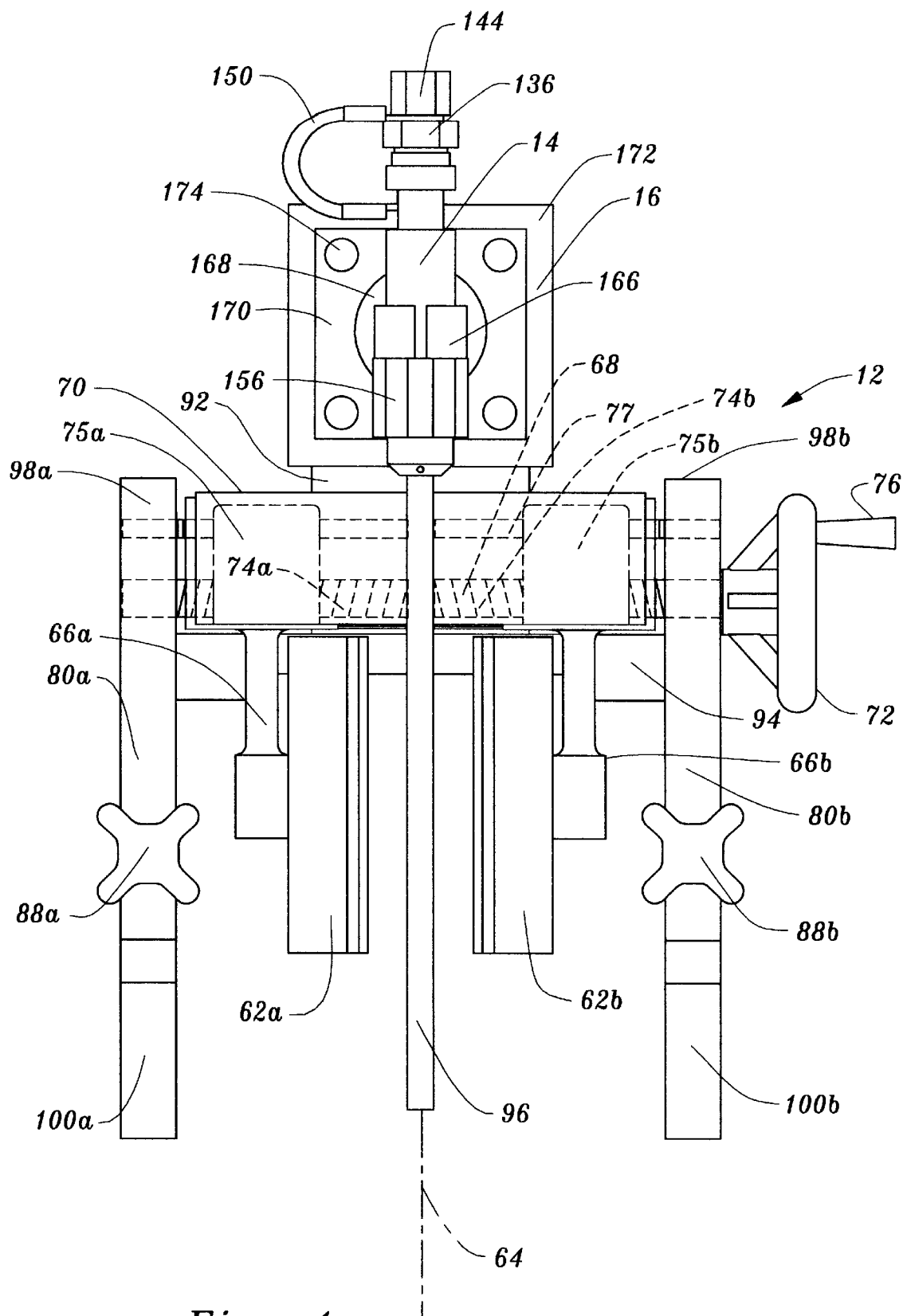
FIG. 4 is a front view of the assembly of FIG. 2.
Figure 5:
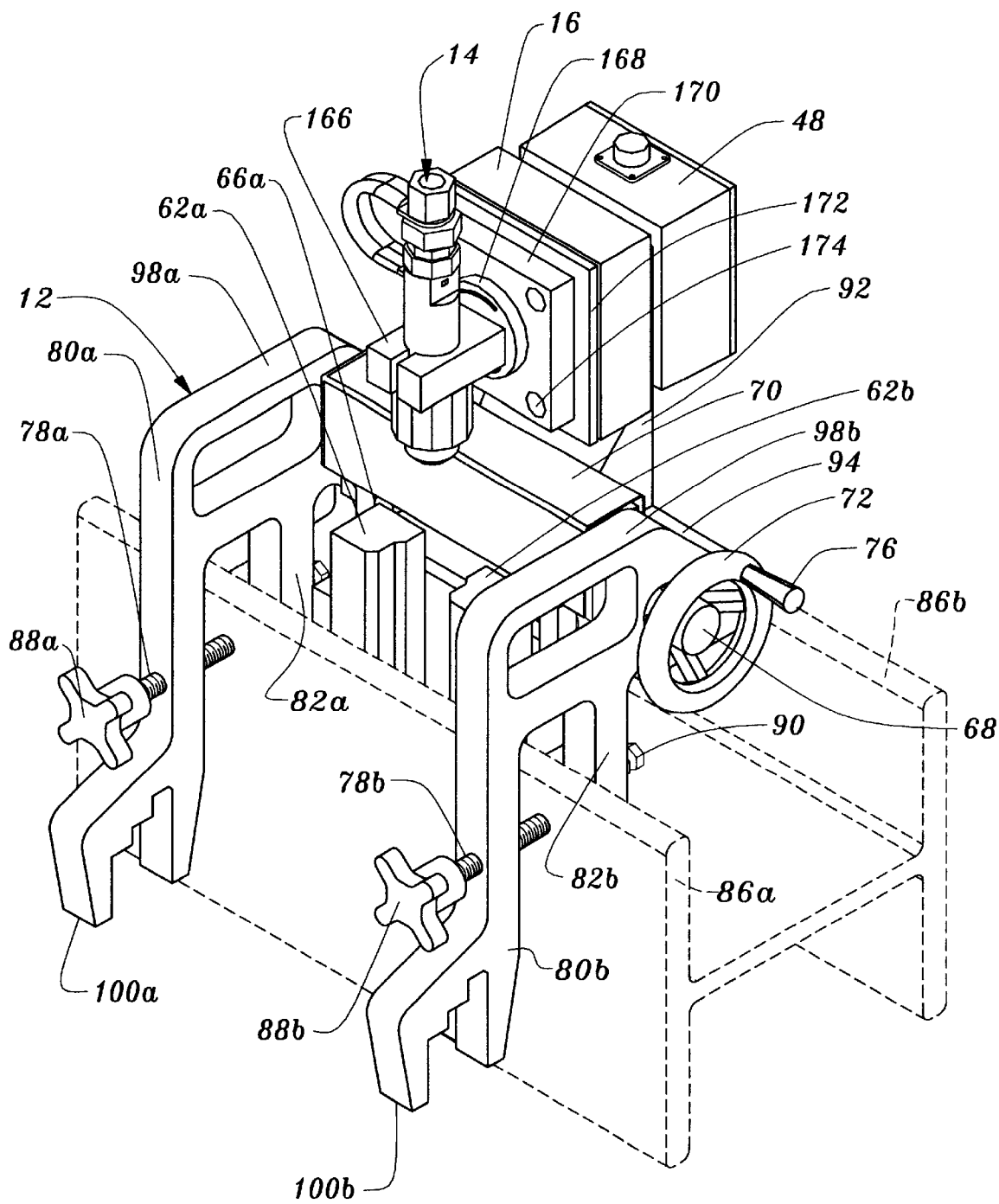
FIG. 5 is a perspective view of the assembly of FIG. 2 shown together with an I-beam.

Referring first to FIG. 1, a welding system 10 in accordance with the invention is generally shown. The welding system 10 generally comprises a welding fixture 12, a welding torch 14, an oscillator 16, and a rotary straight wire feeder assembly 18. The system 10 is preferably associated with an extensible, articulating boom 20 having a plurality of segments 22a, 22b, 22c which are pivotally or otherwise movably related to each other by a corresponding plurality of pivoting joints or hinges 24a, 24b. Articulating boom 20 is mounted on a base or column 26. Segments 22a–22c are preferably made of perforated metal beams to provide high load bearing capability and light weight. Joints 24a–b preferably include pillow block bearings (not shown) as well as adjustable drag brakes (not shown) to prevent unwanted floating movement. A welding wire source such as spool 28 is preferably positioned on articulating boom 20 by support 30. Rotary straight wire feeder assembly 18 is also preferably located on boom 20. Welding wire is unwound from spool 28 and provided to rotary wire feeder straightener assembly 18 during welding operations. A conventional wire puller or wire feeder 32 may also be included on articulating boom 20 adjacent the free end 34 thereof, and can be utilized as an alternative to rotary straight wire feeder assembly 18. A welding wire guide hose 36 directs wire from feeder 32 or rotary feeder/straightener assembly 18 to welding torch 14. A flexible arm 38 may be used to support guide hose 34. A light source 40 is preferably included on articulating boom 20 to facilitate welding operations. An arc welding power supply 42 is provided with system 10, which provides power to welding torch 14 via power cable(s) (not shown) that extend generally along articulating boom 20 to fixture 12 and welding torch 14. The power cables may alternatively extend across the floor 44 of the work area where welding system 10 is used, or be otherwise conveniently positioned. Welding system 10 may additionally comprise seam tracking, motion controlling and flux dispensing equipment (not shown), which are generally associated with the end 34 of articulating boom 20 or with welding fixture 12.

Welding system 10 preferably includes a distributed control system which is shown in FIG. 1 as an operator interface module 46, an oscillator controller module 48, a wire feed controller module 50 for the rotary straight wire feeder 18, a welding power supply controller module 52, and a bus cable 54 connecting modules 46–52. Oscillator controller module 48 is preferably located adjacent oscillator 16, a wire feed controller module 50 is preferably located on articulating boom 20 near end 34 and rotary straight wire feeder 18. Welding power controller module 52 is preferably associated with welding power supply 42, and may be internally or externally located on welding power supply 42. Additional control modules (not shown) may be included for seam tracking, motion controlling or flux dispensing equipment (not shown) when such equipment is used with the invention.

Welding system 10 is shown with an I-beam 56 and stiffener plates 58, with the I-beam 56 horizontally supported on a pair of supports or "saw horses" 60a, 60b in a manner common for structural steel fabricators. Since the invention allows very rapid installation of stiffeners 58 onto I-beams 60, as described in more detail below, a plurality of additional horizontally-supported I-beams (not shown) are generally positioned adjacent articulating boom 20 for rapid welding.

As shown in FIG. 1, spool 28 is relatively small, and would be suitable for small welding operations. Spool 28 may alternatively be much larger, and positioned on shop floor 44, with wire from the spool, wheel or drum being unwound and directed along articulating boom 20 via a plurality of eyelets or a wire guiding tube (not shown). In this manner it is not necessary for an operator to frequently exchange spool 28 on boom 20 when spool 28 has run out of welding wire. When spool 28 is located external to boom 20, the welding wire from spool 28 would generally be directed along the length of boom 20 towards welding fixture 12 and welding torch 14. The welding system 10 may additionally include means for preventing bending of welding wire due to the motion of boom 20. The bending prevention means preferably comprises an articulating assembly of linked pieces (not shown) located adjacent each pivot point 24a, 24b along boom. The articulating assembly defines a welding wire channel extending through the center of each of the linked pieces. The articulating linked assembly itself can undergo only a limited amount of bending, and thus restricts the motion of the wire and prevents bending thereof due to motion of the segments 22a, 22b of boom 20 about pivot points 24a, 24b. In this manner, welding wire from the external spool is not kinked or damaged during travel along boom.

Referring now to FIG. 2 through FIG. 5, as well as FIG. 1, the welding fixture 12 of the invention generally comprises a pair of movable, opposing welding shoes 62a, 62b which are positioned about a center line or axis 64. Means for positionally adjusting welding shoes 62a, 62b relative to each other and to center line 64 are included with welding fixture 12, and preferably comprise a pair of movable arms 66a, 66b, a right-handed/left-handed threaded positioning screw 68 (FIG. 4) which is rotatably mounted on fixture 12 via screw housing 70, and a hand-actuated wheel 72 joined to positioning screw 68. Movable arm 66a is threadedly associated with the left-handed threaded portion 74a of positioning screw 68 via screw block 75a, and movable arm 66b is likewise threadedly associated with right-hand threaded portion 74b of positioning screw 68 via screw block 75b. Movable arms 66a, 66b extend through a slot (not shown) in the bottom of screw housing 70. Rotation of wheel 72 and positioning screw 68 in one direction results in symmetrically opening or drawing apart of movable arms 66a, 66b and welding shoes 62a, 62b relative to center line 64, and rotation of wheel 72 and positioning screw 68 in the opposite direction results in the symmetrical closing or drawing together of movable arms 66a, 66b and welding shoes 62a, 62b relative to center line 64. Welding shoe 62a thus maintains the same distance from center line 64 as welding shoe 62b during positional adjustment of welding shoes 62a, 62b via rotation of wheel 72 and positioning screw 68. A knob 76 preferably is pivotally attached to wheel 72 to facilitate rotation of wheel 72 by an operator. A fixed guide rod 77 within screw housing 70 slidably extends through screw blocks 77a, 77b and keeps movable arms 66a, 66b in a generally parallel relationship during positional adjustment.

Other positional adjustment means for welding shoes 62a, 62b may alternatively be used with the invention. For example, conventional pneumatic or hydraulic cylinders may be used to position welding shoes 62a, 62b relative to center line 64 instead of positioning screw 68 and wheel 72. Preferably the positioning means used for adjusting the position of welding shoes 62a, 62b provides for symmetrical movement of welding shoes 62a, 62b about center line 64, so that the opposing welding shoes 62a, 62b remain generally equidistant from center line 64 during positional adjustment.

Welding fixture 12 includes means for coupling or securing to a workpiece such as I-beam 56. The coupling means preferably comprises one or more clamping or locking screws 78a, 78b which are threadedly associated with front braces 80a, 80b respectively. A pair of back braces 82a, 82b are generally parallel to and spaced apart from front braces 80a, 80b respectively, thus providing opening 84a between front and back braces 80a, 82a, and opening 84b between front and back braces 80b, 82b. Openings 84a, 84b are structured and configured to receive a workpiece or portion of a workpiece such as flange 86a (FIG. 5) of I-beam 56. When flange 86 or other workpiece is positioned within openings 84a, 84b, locking screws 78a, 78b are rotated via knobs 88a, 88b to tighten or secure flange 86a between front braces 80a, 80b and back braces 82a, 82b, thus securing welding fixture 12 to the workpiece, with braces 80a, 80b, 82a, 82b generally parallel to flange 86a and perpendicular to web 89 of I-beam.

Preferably a plurality of leveling or perch screws 90 are included in back braces 82a, 82b to allow careful positioning of welding fixture 12 with respect to the attached workpiece. Preferably, there are four perch screws 90, with two screws 90 vertically spaced apart from each other on each of the back braces 82a, 82b. This arrangement allows adjustment of the vertical orientation or angle of welding fixture 12 with respect to the attached workpiece, as well as positional adjustment of the welding fixture 12 in generally forward and backward directions with respect to the attached workpiece. Perch screws 90, together with locking screws 78a, 78b, allow precise adjustment of the contact pressure and alignment of fixture 12 with respect to flange 86a. By extending perch screws 90 inward through back braces 82a, 82b, copper welding shoes 62a, 62b are moved away from flange 86a. If the upper perch screws 90 are turned inward further than the lower perch screws 90, the upper ends of copper shoes 62a, 62b will be tilted closer to flange 86a. Likewise, if the lower perch screws 90 are turned inward further than the upper perch screws 90, the lower ends of copper welding shoes 62a, 62b will be tilted towards flange 86a. The perch screws 90 thus allow an operator to account for variations in mill tolerances for each individual I-beam or other workpiece, and provide for accurate positioning of welding fixture 12.

Other conventional coupling means may be used in place of locking screws 78a, 78b and braces 80a, 80b, 82a, 82b, including pneumatic, hydraulic or spring-actuated clamps or couplers. The coupling means of the welding fixture 12 are shown as structured and configured to secure to the flange 86a or 86b of a conventional I-beam 56. While two locking screws 78a, 78b are shown, it is contemplated that a single locking screw or additional locking screws may alternatively be used as the coupling means for welding fixture 12. Various other standard coupling means of varying structure and configuration will suggest themselves to those skilled in the art, and are also contemplated as being within the scope of this disclosure.

Means for supporting oscillator 14 are included with welding fixture 12, and preferably comprise a bracket 92 which is joined to a back member 94. Oscillator 14 is releasibly joined to bracket 92 by screws (not shown), or by other convention coupling means. Oscillator control module 48 is also preferably attached to bracket 94 by screws (not shown) or like conventional hardware. Welding torch 14 is supported on welding fixture 12 by oscillator 14, and a guide tube 96 is supported by welding torch 14, as described further below. Guide tube 96 is generally parallel to and adjacent to center line 64 between welding shoes 62a, 62b, and preferably is juxtapositioned over center line 64 such that center line 64 runs generally down the center of guide tube 96. Handles 98a, 98b are preferably included on welding fixture 12 to facilitate handling by an operator. A pair of stepped hangers or claws 100a, 100b are also preferablyly included on welding fixture 12 to allow fixture 12 to be temporarily "hung" or supported on flange 86a, 86b or like workpiece in a convenient fashion when not in use. The stepped configuration of hangar claws 100a, 100b accommodate various workpieces of differing thickness.

Welding fixture 12 is preferably light weight and portable, and can be easily handled by a single person. Preferably, braces 80a, 80b, 82a, 82b, bracket 92, back member 94, handles 98a, 98b, and hangar claws 100a, 100b are integral to each other and made of aluminum or other light weigh, heat resistant durable, corrosion-resistant material. Screw housing 70 and movable arms 66a, 66b are likewise preferably made of aluminum or other lightweight, durable material. Welding fixture may be suspended from the end 34 of articulating boom 20 by a chain or cable (not shown) of suitable length to allow easy handling of welding fixture 12.

Figure 6:
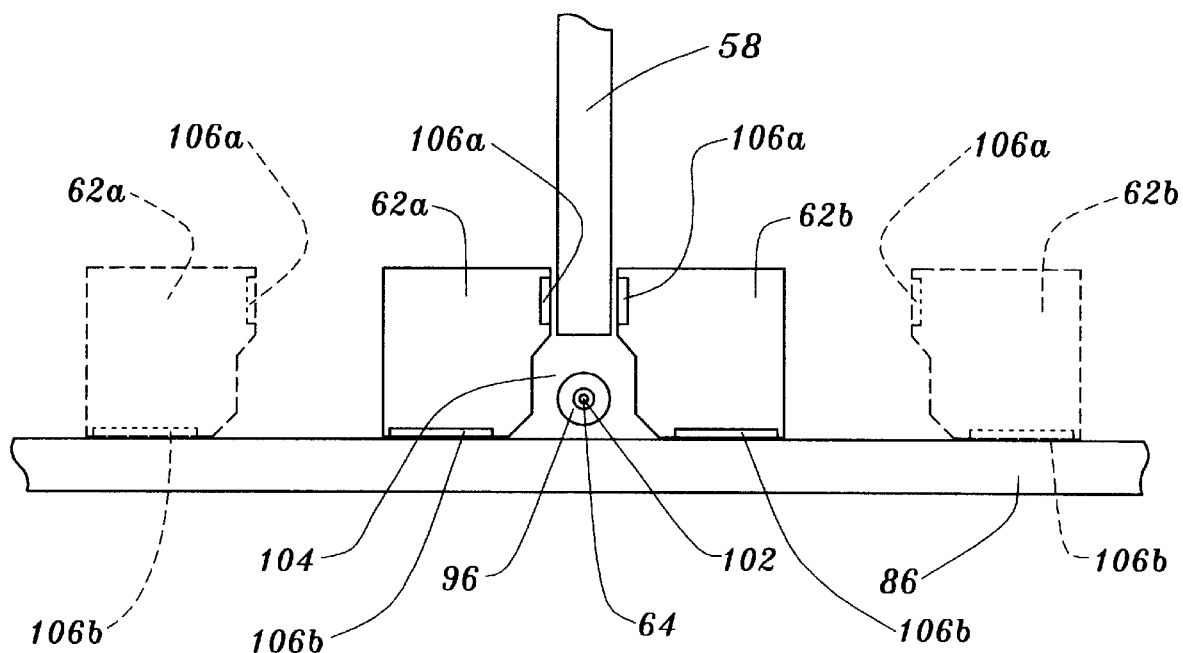
FIG. 6 is a schematic top view of the welding shoes of the welding fixture shown positioned about a centerline, together with a guide tube, I-beam flange and stiffener plate.

Referring more particularly to FIG. 6, as well as FIG. 2 through FIG. 5, welding shoes 62a, 62b are schematically shown as symmetrically positioned about center line 64, guide tube 96, and a welding wire 102 extending through guide tube 96 along center line 64. The welding fixture 12, which is attached to flange 86, is omitted from FIG. 6 for clarity, with the exception of welding shoes 62a, 62b. As related above, welding shoes 62a, 62b preferably remain equidistant from center line 64 during positional adjustment. When welding shoes 62a, 62b are positioned adjacent stiffener plate 58 and flange 86a as shown in FIG. 6, a vertical welding cavity or channel 104 is generally defined, with center line 64 and guide tube 96 positioned generally near the center of welding cavity 104. During welding operations with the invention, welding cavity 104 is filled with molten metal provided by welding wire 102 and guide tube 96, which are consumed during welding. When welding is completed, welding shoes 62a, 62b are drawn apart by turning wheel 72 and positioning screw 68 to leave a completed weld joining stiffener 58 to flange 86a. The opened or drawn apart positions of welding shoes 62a, 62b are shown in dashed lines.

Welding shoes 62a, 62b are structured and configured to receive cooling water (or air), and generally include inlet and outlet ports (not shown) for cooling water, as well as internal circulation passages (not shown) for the cooling water. The cooling water is delivered by water supply hoses (not shown) with suitable hardware for attaching to the inlets on welding shoes 62a, 62b. Outlet hoses (not shown) likewise connect to the outlet ports on welding shoes 62a, 62b to remove the cooling water after circulation through welding shoes 62a, 62b.

Welding shoes 62a, 62b and movable arms 66a, 66b are shown as structured and configured for "T"-welding operations such as the welding of stiffener plate 58 to flange 86. Welding shoes 62a, 62b and movable arms 66a, 66b may alternatively be structured and configured for "butt-welding" or other types of welding operations, as described further below.

Welding shoes 62a, 62b are preferably made of copper or like metal and may be cast or machined into desired shapes or configurations for particular welding operations. Preferably, welding shoes 62a, 62b are water or air cooled, and include internal channels (not shown) for conducting cooling air or water, and include suitable hardware (not shown) for attachment of water or air supply lines. An electrically and/or thermally insulating coating 106 is preferably included on at least one face of each welding shoe 62a, 62b adjacent guide tube 96 to ensure that guide tube 96 does not come into electrical contact with welding shoes 62a, 62b. Background art electroslag welding methods are prone to the risk of an electrical short due to inadvertent contact of the guide tube with a welding shoe during welding, which interrupts the welding operation and destroys the contacted welding shoe. The present invention avoids this problem by providing insulating coating 106 on welding shoes 62a, 62b. Insulating coating 106 is preferably made of ceramic material, and is both electrically resistant and thermally stable at welding temperatures. A variety of insulating coatings, including silicate or $SiO_2$ may be used for insulating coating 106, and coating 106 may be placed on shoes 62a, 62b by a variety of conventional means, including sputter coating or sol-gel techniques. Insulated coating 106 also prevents overcooling of the weld parent material of stiffener plate 58 and flange 86, and provides better blending between the weld bead and parent material during welding.

The welding wire 102 used with welding system preferably comprises between approximately 0.0001% and approximately 0.05% of boron, and/or between approximately 0.001% and approximately 0.10% of nickel. The inclusion of boron and/or nickel in welding wire 102 is carried out with standard metallurgical techniques well known to those of ordinary skill in the art. The boron included in the composition of welding wire 102 provides increased weld strength relative to welds made with conventional welding wire compositions.

Figure 7:
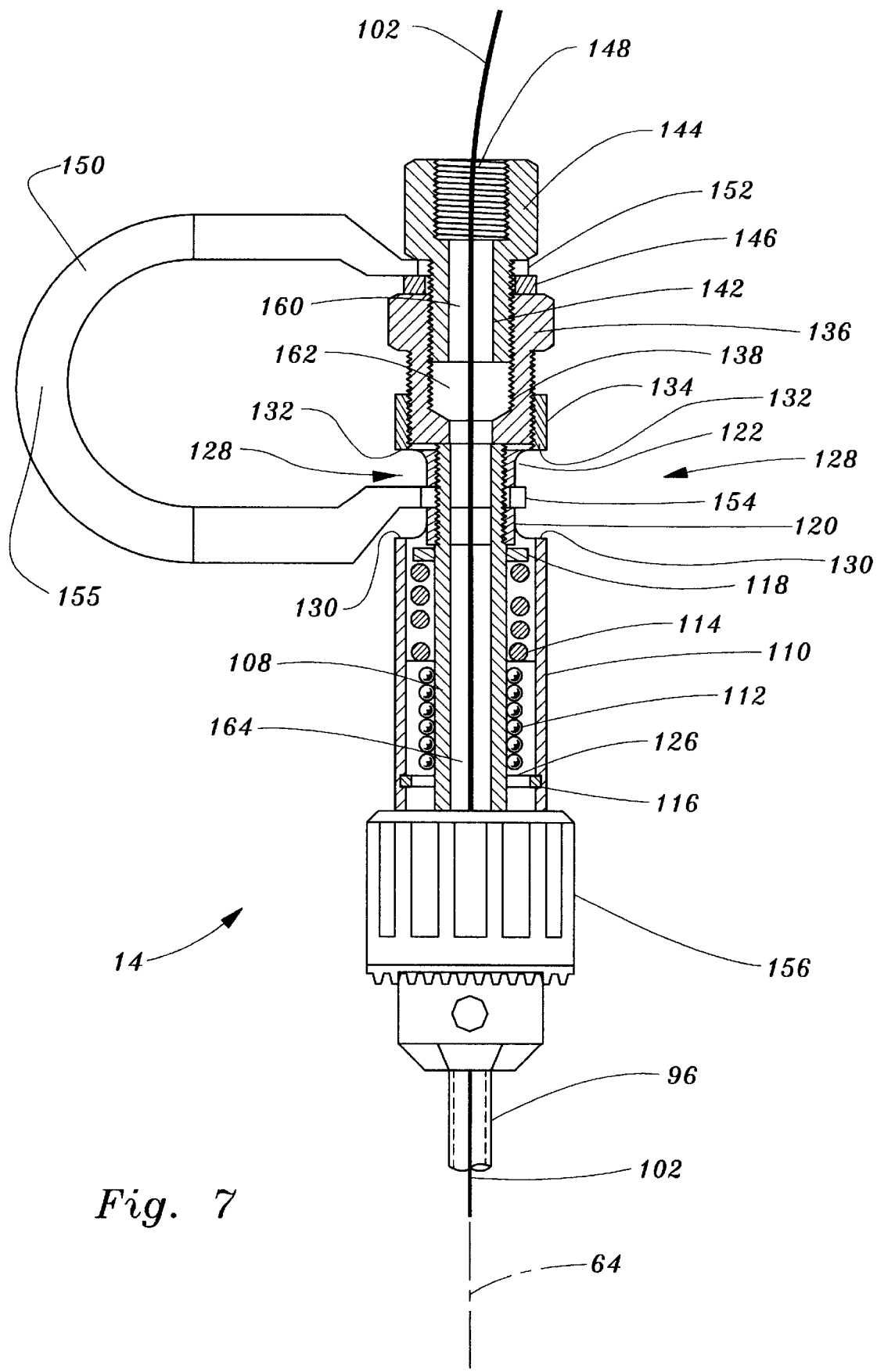
FIG. 7 is a side view of the welding torch of FIG. 2 shown in partial cross section through line 7—7.
Figure 8:
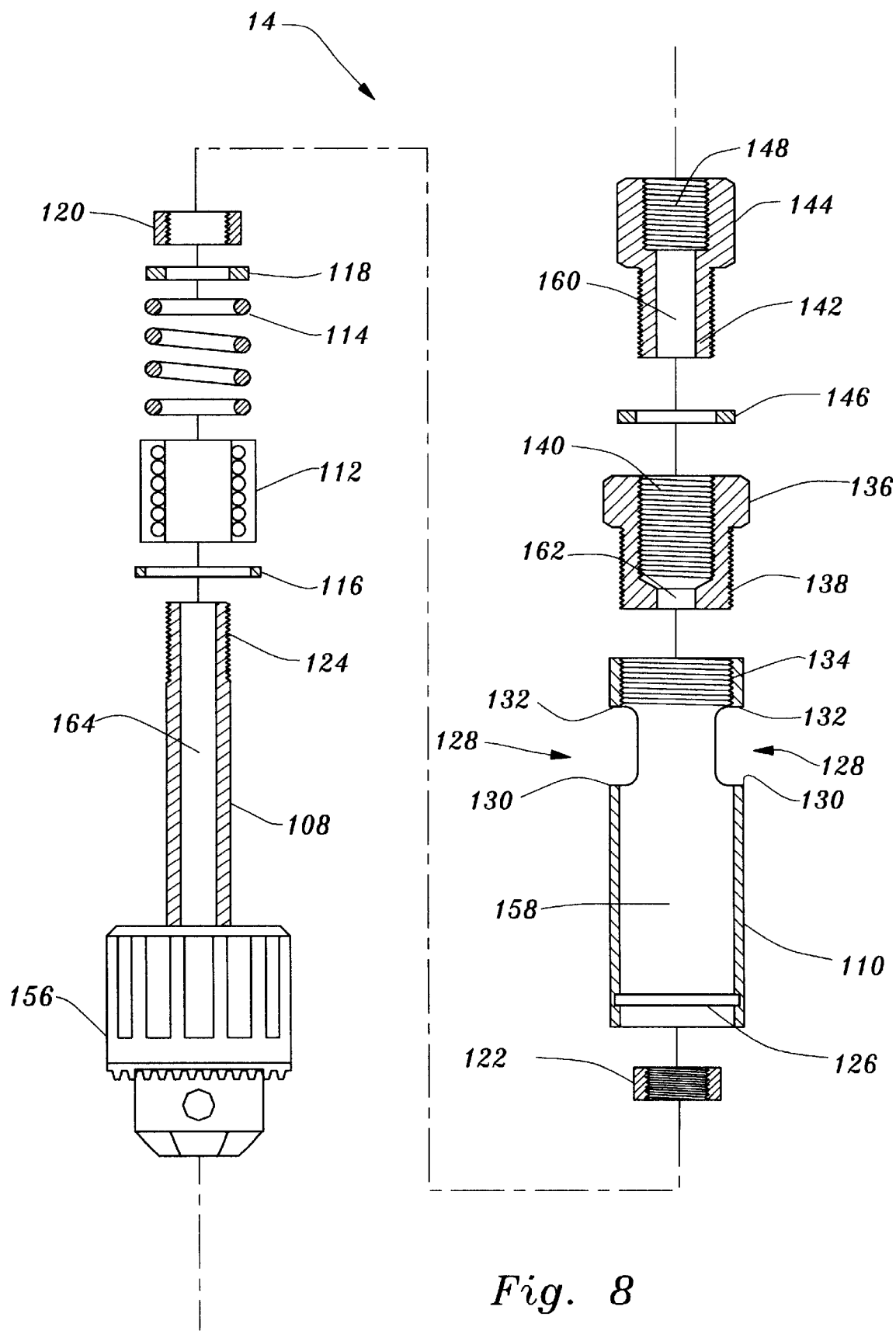
FIG. 8 is a cross-sectional exploded view of the welding torch of FIG. 7, shown without the flexible conductor.

Referring now to FIG. 7 and FIG. 8, the preferred welding torch 14 of the invention is generally shown. Welding torch 14 includes means for preventing interruption of welding operations due to a welding wire from fusing to the end of a guide tube during welding. Welding torch 14 generally includes a central tube 108 which is slidably mounted within an outer tube 110. Preferably, one or more linear bearings 112 are included with welding torch 14 to facilitate sliding motion of central tube 108 within outer tube 110. Means for providing a bias to central tube 108 are furnished by a spring 114. Preferably, spring 114 and linear bearing 112 are held in place on central tube 108 by means of retainer ring 116, washer 118 and nuts 120, 122 which threadedly engage a threaded end portion 124 (FIG. 8) of central tube 108. Outer tube 110 includes an annular interior groove 126 which holds retainer ring 116. Outer tube 110 also includes a pair of openings or slots 128, each of which has a lower shoulder 130 and an upper shoulder 132. Outer tube 110 also includes a threaded socket 134.

An inner welding wire input adapter 136 includes a threaded male portion 138 which engages socket 134 on outer tube 110. Inner wire input adapter 136 includes a threaded socket 140 (FIG. 8) which receives the threaded male portion 142 of an outer wire input adapter 144. A washer 146 is included between inner and outer wire input adapters 136, 144. A threaded socket 148 in outer wire input adapter 144 can receive the threaded end of a wire input tube (not shown) which communicates with rotary straight wire feeder assembly 18 or conventional wire feeder 32 (FIG. 1). A flexible, U-shaped conductor 150 includes a first eyelet 152 which receives male portion 142 of outer wire input adapter and which is held between outer and inner wire input adapters 136, 144 adjacent washer 146. Flexible conductor 150 also includes a second eyelet 154 which is coupled to the threaded end 124 of central tube 108 between nuts 120, 122. An insulating coating 155 on flexible conductor 150 prevents shorting in case of inadvertent contact during welding operations. Slots 128 in outer tube 110 slidably accommodate eyelet 152. Means for holding a guide tube are included on central tube 108, preferably in the form of a conventional chuck 156 which can be tightened and loosened in a standard fashion to accommodate guide tube 96. Guide tube 96 is shown for clarity as having a conventional cylindrical structure and configuration. However, a "winged" guide tube, which is described further below, is preferably used with the invention.

Central tube 108, together with the assembled linear bearing 112, spring 114, washer 118 and nuts 120, 122 fit within the hollow interior 158 of outer tube 110, with linear bearing 112, spring 114 generally held between retaining ring 116 and washer 118. Wire input adapters 136, 144 include internal bores 160, 162 respectively, through which a welding wire 102 fits. The welding wire extends downward through the bore 164 of central tube and through chuck 156 and guide tube 96 to the point of welding contact (not shown). Spring 114 exerts a generally upward bias against central tube 108 with respect to outer tube 110 so that the upper end 124 of central tube 108 is generally held against the end 130 of input adapter 136 by spring 114. When a sufficient downward force is applied to guide tube 96, and thus to central tube 108 via chuck 156, the bias of spring 114 can be overcome, and central tube 108 then slides downward within outer tube 110 until eyelet 152 of flexible conductor 150, which is coupled to the end 124 of central tube by nuts 120, 122, comes into contact with lower shoulder 130 on outer tube 110. This downward motion of inner or central tube 108 results in dipping the end of guide tube 96 into the molten weld puddle. The heat generated by the molten puddle melts off the end of the guide tube and frees the welding wire 102 from the end of guide tube 96. When melted free, wire 102 can continue to feed into the weld. When the downward force is removed, spring 114 rebounds towards its relaxed position, causing guide tube 96 and central tube 108 to move upward, allowing the weld to continue. Flexible conductor 150 maintains electrical contact with central tube 108 throughout the sliding motion of central tube 108.

During welding operations, a welding power supply cable (not shown) is coupled to welding torch 14, preferably by clamping the end of the cable between inner and outer input adapters 136, 144. Power is conducted to guide tube 96 via central tube 108 and flexible conductor 150. Welding wire 102 is generally fed through welding torch 14 by a wire feeder (not shown) and is consumed at the welding site at a generally constant rate. The wire feeder provides a downward force to the welding wire 102 as the wire 102 travels through welding torch 14. If, during a welding operation, welding wire 102 sticks or fuses to the inside of guide tube 96 due to the heat of the molten weld puddle (not shown), the downward force exerted by the wire feeder on welding wire 102 is transferred to guide tube 96, and hence to central tube 108, which is coupled to guide tube 96 by chuck 156. Since central tube 108 is slidably mounted within outer tube 110, central tube 108 slidably moves downward within outer tube 110 under the force of the wire feeder, allowing guide tube 96 to move downward into the molten weld puddle, where the heat of the weld causes the welding wire to unfuse from the guide tube 96. Upon unfusing, the downward force of the wire feeder is again transferred back to the welding wire 102, allowing guide tube 96 and central tube 108 to spring back upward under the action of spring 114 so that the end of guide tube 96 is above the weld puddle, and welding wire 102 can continue feeding through welding torch 14 to the weld site. Flexible conductor 150 maintains electrical contact between input adapters 136, 144 and central tube 108 and guide tube 96. The welding torch 14 of the invention thus allows the welding operation to continue without interruption due to fusing of welding wire 102 to guide tube 96.

In conventional electroslag welding, when the molten weld puddle causes the welding wire to fuse to the bottom of the guide tube, the entire welding operation must be interrupted, the weld is stopped, and the weld area must be cleaned or ground down, and a new weld start must be set up. The interruption of an electroslag weld in such a manner requires expensive and time consuming cleanup of the incomplete weld followed by resetup and starting the weld operation over again. The welding torch 14 of the present invention overcomes this problem however, since spring 114 and the sliding relationship of central tube 108 and outer tube 110 provide means for preventing interruption of welding due to welding wire 102 remaining fused or stuck to guide tube 96. By allowing the force applied to welding wire 102 by a wire feeder to push guide tube 96 back down into the weld puddle as described above, welding wire 102 and guide tube 96 quickly melt apart, preventing interrupting the welding operation.

Other means may be used with the invention for preventing welding wire 102 from remaining fused to guide tube 96 in a manner which can interrupt a welding operation. Pneumatic or hydraulic bias means, or other bias means may be used instead of spring 114 to provide a bias to central tube 108. In an alternative arrangement, central tube 108 can remain fixed, while outer tube 110 is upwardly biased and slidably moves with respect to central tube 108. The important feature of the means for preventing welding wire 102 from sticking to guide tube 96 is that guide tube 96 be movably mounted on welding torch 14 and suitably biased such that, in the event welding wire 102 sticks or fuses to the inside of guide tube 96 as described above, the downward force exerted by the wire feeder on welding wire 102 is transferred to guide tube 96 and causes guide tube 96 to move downward into the molten weld puddle where the heat will unfuse wire 102 from the guide tube 96 and allow guide tube 96 to spring back upward so that welding wire 102 can continue feeding through welding torch 14 to the weld site without significant interruption.

Referring also to FIG. 2 through FIG. 5, as well as FIG. 7 and FIG. 8, welding torch 14 includes a coupler 166 which releasibly engages welding torch 14. Coupler is attached to a swivel block 168 which allows welding torch to undergo positional adjustment in a swivel-fashion. Swivel block 168 is coupled to a base plate 170, which in turn is coupled to the front or top plate 172 of oscillator 16 by bolts 174. Guide tube 96 is shown as generally parallel to or co-linear with center line 64. Positional adjustment of welding torch 14 via swivel block 168 away from the orientation shown results in moving guide tube to positions which are not parallel to center line 64. Such orientations for welding torch 14 and guide tube 96 are advantageous in certain welding operations.

As discussed further below, the rotary wire feeder/ straightener assembly 18 of the invention allows two welding wires to be simultaneously straightened and fed to welding torch 14. Welding torch 14 thus may alternatively be structured and configured to allow dual wire welding wherein two welding wires 102 are simultaneously accommodated by welding torch 14. In this regard, central tube 108 and wire input adapters 136, 144 would be bifurcated to accommodate two wires 102, and chuck 156 would be structured and configured to hold two guide tubes 96 for the welding wires 102. Thus arrangement allows deposition of weld metal at higher rates than can be achieved with a single welding wire and guide tube.

Figure 9:
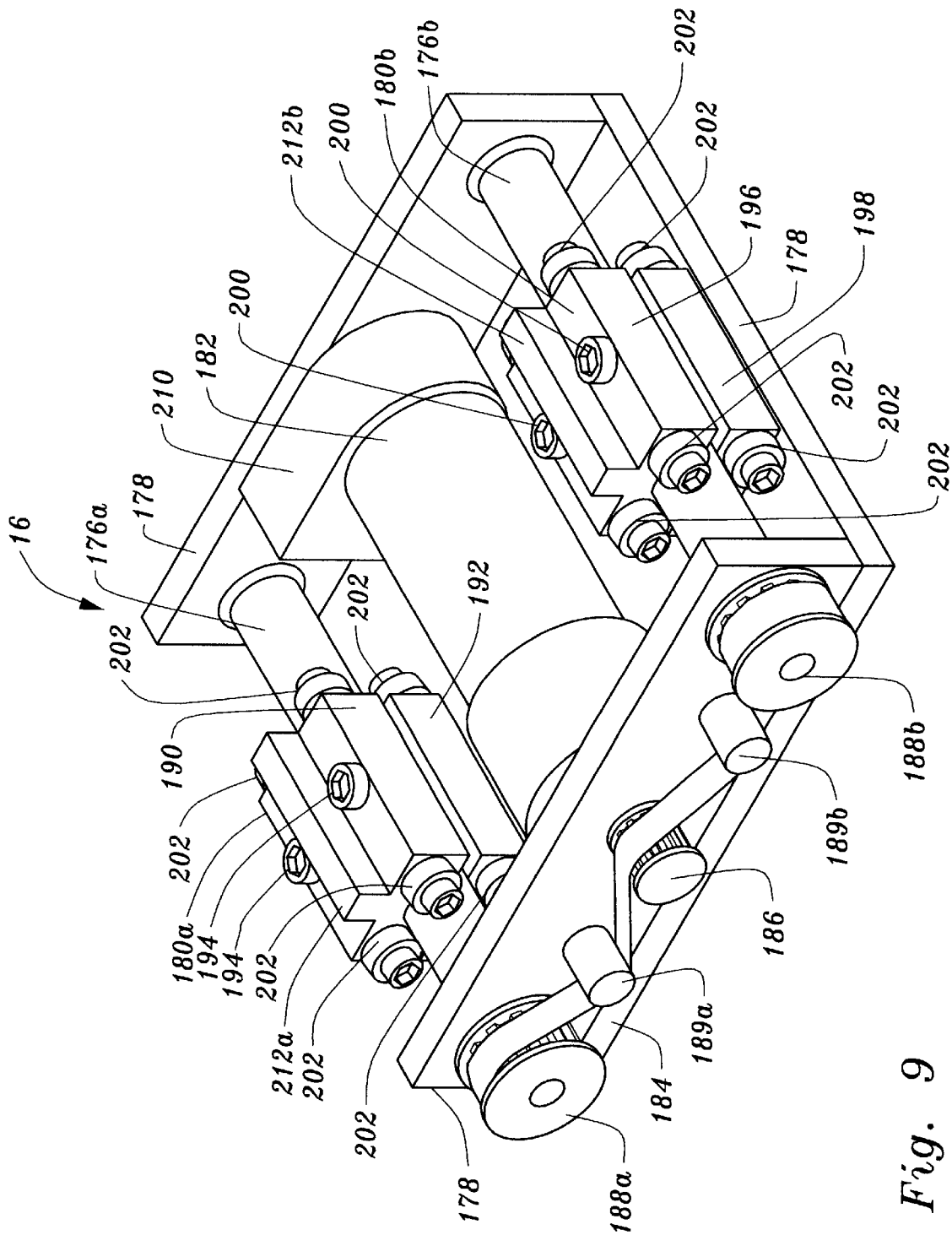
FIG. 9 is a perspective view of an oscillator in accordance with the present invention, shown with the top plate and portions of the housing removed.
Figure 10:
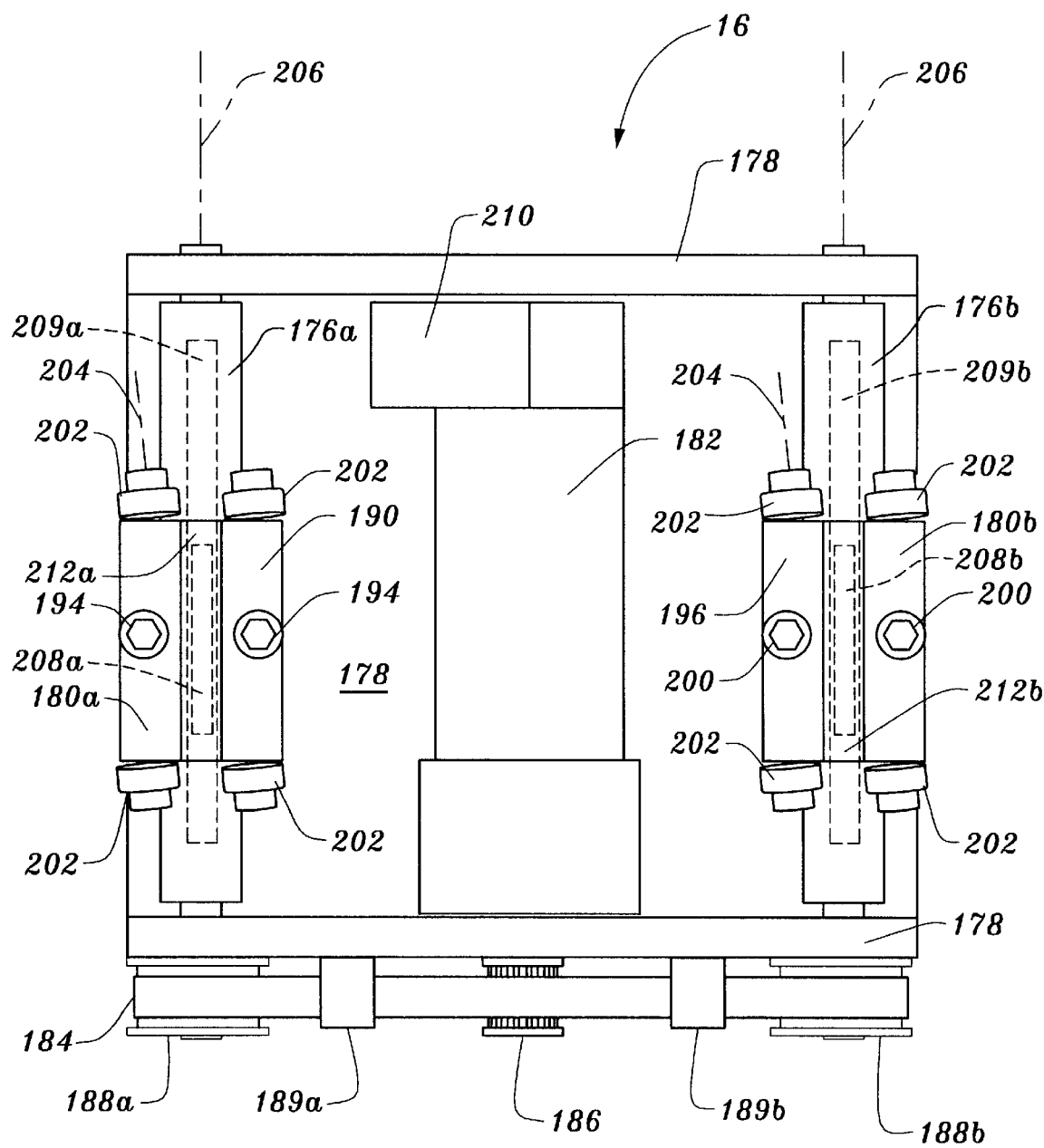
FIG. 10 is a top plan view of the oscillator of FIG. 9.

Referring now to FIG. 9 and FIG. 10, as well as FIG. 2 through FIG. 5, an oscillator 16 in accordance with the present invention is generally shown. Oscillator 16 is used to oscillate or reciprocate welding torch 14 and guide tube 96 during welding operations. Oscillator 16 generally comprises a pair of elongated, parallel shafts 176a, 176b which are rotatably mounted in a housing 178, and a pair of linear actuators 180a, 180b movably mounted on rotating shafts 176a, 176b respectively and which travel along shafts 176a, 176b as the shafts rotate. Means for rotatably driving shafts 176a, 176b are provided with oscillator 16, and preferably comprise motor 182, a geared belt 184, and a plurality of gears or geared pulleys 186, 188a, 188b. Motor 182 is electrically driven by an external power source (not shown), and motor 182 turns gear 186 which drives belt 184, which in turn drives gears 188a 188b. Shafts 176a, 176b extend through housing 178 and are joined to gears 188a, 188b respectively. Pulleys 189a, 189b are rotatably mounted in housing 178 and provide tension to geared belt 184. Numerous other drive means and arrangements of belt 184 and gears 186, 188a, 188b may alternatively be used with oscillator 16. Gears 186, 188a, 188b and belt 184 are structured and configured so that motor 182 rotates shafts 176a, 176b at generally the same rotational rate.

Linear actuator 180a preferably includes an upper portion 190 and a lower portion 192 which are joined together about shaft 176a by bolts 194 so that linear actuator 180 is slidably mounted on shaft 176a. Linear actuator 180b likewise preferably includes upper and lower portions 196, 198 which are joined together about shaft 176b by means of bolts 200 such that linear actuator 180b is slidably mounted on shaft 176b. Each linear actuator 180a, 180b includes a plurality of canted or angled bearings 202 which are rotatably mounted on linear actuators 180a, 180b. Preferably, there are eight canted bearings 202 on each linear actuator 180a, 180b, with four canted bearings 202 on upper portion 190, and four canted bearings 202 on lower portion 192 of drive block 180a. Likewise, four canted bearings 202 are located respectively on each of the halves 196, 198 of drive block 180b. Canted bearings 202 are generally spaced about the circumference of each shaft 176a, 176b on the ends of linear actuators 180a, 180b as seen most clearly in FIG. 9. Canted bearings 202 are in intimate contact with shafts 176a, 176b such that, when shafts 176a, 176b rotate, canted bearings 202 will also rotate under the action of shafts 176a, 176b. Canted bearings 202 are structured, configured and positioned such that they are angled or tilted with respect to shafts 176a, 176b, as can be seen most clearly in FIG. 9, so that rotation of shafts 176a, 176b causes linear actuators 180a, 180b respectively to travel or crawl longitudinally along shafts 176a, 176b under the action of canted bearings 202. When the direction of rotation of shafts 176a, 176b is reversed, the direction of travel of linear actuators 180a, 180b is reversed. The angle of offset of each canted bearing 202 relative to the rotational axes of shafts 176a, 176b is preferably the same. The angle of offset of the rotational axes 204 of canted bearings 202 with respect to the rotational axes 206a, 206b of shafts 176a, 176b is preferably within the range of between approximately one degree and forty five degrees. However, this offset angle may be varied as desired. When the offset angle of the rotational axes 204 of canted bearings 202 is increased with respect to the rotational axes 206a, 206b of shafts 176a, 176b, the greater the distanced traveled by linear actuators 180a, 180b per rotation of shafts 176a, 176b, and decreasing the angle of offset of canted bearings 202 correspondingly decreases the distance traveled by linear actuators 180a, 180b.

Means for sensing distance traveled by linear actuators 180a, 180b as shafts 176a, 176b rotate are provided with oscillator 16. Referring particularly to FIG. 10, the sensing means preferably comprise optical sensors 208a, 208b mounted on the lower surface of linear actuators 180a, 180b respectively. The sensing means also preferably includes a pair of linear encoder strips 209a, 209b which are positioned beneath shafts 176a, 176b and linear actuators 180a, 180b and positioned so that optical sensors 208a, 208b can detect positional indicia (not shown) on linear encoder strips 209a, 209b. Encoders 208a, 208b optically detect the position of linear actuators 180a, 180b by monitoring linear encoder strips 209a, 209b, and then communicate the positional information to oscillator controller 48 (FIG. 2) via wire or other communication interface (not shown). While oscillator 16 is shown with dual optical encoders 208a, 208b and dual linear encoder strips 209a, 209b, oscillator 16 may employ only one optical sensor 208a or 208b and one linear encoder 209a or 209b, if desired, with the single optical sensor and linear encoder employed with either linear actuator 180a, 180b.

The means for sensing distance traveled by linear actuators 180a, 180b also preferably comprises a rotational encoder 210 associated with motor 182, which measures rotation counts of motor 182. Since the rotation of shafts 176a, 176b is directly related to the rotation of motor 182 via belt 184 and gears 186, 188a, 188b, and linear actuators 180a, 180b travel a fixed distance per rotation of each shaft 176a, 176b, the rotational counts provided by encoder can be used to track the motion of linear actuators 180a, 180b. The rotational count pulses of encoder 210 are communicated to oscillator controller 48 (FIG. 2) via wire or like communication link (not shown). It is possible for the motion of linear actuators 180a, 180b to eventually become "out of sync" or un-synchronized with respect to the rotation of motor 182, due to machining imperfections, wear of parts, or other factors. In such a case, the rotational counts generated by encoder 210 would not accurately reflect the motion or distance traveled by linear actuators 180a, 180b as shafts 176a, 176b rotate. Software associated with the control system of the invention is used to resolve discrepancies between motor encoder 210 and optical encoders 208a, 208b and encoder strips 209a, 209b. Optical encoders 208a, 208b and encoder strips 209a, 209b thus provide information to the control system which is used to update information provided by motor encoder 210.

Housing 178 preferably comprises a durable, lightweight material such as aluminum, and housing 178 is structured and configured to protect motor 182, shafts 176a, 176b, linear actuators 180a, 180b and the other components of oscillator from heat and corrosion associated with welding operations. The sheet metal cover top or cover (not shown) of housing 178 is omitted from FIG. 9 and FIG. 10 for clarity. Oscillator 16 also includes a top plate 172 (FIG. 2) which couples to linear actuators 180a, 180b, preferably by means of ridges 212a, 212 on linear actuators 180a, 180b, which engage corresponding slots (not shown) in top plate 172 and are secured to top plate by bolts or screws (not shown). This arrangement allows all of the moving components of oscillator 16 to be sealed inside of protective housing 178 to avoid contamination during welding operations. Welding torch 14 is supported on top plate 172 of oscillator 16 by base plate 170 and swivel block 168. Thus, welding torch 14 moves correspondingly with the movement of linear actuators 180a, 180b. Oscillator is preferably mounted or secured on welding fixture 12 by bracket 92 and bolts or screws (not shown).

In use, oscillator 16 is coupled to welding torch 14, as shown in FIG. 2 through FIG. 6, with shafts 176a, 176b via top plate 172 oriented generally perpendicular to welding torch 14, and oscillator 16 provides an oscillating motion to welding torch 14 by periodically reversing the direction of rotation of motor 182, and thus the direction of rotation of shafts 176a, 176b, the direction of travel of linear actuators 180a, 180b along shafts 176a, 176b, and attached top plate 172 and welding torch 14. The oscillating motion provided by oscillator 16 to welding torch 14 and guide tube 96 facilitates the fabrication of high quality vertical welds. Oscillation is achieved by rotatably driving the shafts 176a, 176b at a selected rate of rotation and periodically reversing the direction of rotation after a selected duration, to provide an oscillating motion to the linear actuators 176a, 176b, and thus to the attached top plate 172 and welding torch 14. The period, amplitude and dwell time of oscillating motion required for particular welding operations are determined by the welding operator and entered into operator control panel 46 of the distributed control system of the invention, as described further below. The control system communicates the oscillator period, amplitude and dwell time information to oscillator control module 48, which controls or directs the operation of motor 182 and monitors motion of linear actuators 180a, 180b via the output of linear encoders 208a, 208b or rotational encoder 210. When linear encoders 208a, 208b indicate to control module 48 that linear actuators 180a, 180b have traveled a predetermined distance in one direction according to the desired oscillation amplitude, controller 48 reverses the direction of motor 182, and thus linear actuators 180a, 180b. The speed of travel of linear actuators 180a, 180b is controlled by the rotational rate of motor 182, which is directed by control module 48 according to instructions from the operator.

Figure 11:
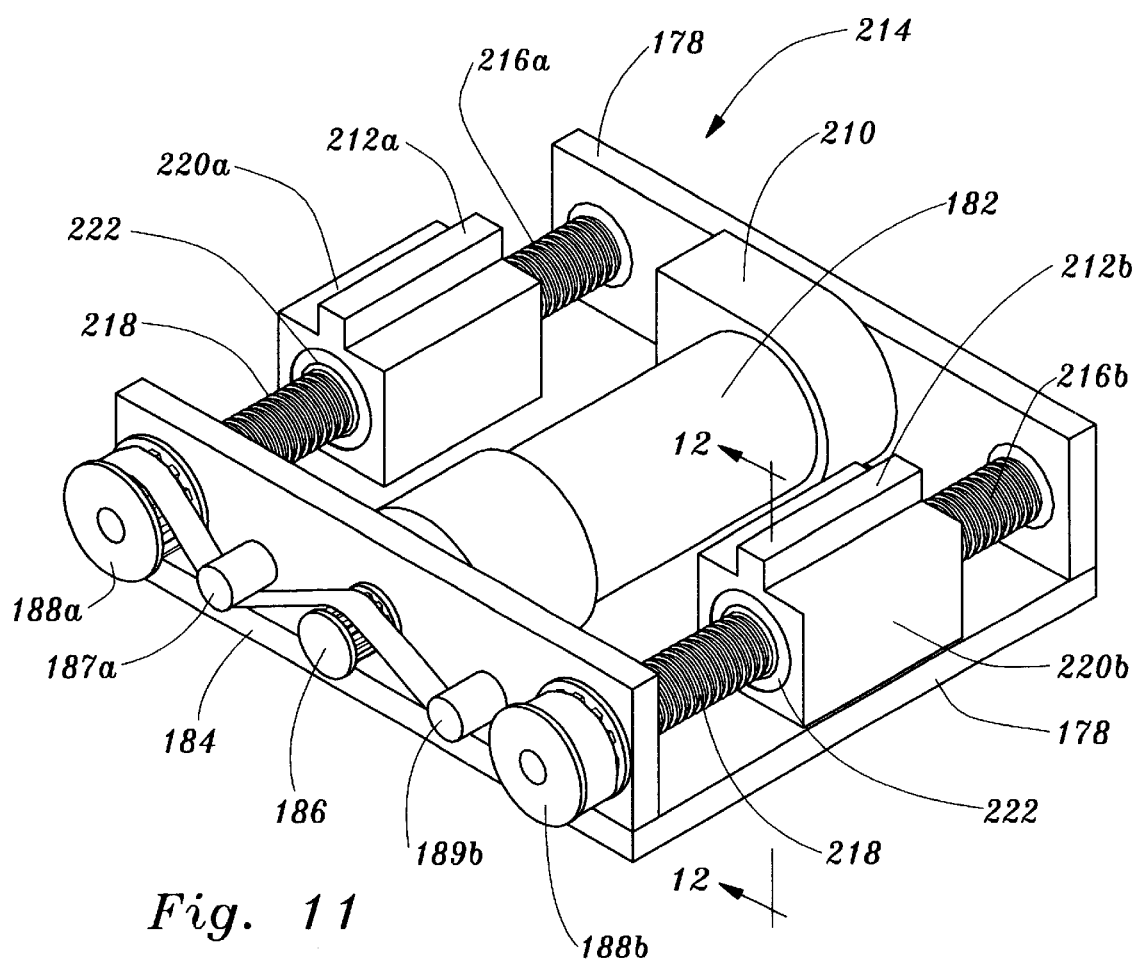
FIG. 11 is a perspective view of an alternative embodiment oscillator shown with the top plate removed.
Figure 12:
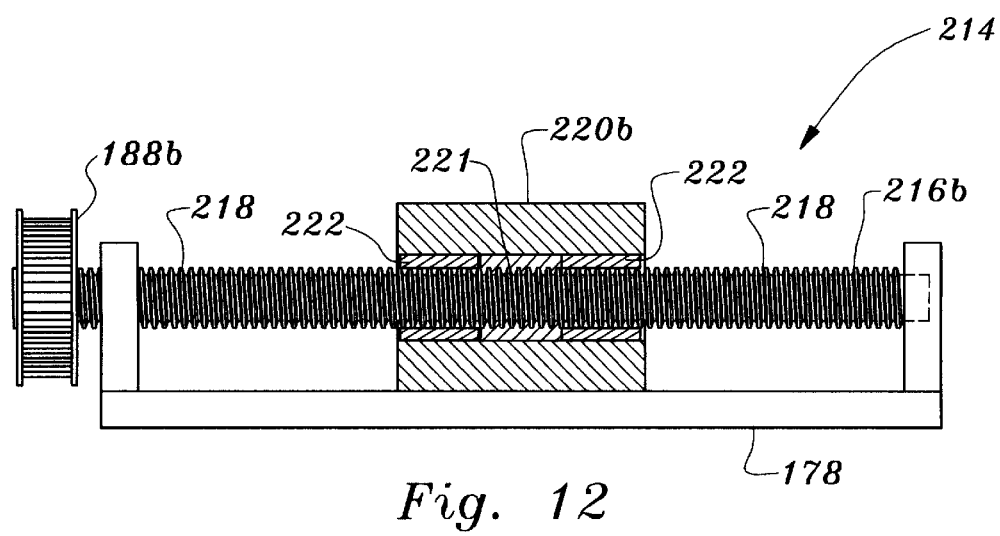
FIG. 12 is a side view of oscillator of FIG. 11 shown in partial cross section through line 12—12.

Referring now to FIG. 11 and FIG. 12, an alternative embodiment oscillator 214 in accordance with the invention is generally shown, wherein like reference numerals denote like parts. In the oscillator 214, the rotating shafts are threaded to provide a pair of lead screws 216a, 216b which are generally elongated and parallel, with each lead screw 216a, 216b including external threading 218. Oscillator further comprises a pair of linear actuators 220a, 220b. Referring more particularly to FIG. 12, linear actuator 220b includes an internally threaded plastic nut 221 located between needle bearings 222. Linear actuator 220a includes a corresponding plastic nut (not shown) which is held within linear actuator 220a between needle bearings 222. The internal threading of plastic nuts 221 generally matches the external threading 218 of lead screws 216a, 216b. The threaded relationship of lead screws 216a, 216b and threaded plastic nuts 221 within linear actuators 220a, 220b causes linear actuators 220a, 220b to travel longitudinally along lead screws 216a, 216b when lead screws 216a, 216b undergo rotation, and thus causes linear actuators 220a, 220b to reverse their direction of travel when the direction of rotation of lead screws 216a, 216b is reversed. Lead screws 216a, 216b are precision ground to provide a flat surface on the outer race of the lead screws 216a, 216b, which allows a bearing fit so that that the needle bearings 222 can ride on the outer surface of each lead screw 216*a*, 216*b*. This arrangement allows the needle bearings to carry a much heavier load than the plastic nuts 221 could themselves.

The threaded relationship of lead screws 216*a*, 216*b* and threaded plastic nuts 221 of linear actuators 220*a*, 220*b* generally keeps the travel of linear actuators 220*a*, 220*b* synchronized with the rotation of motor 182, and thus rotational encoder 210 alone can adequately track motion of linear actuators 220*a*, 220*b*, and optical encoders are generally not required to provide position update information. In all other respects, oscillator 214 operates in generally the same manner as oscillator 16 as described above.

Referring now to FIG. 13 through FIG. 19, a rotary wire feeder straightener assembly 18 in accordance with the invention is shown. Assembly 18 includes a pair of generally identical rotary straight wire feeders 224*a*, 224*b* which are rotatably mounted in housing 225. A drive motor 226 is included within housing 225 and is positioned between rotary straight wire feeders 224*a*, 224*b*. Drive motor 226 rotates gear 227, which drives gears 228*a*, 228*b* via toothed belts 230*a*, 230*b*. Gears 230*a*, 230*b* are coupled respectively to rotary straight wire feeders 224*a*, 224*b* to rotatably drive rotary straight wire feeders 224*a*, 224*b*. A connector 231 on motor 226 allows connection to an interface cable (not shown) which communicates with the wire feeder control module 50 (FIG. 1). A rotational encoder (not shown) may be included with motor 226 to monitor rotational counts of motor 226 and communicate motor rotation counts to the control system of the invention. Rotary straight wire feeders 224*a*, 224*b* each include a rotator body 232 and an input shaft 234 and output shaft 236 joined to body 232. Input and output shafts 234, 236 are rotatably mounted in housing 225, with gear 227 coupled to the end of output shaft 234.

Figure 14:
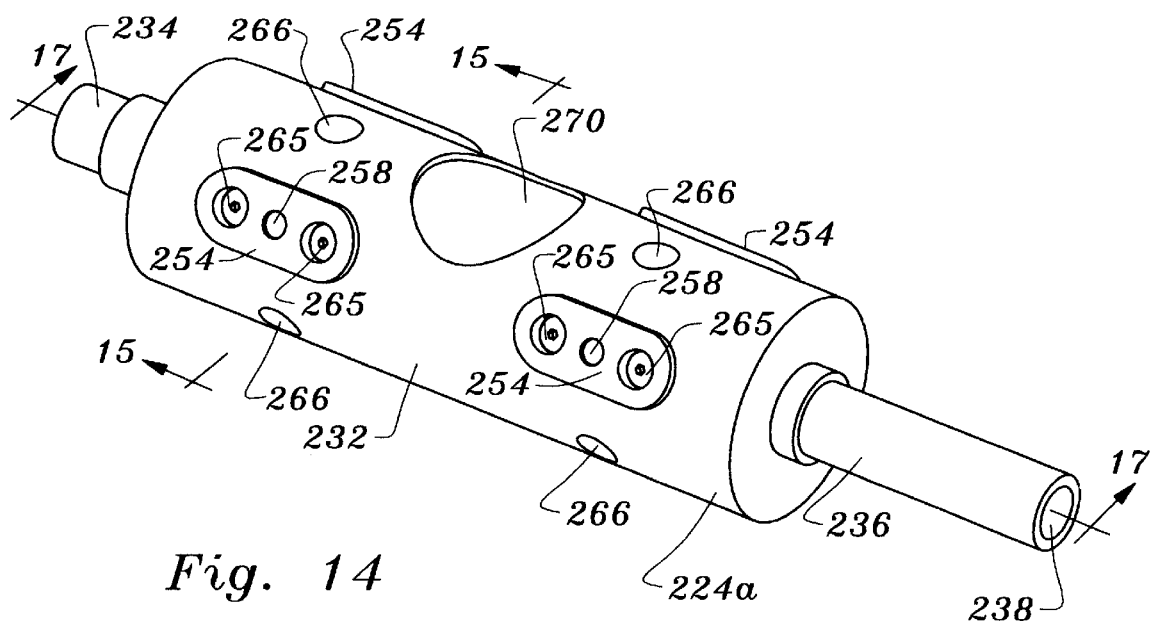
FIG. 14 is a perspective view of one of the rotary straight wire feeders of FIG. 13.
Figure 13:
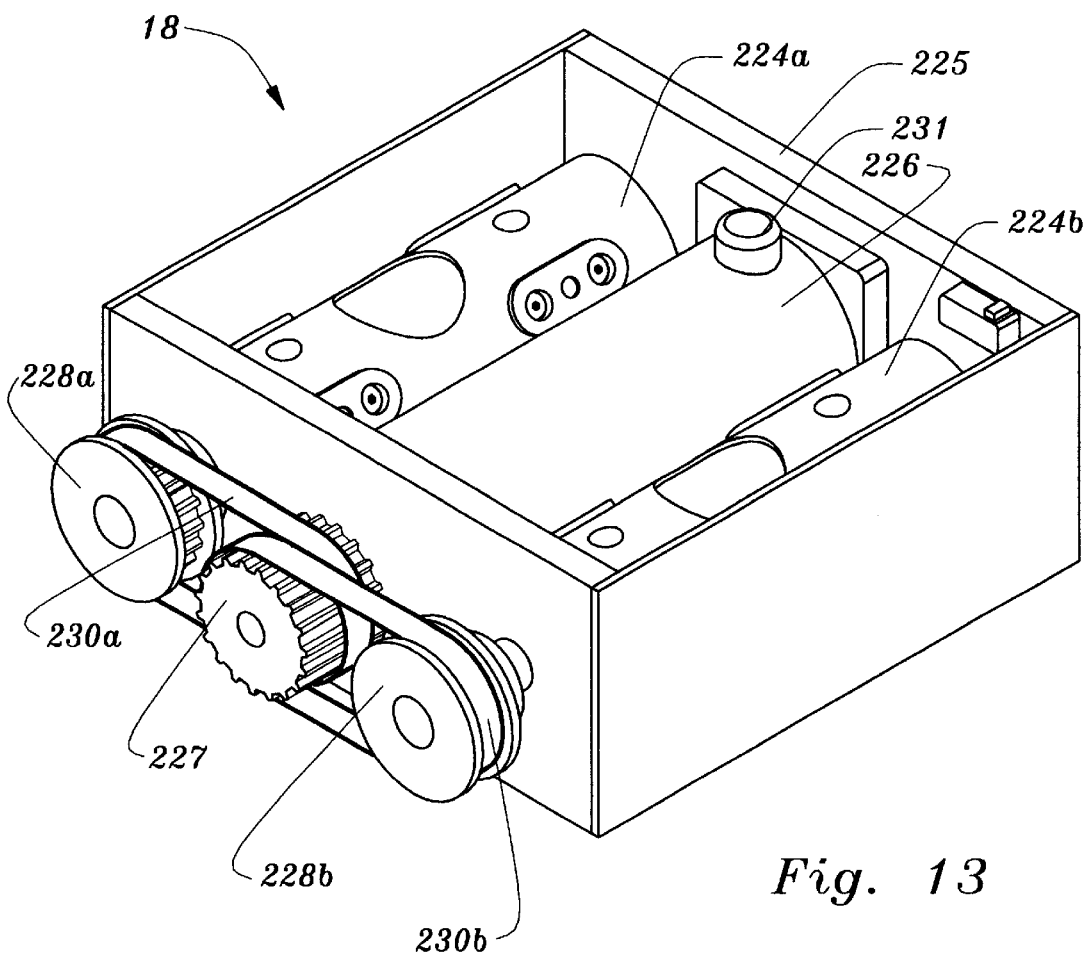
FIG. 13 is a perspective view of a dual wire feeder/straightener assembly in accordance with the present invention.
Figure 15:
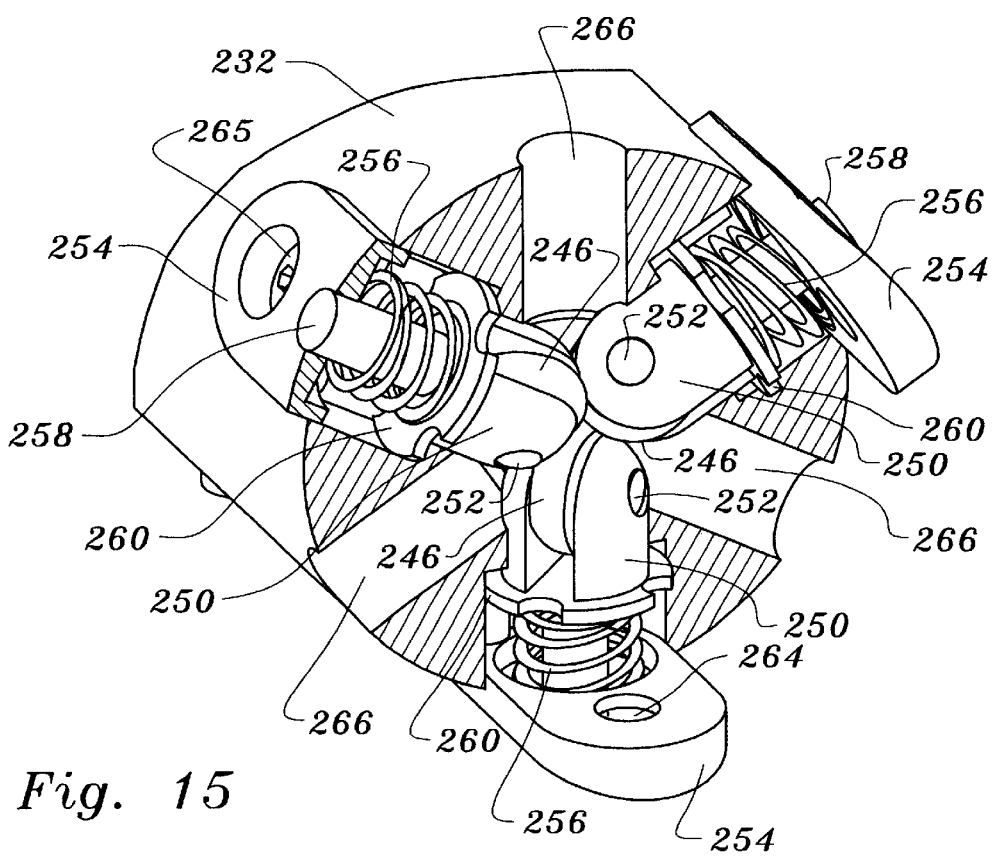
FIG. 15 is a perspective view of a portion of the rotary straight wire feeder of FIG. 14 in partial cross section shown through line 15—15.

Referring more particularly to FIG. 15 through FIG. 19, as well as FIG. 13 and FIG. 14, a longitudinal bore 238 extends through body 232 and shafts 234, 236 and communicates with a chamber 240 (FIG. 17) adjacent the center of body 232. Bore 238 includes a neck or narrow section 241 (FIG. 17) adjacent chamber 240. A first input bearing set 242 and a second, output bearing set 244 are included in rotator body 232, each of which includes a plurality of precision-ground, rotatable canted bearings 246. Preferably there are three bearings 246 each in bearing sets 242, 244, with bearings 246 being laterally spaced apart about a longitudinal rotational axis 248 which extends through bore 238. The bearings 246 in each bearing set 242, 244 are each canted or skewed such that the rotational axis (not shown) of each bearing is angled relative to longitudinal axis 248, preferably by an angle within the range of between about one degree and about 45 degrees from longitudinal axis 248. Each bearing 246 is rotatably held in a bearing mount 250 by a pin 252. Bearing mounts 250 are each supported on a bearing seat 254. Each bearing 246 (and bearing mount 250) is spring loaded by means of a spring 256 which fits over a post 258 on bearing mount 250 and is held between bearing seat 254 and a flange 260 on bearing mount 250, as well as held between retainer pins 262 (FIG. 18). Bearing seats 254 include holes 264 which accommodate adjustment screws 265 for controlling tension of spring 256. A plurality of laterally spaced bores 266 in rotator body 232 communicate with central bore 238 allow persons to observe bearings 246 within body 232.

An adjustable radial offset bearing or wheel 268 is rotatably mounted in a bearing house 270 by pin or screw 272, with the rotational axis of radial offset bearing 268 being generally perpendicular to the longitudinal rotational axis of rotator body 232. Bearing house 270 is held within chamber 236 by a pair of adjustment screws 273 which fit through body 232 and threadedly engage bearing house 270.

Welding wire is generally stored on spools or in coils after manufacture, and is typically provided to welding operators by commercial sources on the spools or coils. When the welding wire is subsequently unwound from the spool for use, the wire retains the "cast" and "helix" imparted to the wire due to storage on the spool. The "cast" of the wire imparts the generally round, spring-like shape to wire that has been removed from a spool. The "helix" of the wire generally reflects the distance between each coil or loop of wire after unwinding from the spool. The cast and helix of a wire will generally vary with the size and shape of the spool from which the wire has been unwound. While cast and helix are desirable properties for the storage of welding wire, the cast and helix present in conventional welding wire are generally undesirable for welding operations. Particularly, the cast in welding wire can cause the end of the welding wire to undergo unwanted deflection and reciprocation as the wire is fed through a guide tube to a welding puddle. During welding, as wire exits the end of a guide tube and plunges into the molten flux puddle, weld penetration into the substrates or parent metal will be offset from the center of the weld in the direction of offset by the cant and helix of the wire. This results in unequal weld penetration or lack of penetration on the opposite side of the weld, and result in a defective weld which would need to be repaired or re-welded. The rotary straight wire feeders 224*a*, 224*b* and assembly 18 of the present invention overcome this problem by providing a quick and efficient manner for removing the cast and helix from welding wire as it is unwound from a spool.

Figure 19:
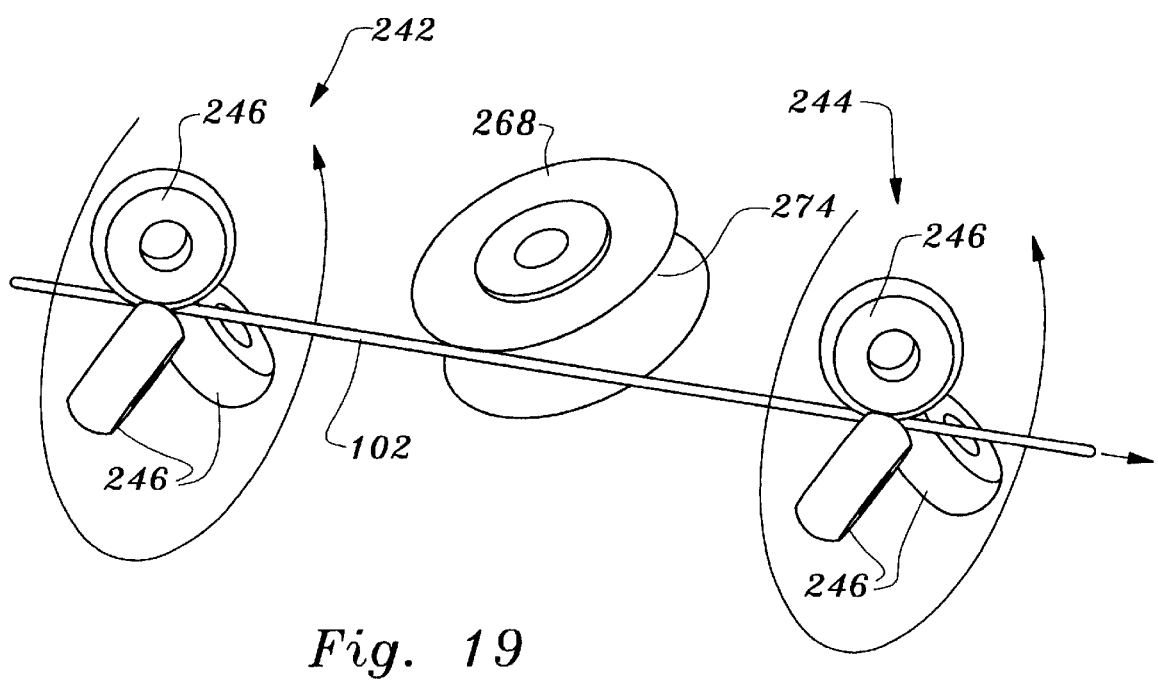
FIG. 19 is a schematic view of the input and output bearing sets and the adjustable offset bearing of the rotary straight wire feeder of FIG. 14, shown with a welding wire.
Figure 17:
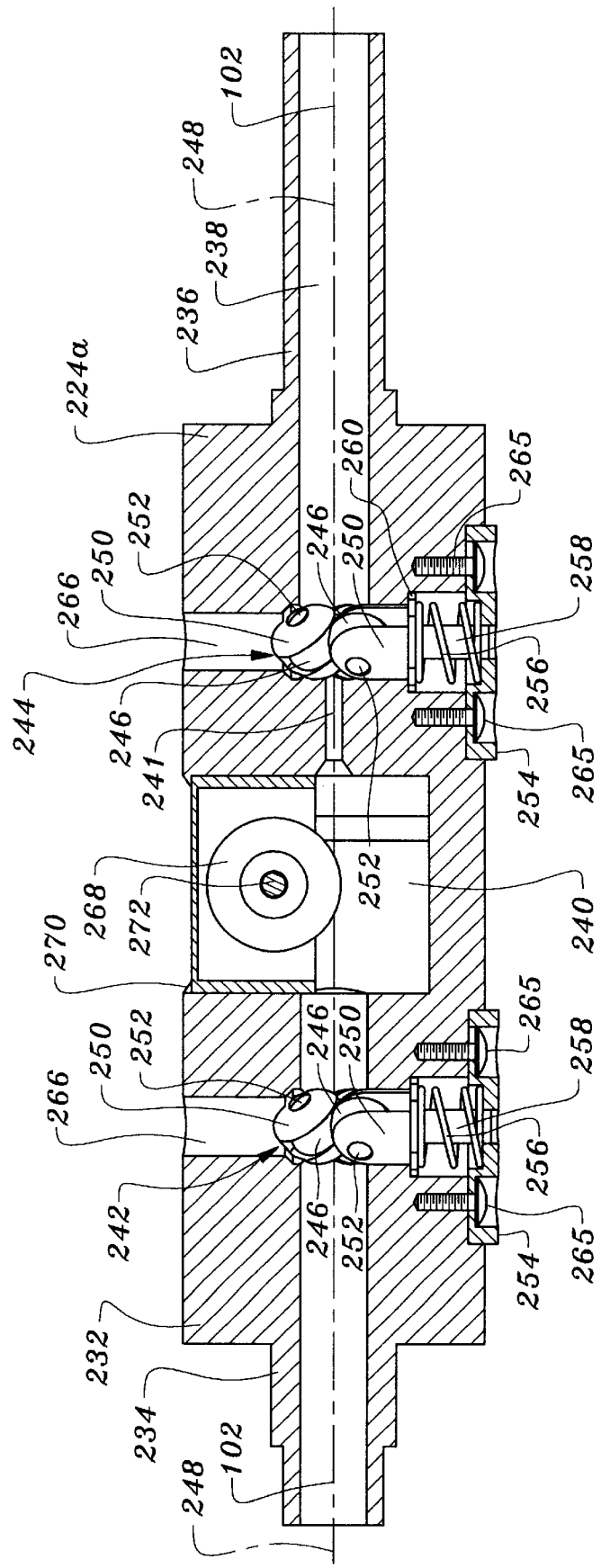
FIG. 17 is a side elevation view of the rotary straight wire feeder of FIG., 14 shown in cross section through line 17—17.

Referring more particularly to FIG. 17 and FIG. 19, welding wire 102 from spool 28 (FIG. 1) is directed through rotary straight wire feeder 224*a* and/or 224*b* such that welding wire passes through bore 238, chamber 240 and through the center of the input and output bearing sets 242, 244, such that wire 102 is generally co-linear with the longitudinal rotational axis 248 of body 224*a* or 224*b*, and such that canted bearings 246 in each bearing set 242, 244 are generally in intimate contact with wire 102. The amount of force applied by canted bearings 246 on welding wire 102 is adjusted by advancing or retracting screws 265, which correspondingly compresses or releases springs 256 between bearing seats 254 and bearing mounts 250. Generally, screws 265 are in a retracted or withdrawn position prior to insertion of wire 102 into bore 238 and between canted bearings 246, and screws 265 are advanced or tightened once wire 102 is positioned within bore 238 between bearings 2. In welding operations wherein two welding wires are utilized, the above procedure is carried out for both rotary straight wire feeders 224*a*, 224*b*.

When thus inserted into body 232, welding wire 102 is positioned adjacent radial offset bearing 268. Offset bearing 268 includes a lateral groove 274 (FIG. 19) which extends around the circumference of offset bearing 268 and which accommodates wire 102. Offset bearing 268 is positionally adjusted relative to wire 102 via adjustment screws 273 (FIG. 18). The positional adjustment of offset bearing 268 will vary, depending upon the cast and helix to be removed from wire 102. Once welding wire 102 has thus been positioned within rotary straight wire feeder 224*a* and/or 224*b*, motor 226 is activated to rotate rotary straight wire feeders 224*a*, 224*b*. As rotary straight wire feeders 224*a*, 224*b* rotate, the canted bearings 246 in input and output bearing sets 242, 244 rotate about wire 102 and exert a screwing force on wire 102 to drive or screw wire 102 through rotary straight wire feeders 224a, 224b via the action of canted bearings 246, and to pull the welding wire from spool 28 (FIG. 1). The canted bearings 246 can be considered as drawing an imaginary thread on wire 102, and this threading-like motion feeds wire 102 through rotary straight wire feeders 224, 224b. As wire 102 is fed through rotary straight wire feeders 224a, 224b, offset bearing 268 exerts a pressure on wire 102 to un-bend the cast and helix from the wire. Thus, rotary straight wire feeders 224a, 224b both advance or feed wire 102 forward via the action of canted bearings 246 while at the same time straightening wire 102 by removing the cast and helix with offset bearing 268. The straightened wire from feeder/straightener is then directed to welding torch 14 and through guide tube 96 to the weld puddle of the welding operation. The rate of wire feeding by rotary straight wire feeders 224a, 224b can be adjusted both by increasing or decreasing the rotation rate of rotary straight wire feeders 224a, 224b, as well as by adjusting the cant or angle of bearings 246. Preferably, bearings 246 are angled at about forty five degrees from longitudinal axis 248 and welding wire 102 as shown.

Wire feeder/straightener assembly 18 is shown with two rotary straight wire feeders 224a, 224b which are rotated by the same motor 226. This arrangement allows each rotary straight wire feeder 224a, 224b to be adjusted to accommodate different gauges of welding wire and/or welding wire having different cast and helix properties, so that two different types of straightened welding wire can be provided from assembly 18, for two different welding operations. Alternatively, the two welding wires can be directed to the same operation.

Figure 20:
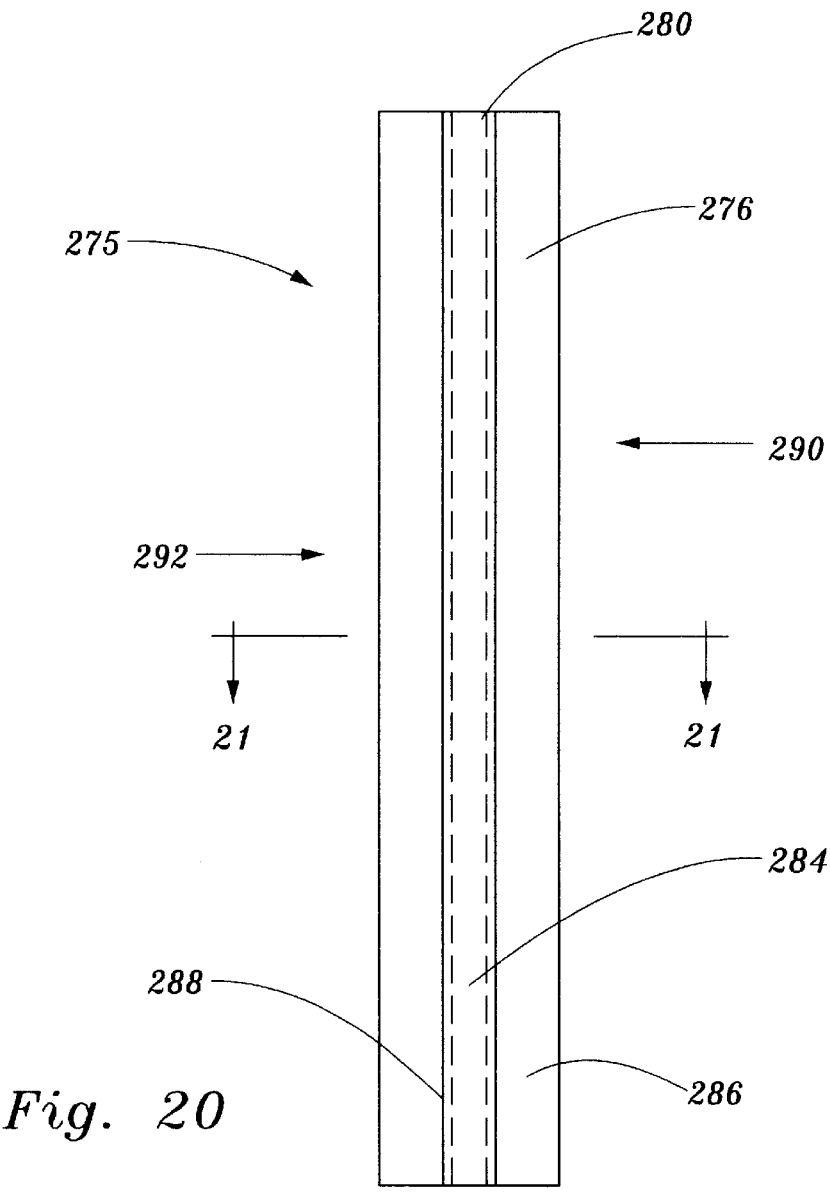
FIG. 20 is a front view of a winged guided tube in accordance with the invention.
Figure 21:
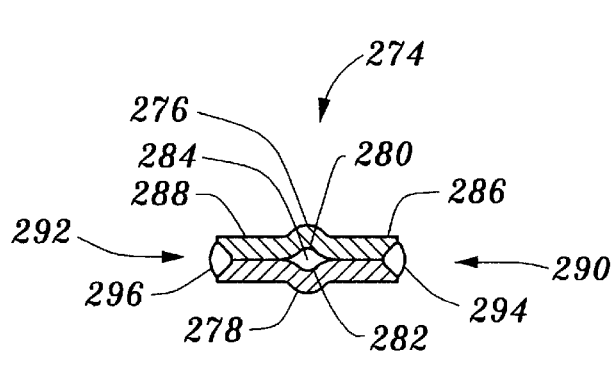
FIG. 21 is a cross-sectional view of the winged guide tube of FIG. 16 taken through line 21—21.

Referring now to FIG. 20 and FIG. 21 a winged guide tube 275 in accordance with the invention is generally shown. Winged guide tube 274 is generally structured and configured to spread the welding arc energy over a wider area than conventional cylindrical guide tubes. Winged guide tube 274 comprises a pair of opposing elongated plates 276, 278, with each plate having a longitudinal channel 280, 282. Plates 276, 278 are placed together such that longitudinal channels 280, 282 define a tube 284 and wings 286, 288. Plates 276, 278 are joined together along edges 290, 292 by welds 294, 296.

As noted above with respect to FIG. 2 through FIG. 6, a conventional cylindrical guide tube 96 is shown with welding torch 14 for reasons of clarity. In order to accommodate winged guide tube 274, chuck 156 on welding torch 14 will generally include slots (not show) to accommodate wings 286, 288 of guide tube 274.

Figure 22:
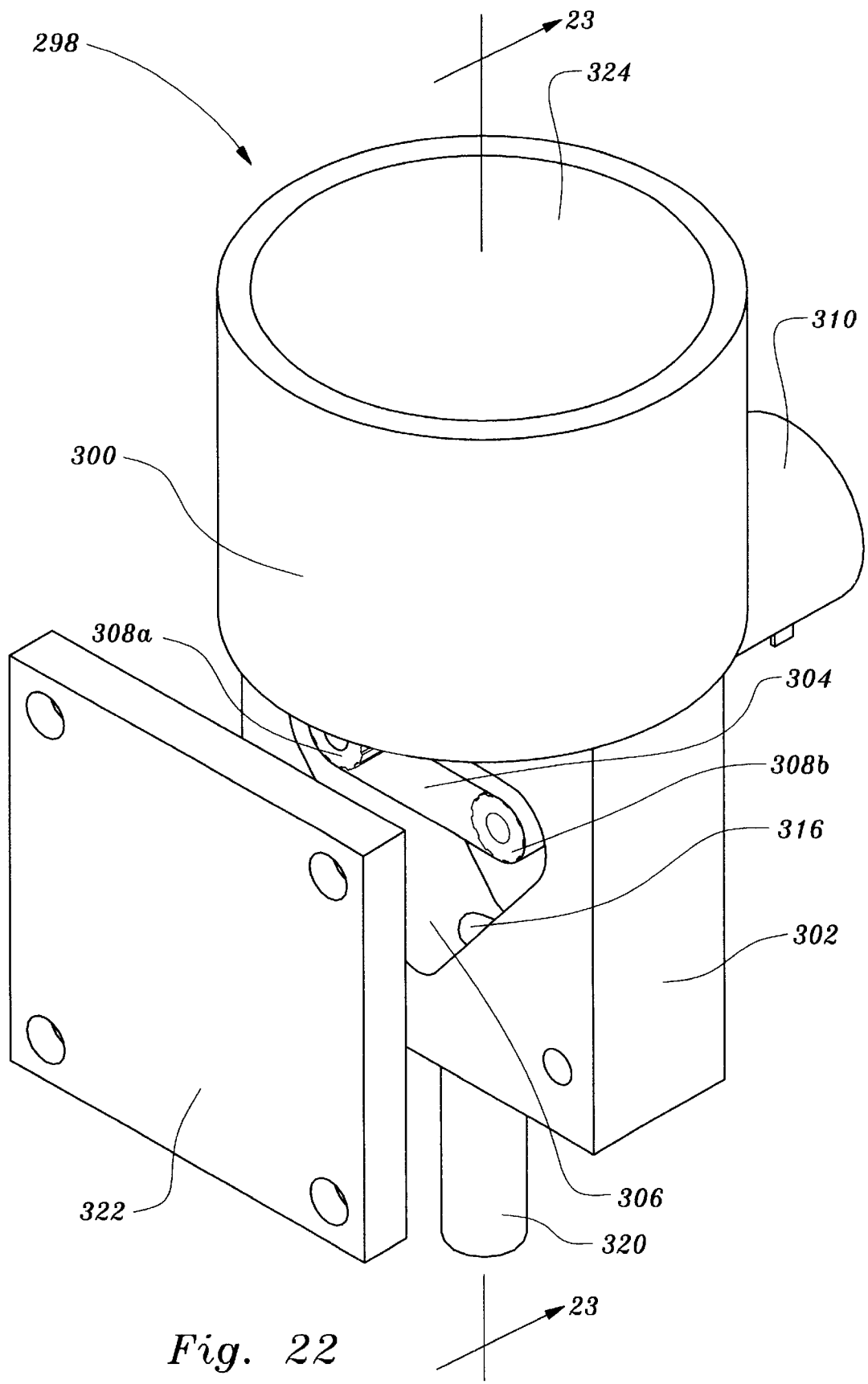
FIG. 22 is a perspective view of a flux dispenser in accordance with the invention.
Figure 23:
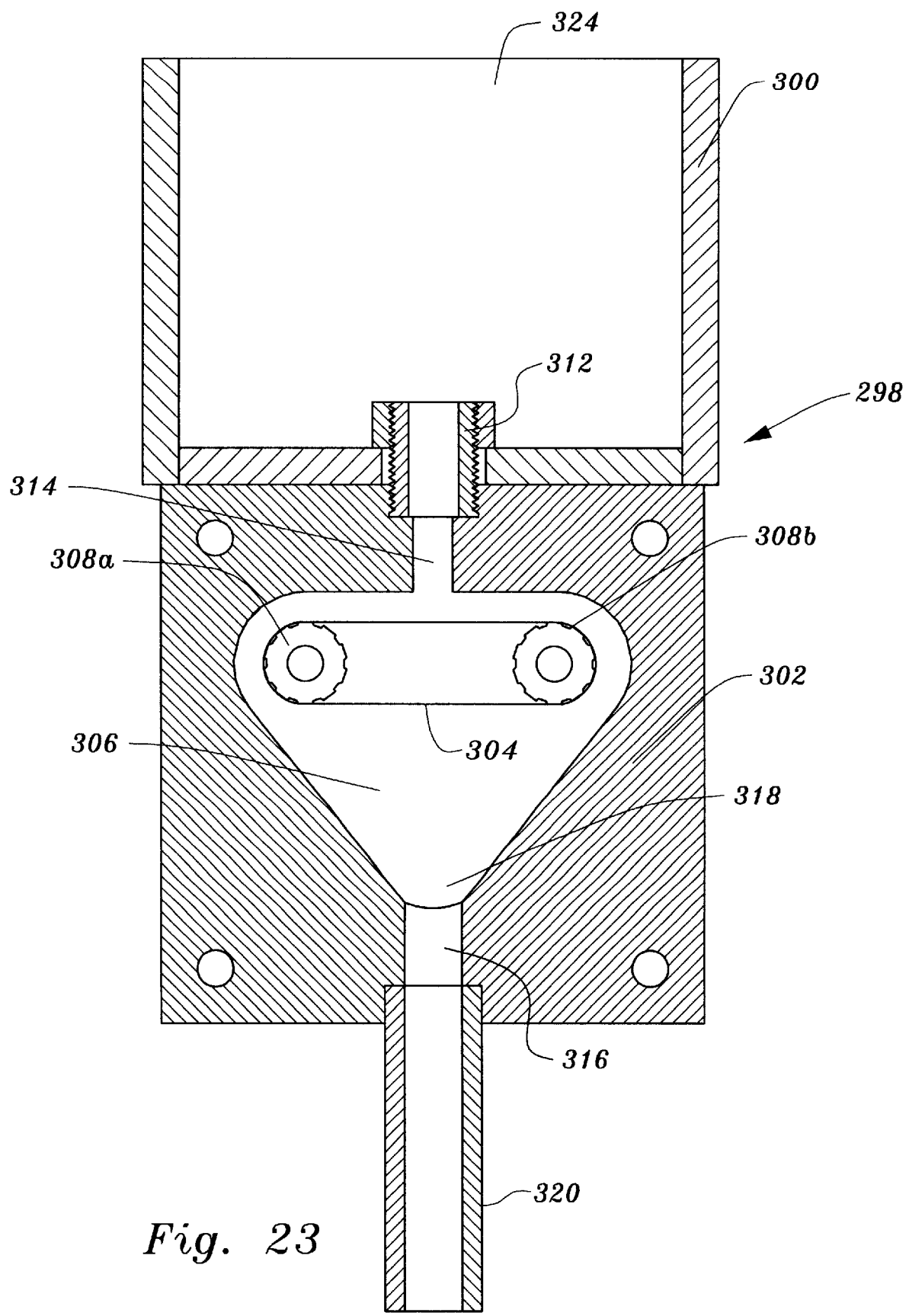
FIG. 23 is a front view of the flux dispenser of FIG. 19 shown in cross-section through line 23—23.

Referring now to FIG. 22 and FIG. 23, a flux dispenser 298 in accordance with the invention is generally shown. Flux dispenser 298 preferably comprises a flux hopper 300 and a belt housing or block 302. A horizontally-oriented geared flux dispenser belt 304 is positioned within a recess or cavity 306 in belt housing 302, and is mounted on a pair of gears 308a, 308b which rotate belt. One (or both) of gears 308a or 308b is powered by motor 310, which is attached to belt housing 302. Hopper 300 is joined to belt housing 302 by a threaded sleeve 312. A vertical inlet tube or channel 314 communicates between hopper 300 and recess 306 through sleeve 312. An outlet channel 316 communicates with the lower end or bottom 318 of recess 306, and a drop tube 320 is attached to belt housing 302 such that drop tube 320 communicates with outlet channel 316 and recess 306. Preferably, a detachable front plate 322 is coupled to belt housing 302, which allows access to recess 306 and dispenser belt 304.

In operation, the reservoir 324 of hopper 300 is filled with a granulated flux (not shown). Granulated flux from hopper 300 pours downward through sleeve 312 and inlet tube to belt 304. As motor 310 drives belt 304, flux is conveyed along belt until it spills of the end of belt 304 and falls to the bottom 318 of recess 306. The powdered flux thus conveyed by belt 304 falls down through outlet channel 316 and drop tube 320 to a welding site (not shown). Increasing or decreasing the rotational rate of motor 310 and the motion of belt correspondingly increases or decreases the rate at which flux is delivered by belt 304 to drop tube 320.

Speed or rate control means (not shown) are preferably associated with motor 310 to control flux dispensing speed. A flexible hose (not shown) may be attached to drop tube to aid in conveying flux to a welding site. Drop tube 320 may alternatively be bifurcated or branched to allow flux dispensing to two welding operations, or to provide flux to both sides of a single welding site. Note that hopper 300 may be tapered in shape if desired, and may include mechanical vibration means (not shown) to prevent "webbing" or collection of flux powder along the walls of hopper 300. Flux dispenser 298 may be associated with the end 34 of articulating boom, with flux from drop tube 320 being conveyed through an attached flexible hose or conduit. Flux dispenser 298 may alternatively be positioned on welding fixture 12 and held thereon with a clamp, or may be externally supported adjacent to a welding operation.

Referring now to FIG. 24A and FIG. 24B through FIG. 26, as well as FIG. 1, a distributed welding control system 326 in accordance with the present invention is generally shown. The distributed welding control system 326 generally comprises an operator interface module, shown as operator control panel or data logging module 46, an oscillator controller module 48, a wire feed controller module 50, and a welding power supply controller module, 52, with modules 46, 48, 50 and 52 being connected by an interface bus 54. The distributed welding control system 326 of the invention provides for reduced cabling complexity, increased overall system reliability, and creates an easily adaptable and scalable control system of interchangeable modules. These advantages are accomplished by incorporating one or more microcontrollers within each module of the system, which allows each module to perform self-test and internal monitoring functions, automatic shutdown on faults, and to act as a stand-alone module requiring only an operator interface. The operator interface can be as simple as a set of switches connected to the I/O ports of a module, or as complex as a separate control and system supervision module, which networks the entire system together. Additional modules can be added to control different aspects of welding system 10, such as a flux dispensing control module (not shown) for flux dispenser 298.

Operator interface module or control panel 46 includes a microcontroller or microprocessor unit 328, a network interface 330 for connecting to bus 54, a parallel I/O port 332, and a display interface 334. Parallel I/O port 332 connects microcontroller 328 with operator controls 336, and display interface 334 allows microcontroller 328 to communicate with a display, which is preferably in the form of a liquid crystal display or LCD 338. Program means are associated with microcontroller 328 for carrying out operator interface operations associated with operator controls 336 and LCD 338, as well as system supervision and networking generally through modules 48, 50 and 52. This programming is shown generally as operator interface program 340, system supervisor program 342, and network interface program 344. Operator control panel 46 provides overall control of the system 326, including set up and manual operator control of oscillator 16, welding power supply 42, and rotary straight wire feeder assembly 18. Operator control panel 46 also provides feed back to the operator in regards to current weld conditions and any errors that occur within the system 326. Welding operations with the invention are completely automatic once setup with operator control panel 46 is complete.

Oscillator controller module 48 includes a microcontroller 346 having programming means for controlling oscillator 16, shown generally as oscillator program 348. Oscillator controller module 346 also includes a network interface 350, a parallel I/O port 352, a motor controller interface 354, and a motor driver 356. Network interface 350 allows microcontroller 346 to communicate with other controller modules in system 326 via network bus 54. Parallel I/O port 352 interfaces microcontroller 346 with a position index 357 for determining the absolute position of oscillator 16. Motor controller interface 354 connects motor driver 356 with microcontroller 346 to allow control of oscillator motor 182. Motor controller interface 354 is also interfaced with quadrature encoder 208 for tracking oscillator position.

Wire feed controller module 48 comprises a microcontroller 358 which includes wire feed control programming 360. A network interface 362 connects microcontroller 358 with bus 54. A parallel I/O port 364 interfaces microcontroller 358 with one or more encoders 366 for rotationally monitoring drive motor 260 of rotary straight wire feeder assembly 18. Wire feed controller module 50 additionally includes a servo amp interface 368 and motor direction interface 370 for communication with servo amplifier 372 and motor 260.

Welding power supply module 52 includes a microcontroller with welding power supply programming 376, and a network interface 378 for communication with bus 54. Module 52 also includes a voltage control interface 380 for communication with a servo amplifier 382, and a signal output 384 and parallel I/O port 386 for communication with welding power supply 42 and a water flow detector 388.

Network bus 54 is preferably a single six wire cable comprising three shielded twisted pairs of 18 gauge conductor. Bus 54 provides a common backbone to connect a number of discrete controller modules into a single entity, rather than a "spider's web" of control and input wires as used in centralized control systems. Distributed welding control system 326 thus reduces system maintenance by eliminating long and complex cable runs, and reduces electromagnetic noise in the system since it is far easier to shield a small cable then it is to shield an array of wires. Repairs are simplified by incorporating selfdiagnostic capabilities into the programming of each of the individual modules. Network communications use a single twisted conductor pair with EIA RS-485 signaling and standard 8-bit NRZ ASCII code set, with each byte encoded with a single start and single stop bit with no parity. The other two twisted conductor pairs of bus 54 respectively carry logic power at 12 Volts and motor drive power at 24 Volts. These two power supplies are isolated from each other to prevent ground loops and excessive EMI associated with welding. Preferably, bus 54 includes an additional separate cable run (not shown) which supplies 120 Volt power to servo amplifiers (discussed below) associated with control system 326.

Figure 25:
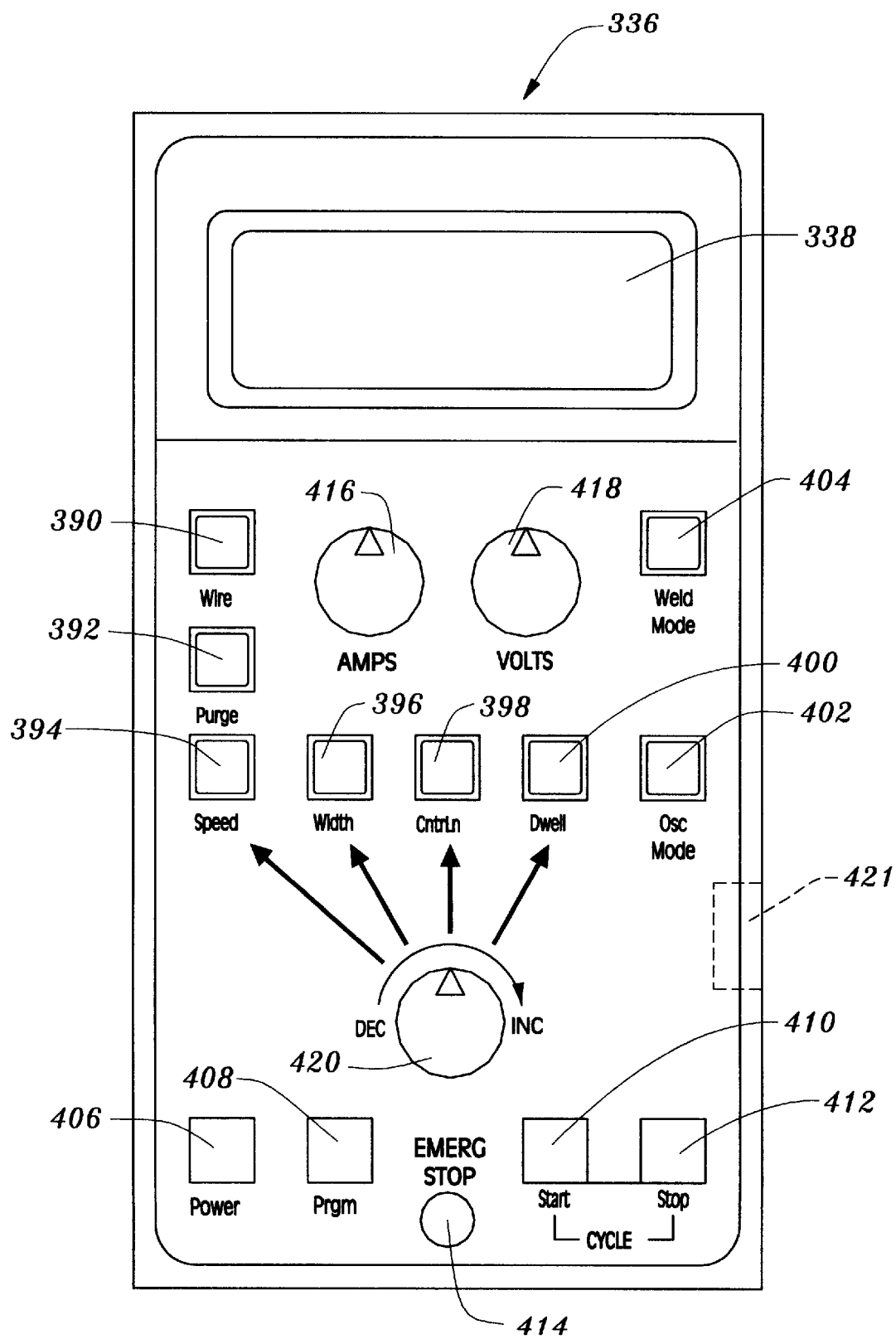
FIG. 25 is a top plan view of the operator control panel of the distributed control system.

The operator controls 336 of operator control panel 46 comprise inputs in the form of switches used to select various functions, mechanical encoders used to set item values or parameters, control and position data from LCD 338, and data packets returned by other modules 48, 50, 52 of the control system 326. Referring more particularly to FIG. 25, input switches preferably comprise a Wire switch 390, Purge switch 392, Speed switch 394, Width switch 396, Center Line switch 398, Dwell switch 400, Oscillator Mode switch 402, Weld Mode switch 404, Power switch 406, Program switch 408, Cycle Start switch 410, Cycle Stop switch 412, and Emergency Stop switch 414. Operator controls 336 also include rotatable control knobs that are monitored by digital encoders. The control knobs are attached to the shafts of manually positioned encoders and perform generally the same function that a potentiometer would in an analog control system. The encoders are preferably shaped, mounted and turned like potentiometers. As shown, operator control panel 46 includes an Amps encoder knob 416, a Volts encoder knob 418, and a general encoder knob 420 which variably inputs values according to selected Speed, Width, Center Line and Dwell switches 394, 396, 398, 400. Outputs included with operator control panel 46 preferably comprise status indicator LEDs (not shown), LCD 338, as well data packets sent to other modules 48, 50, 52 of the system 326 via network bus 54.

Referring again to FIG. 24A and FIG. 24B as well as FIG. 25, the inputs of operator controls 336 allow an operator to set various parameters for welding operations, including setup and control values, operating modes, and program modes. Setup and control values direct the different modules 48, 50, 52, 54 of the control system 326. Module parameters are updated across the control system 326 as soon as any change is made in their value. The logic section of each module 46, 48, 50, 52 is battery backed, allowing each module to retain selected parameters even when the distributed control system 326 is powered down.

The operator control panel 46 preferably includes three separate programs that pass data between themselves. These programs are the operator interface program 340, the system supervisor program 342, and the network interface program 344, as noted above. The operator interface program 340 includes means for decoding the inputs from switches 390–414 and encoders 416–420 of the operator controls 336. Operator interface program 340 also includes means for updating status information displayed by the LEDs and LCD 338. When the value of a parameter is changed via operator controls 336, a flag is set by the operator interface program 340, informing the system supervisor program 342 of the new parameter value.

Selected operating modes of control system 326 determine the various actions of the welding system 10. Preferably, the selectable operating modes include a Manual mode, Automatic mode, and Program mode. Manual mode allows an operator to manually set or position the various components of welding system 10, and prevents modules 48, 50, 52 from running during automated operation. Automated mode provides for automated operation, and prevents the operator from accidentally changing the setting or position of components.

Figure 26:
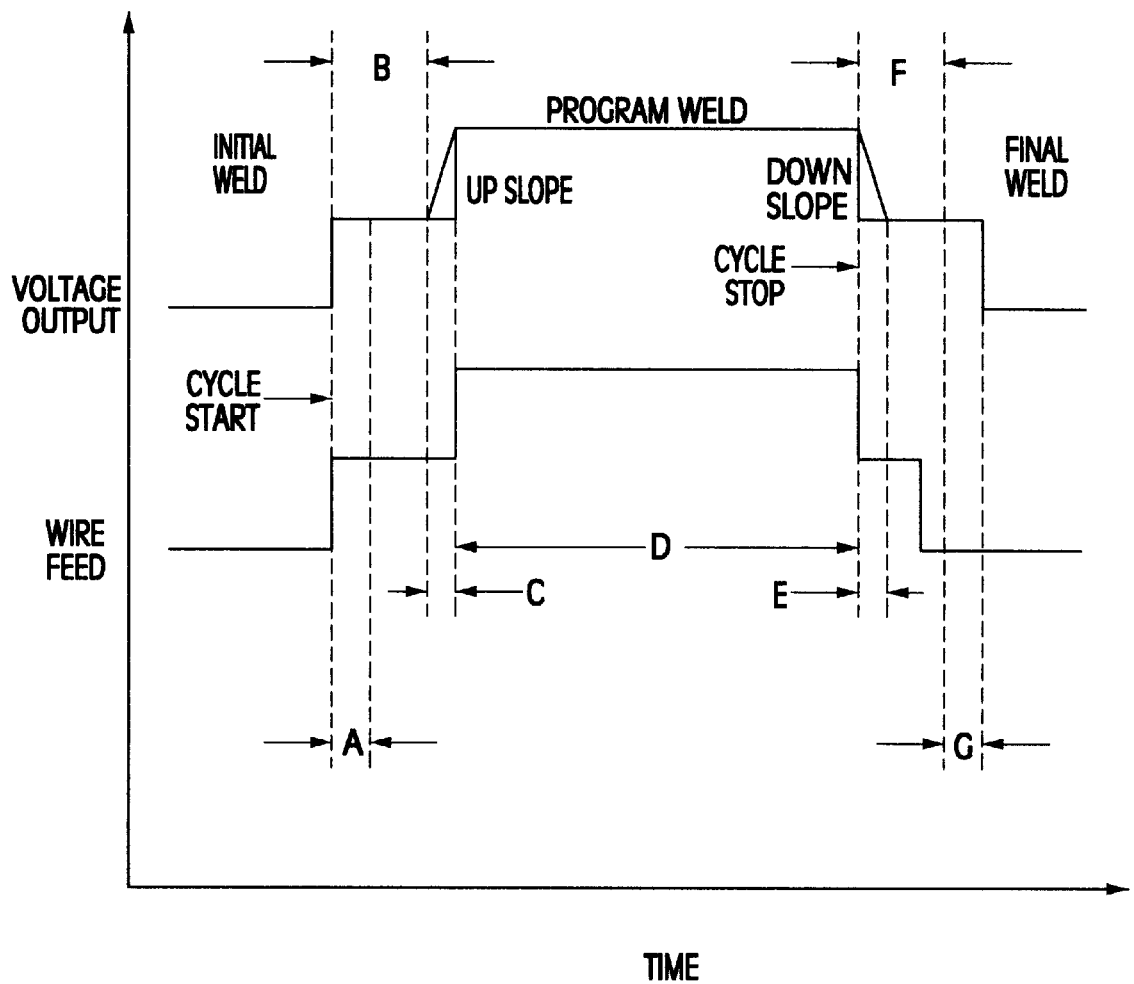
FIG. 26 is a graphic representation of voltage output and wire feed rate versus time for an automated welding cycle in accordance with the distributed control system of FIG. 24A and FIG. 24B.
Figure 27:
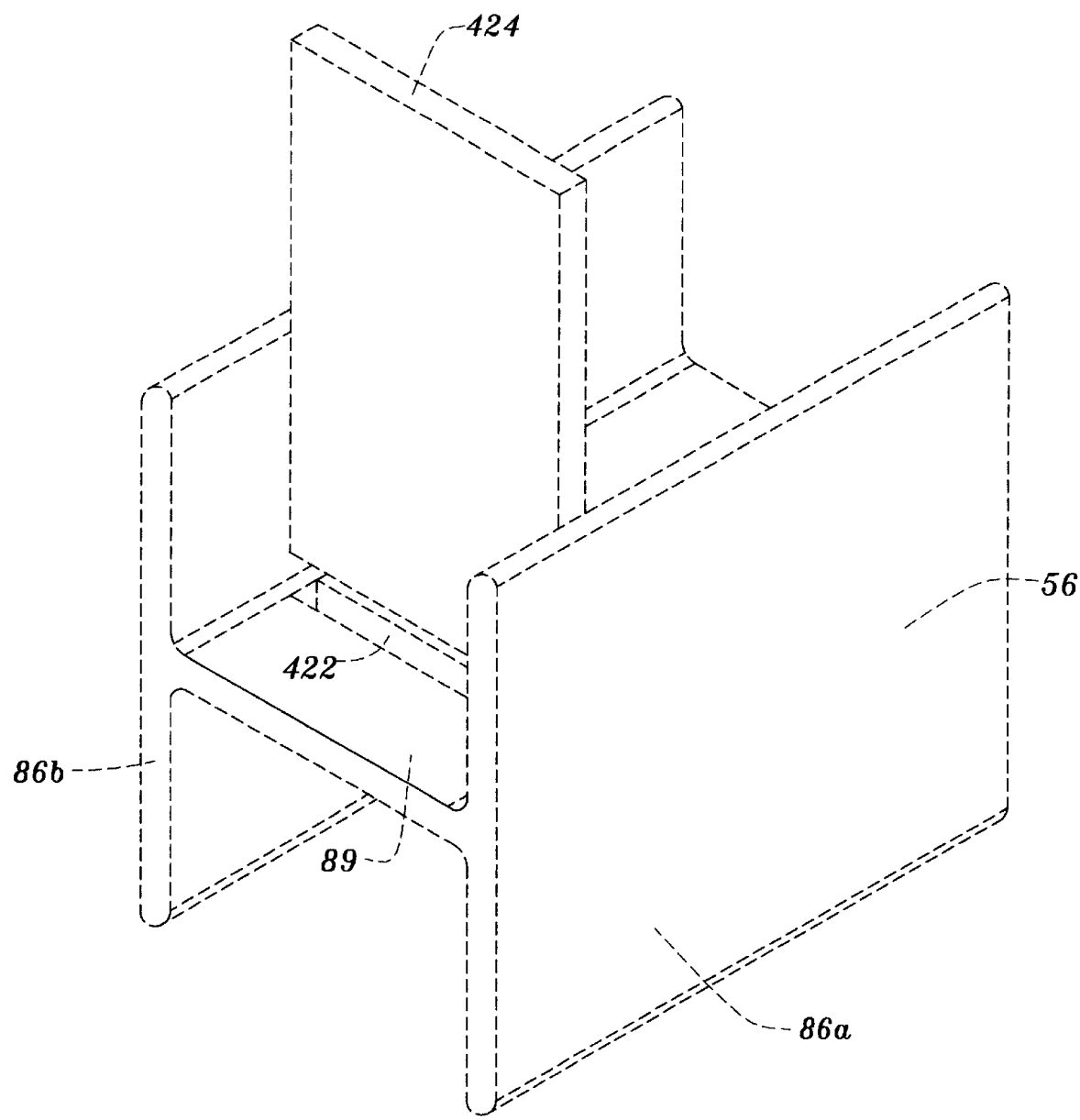
FIG. 27 is a perspective view of an I-beam having a slotted web and a stiffener plate which can extend through the slot in the web, as used with the present invention.
Figure 28:
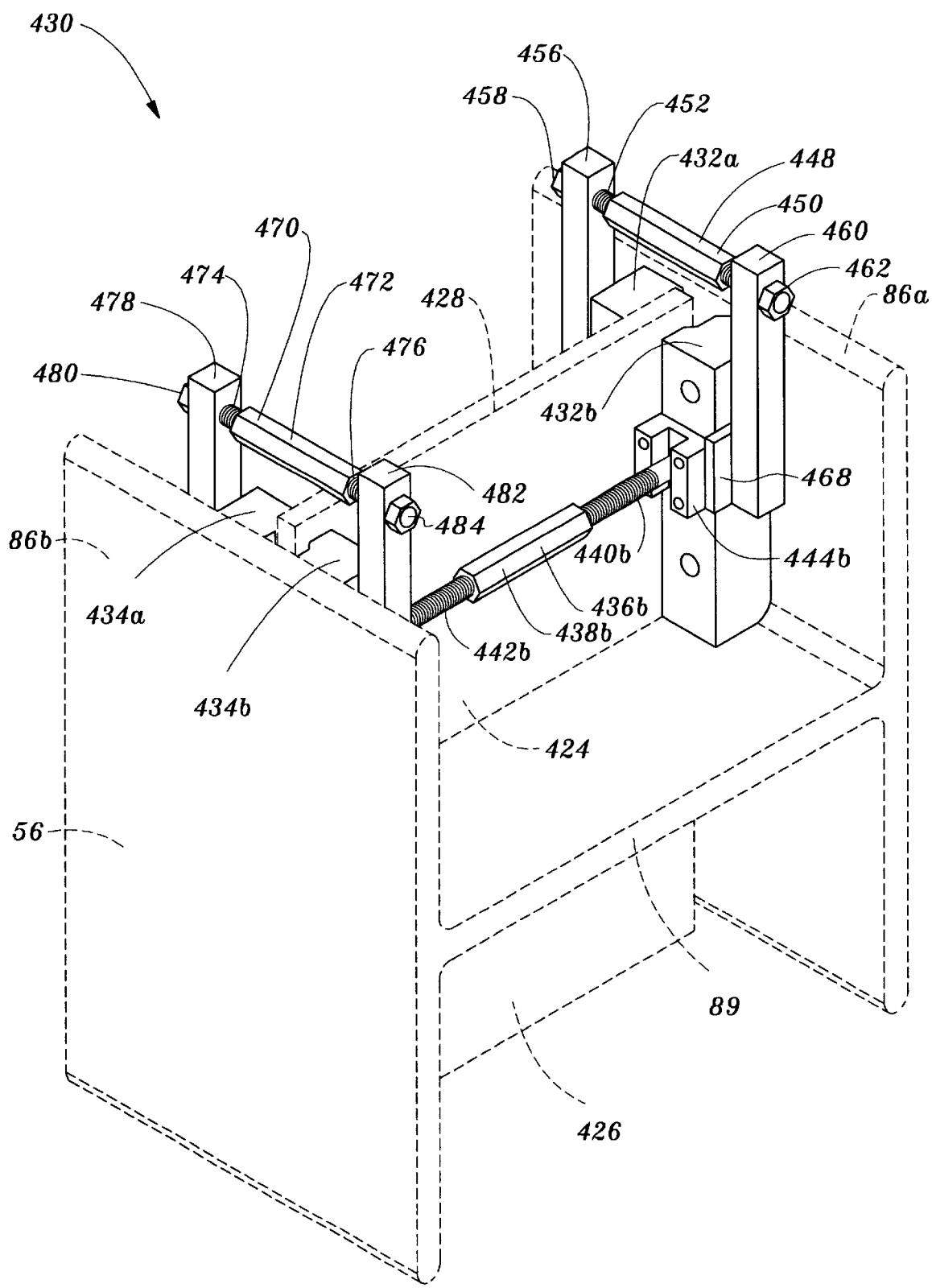
FIG. 28 is a perspective view of a welding shoe bottom clamping assembly in accordance with the invention for use with a stiffener plate and slotted web shown in FIG. 27.
Figure 29:
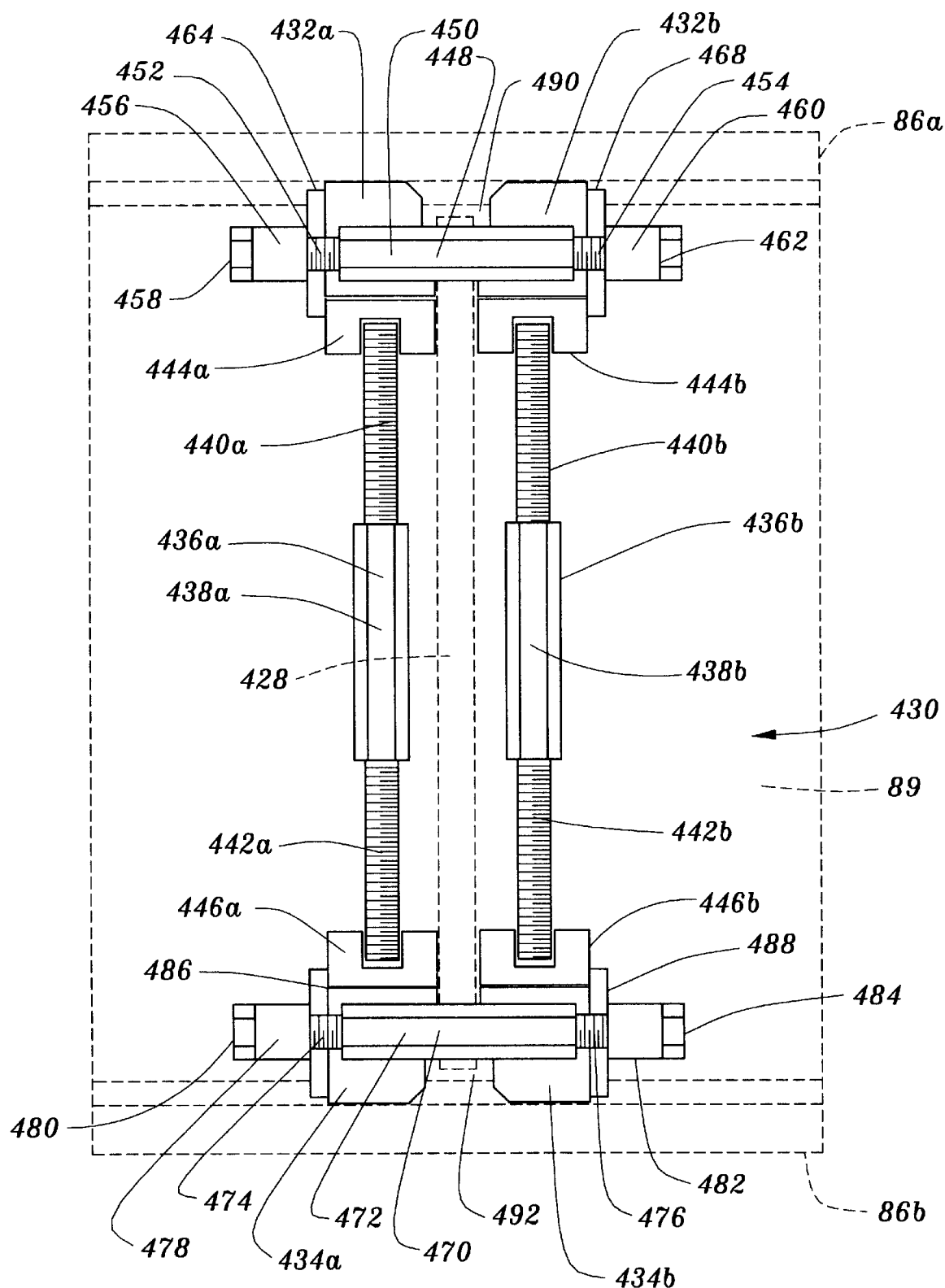
FIG. 29 is a bottom plan view of the welding shoe assembly, I-beam and stiffener plate of FIG. 28.

The Program mode of control system 326 is used to setup parameters for a plurality of different states of an automated welding cycle for using the invention in Automated mode. Referring particularly to FIG. 26, a preferred automated welding cycle in accordance with the invention is shown in graphic form, wherein the variation of welding voltage output and welding wire feed rate are shown across the time span of a welding cycle. Generally, an automated welding cycle will include a plurality of different conditions or states which occur sequentially. As shown in FIG. 23, the preferred automated welding cycle includes a Start-up state (A), an Initial welding state, time or period (B), a Ramp-up welding state (C), a Program welding state (D), a Ramp-down welding state (E), a Final welding state (F), and a Finishing state (G). The three principle states are the Initial state (B), Program Welding state (C), and a Final state (D), which comprise the bulk of the duration of the automated welding cycle. Each state or condition lasts for a predetermined or set period of time, with the Initial state (B) and Final state (F) generally lasting relatively short durations of between 0.2 and 30 seconds. The automated welding cycle is initiated by the Cycle Start switch 366, which activates the Start-up state. The Cycle Stop switch 368 initiates the Ramp Down state followed by the Final and Finishing states. The Start-up state is used to establish an arc, and is followed by the Initial state as soon as there is current flow to the weld. The Finishing state occurs after the wire feed has stopped, and allows the wire to burn back from the weld, preventing the wire from becoming trapped in the cooling weld puddle. During the welding state, the bulk of the weld is formed as the welding wire and guide tube are consumed. The number and type of welding states in a welding cycle, as well as the welding parameters for those states, can be varied as required for different welding operations.

Figure 24A:
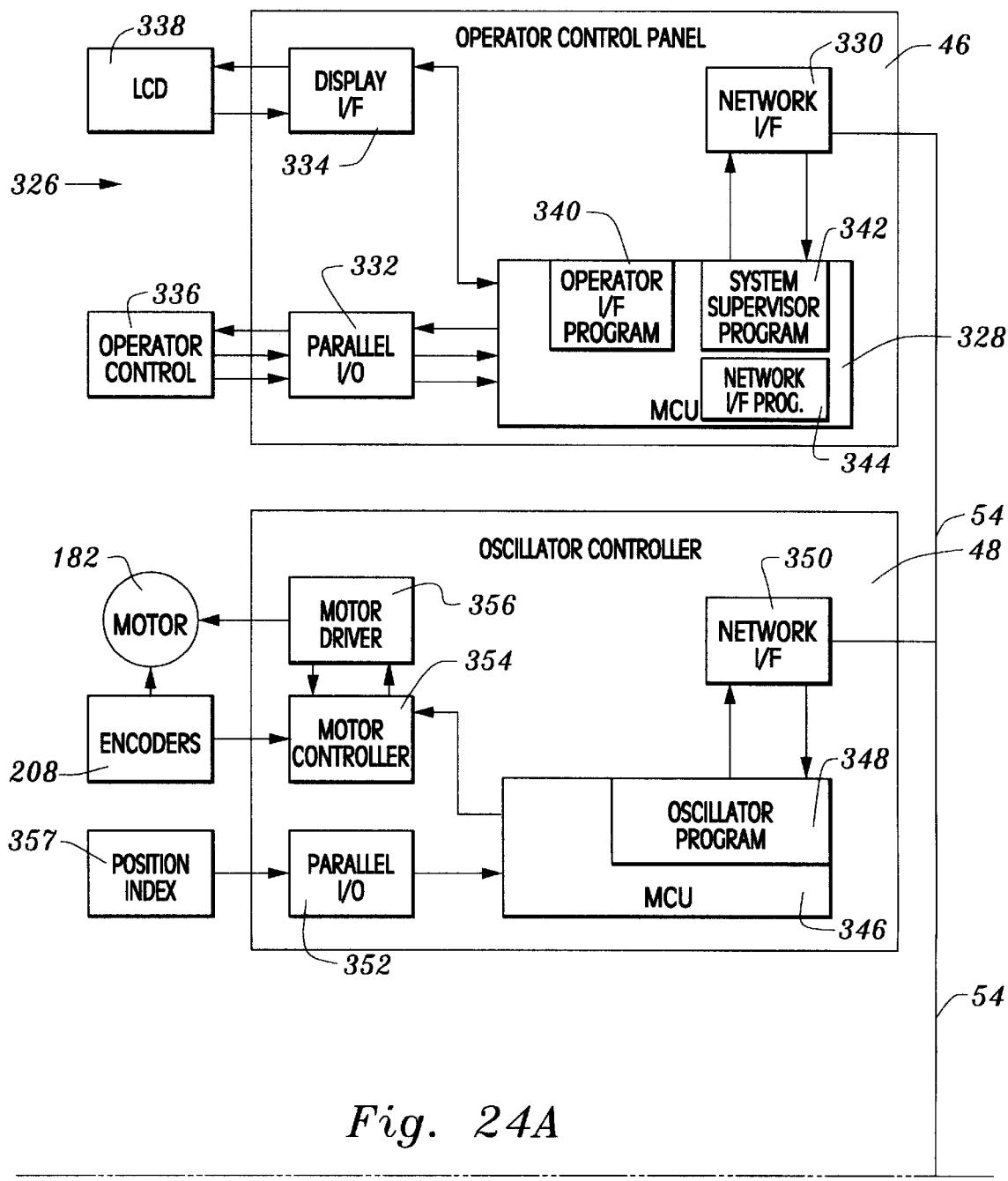
FIG. 24A and FIG. 24B are a functional block diagram of the distributed control system of the invention.
Figure 24B:
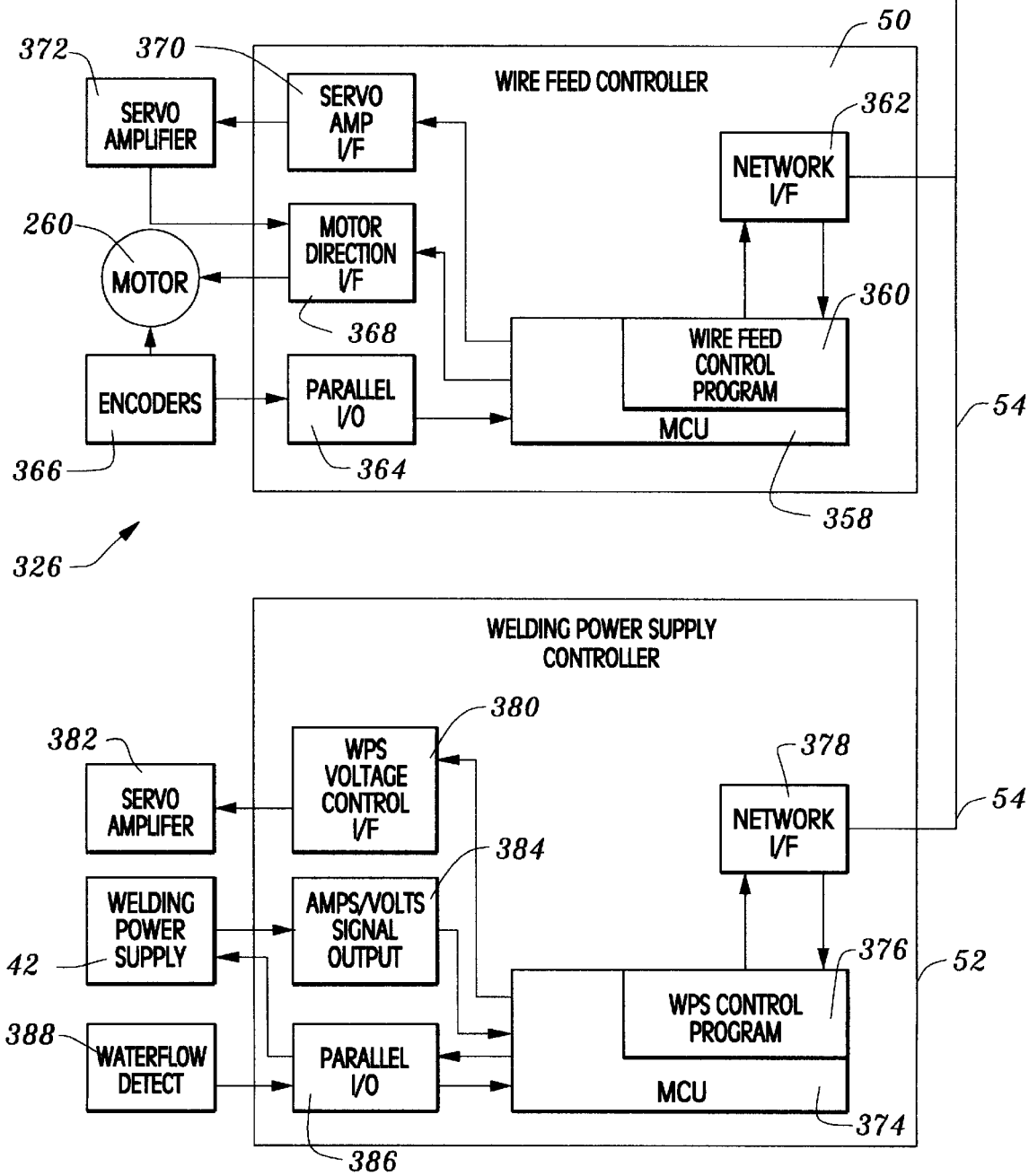

Referring to FIG. 1 and FIG. 24A and FIG. 24B, selectable parameters for each of the above states determine welding conditions, and generally consist of two main categories; welding parameters and oscillation parameters. The welding parameters generally are voltage, which controls the output of welding power supply 42, and current or amps, which is controlled by the wire feed rate of rotary straight wire feeder assembly 18. The oscillation parameters are speed, width, center-line, dwell time and voltage, all of which can vary depending on the direction of motion of oscillator 16. The time or duration the various states in which particular weld conditions are maintained depend on the volume of the weld and wire feed rate used. All of the parameters are used in the automated welding cycle, and are entered by the operator in the Program mode via operator controls 336 and stored in non-volatile memory of microcontroller 328. These parameters are transmitted to the appropriate controller module by the network interface program 344.

The system supervisor program 342 is responsible for directing the automated welding cycle described above. System supervisor program 342 also monitors the status of each controller module 48, 50, 52 and can interrupt a welding operation upon occurrence of a fault condition. Since each controller module microcontroller includes battery backup to retain preset parameters, the system supervisor program 342 coordinates the start of each automated weld cycle, verifies that the oscillator 16, rotary straight wire feeder 18, and welding power supply 42 switch between states at the correct times, signals the change to the Final state, and issues the final shut down command. Timing means, such as an oscillating quartz crystal (not shown), are associated with microcontroller 328. The system supervisor program 342 sends out a 'tick' command every 100 milliseconds according to the timing means. Controller modules 48, 50, 52 on the network 54 will shut down if more than a preset number of these ticks are missed.

System supervisor program 342 requests data from controller modules 48, 50, 52 during welding operations. This requested data is used to update information displayed on LCD 338, verify that the selected welding and oscillation parameters are being maintained, and to provide data for the operation of the controller modules. System supervisor program 342 monitors the control system 326 for data request packets. If a particular controller module requires data generated by other modules of the control system 326, the data request packets are processed, following verification that the returning data is from the proper source. For example, welding power supply controller 52 monitors the network for information from the oscillator controller 48. The welding power supply controller 52 can change the welding voltage parameter during the dwell time of oscillator 16. The data packet from oscillator controller module 48 consists of operational flags, which include a flag indicating whether or not the oscillator 16 (FIG. 1) is in dwell, thereby informing the welding power supply controller 52 as to when to vary the voltage.

The network interface 330 of the operator control panel 46 differs from network interfaces 350, 362 and 378 of controller modules 48, 50 and 52 respectively in that operator control module 46 is the master module with the network interface program 344, which initiates all communications across the control system network. The network interfaces 350, 362 and 378 of the other modules are slave interfaces, which can only reply to requests from the operator interface module 46. Network interface program 344 provides a network communication protocol which preferably uses EIA RS-485 signaling and a standard 8-bit NRZ ASCII code set. Each byte is encoded with a single start and a single stop bit with no parity. Diagnostic information from each controller module 48, 50, 52 can be communicated back to operator control module 46 and displayed to the operator on LCD 338. The network interface program 344 converts requests from the system supervisor program 342 into packets, sends the packets to the specified controller modules, and waits for a response from the specified controller modules. The packet is retransmitted if no reply is received within a set time period.

Network messages preferably consist of packets of hexadecimal ASCII characters which begin with a special start character and end with a special stop character. Each pair of hexadecimal characters encodes one byte of information. The first two characters following the start character encode the message type and module address. This is followed by zero to thirty characters (the actual number varies with message types) which provide additional control and data information. The last two characters before the stop character encode an 8-bit modulo checksum of all of the characters (excluding the start character) which precede the checksum. The shortest possible packet length, including start and stop characters, is six, and the longest packet length is thirty six characters. A message is rejected if it contains a non-hexadecimal character (other than the start and stop characters), or if it contains an odd number of hexadecimal characters, or if the embedded checksum does not match the calculated checksum.

The master operator control panel 46 can address up to thirty other slave controller modules, each of which is assigned an address by hardware switches. The control system 326 as shown includes only three slave modules, i.e., the oscillator controller 48, wire feed controller 50 and welding power supply controller 52. Thus, the control system of the invention is highly scalable and adaptable, and can be easily modified to include multiple additional controller modules for other aspects of welding system 10, such as flux rate control, seam tracking, and various translational movements of welding torch 14. Slave modules can have an address from one to thirty. The master operator control panel module 46 is assigned an address of thirty one.

Address "zero" is used for special purpose packets. There are generally three types of packets: address zero packets, requests for all modules; address one to thirty packets, requests to specific modules; and address thirty one packets. Address thirty one packets are replies from a slave controller module to the master operator interface module 46. An address zero packet is a request to all controller modules in the network from operator control panel 328, such as the 'tick' packet described above. Other address zero packets include Cycle Start, Cycle Stop, and Emergency Stop. No reply is expected by network interface 330 on the master operator control panel module 46 after sending an address zero packet, since this packet is accepted by all controller modules.

Address one to thirty packets are instructions and requests for a specific controller module. These packets include parameter updates, data requests, and single module start and stop instructions. The master operator control panel module 46 expects to receive a reply from the addressed slave. A packet will be sent again; if an error reply is returned by the slave, or if there is no reply at all.

Address thirty one packets are replies to the master operator control panel module 46 from an address one to thirty packet. These packets include; message OK, message error, and data returned from a data request packet. The slave modules will ignore all of these packets except for data reply packets that contain data used by that particular slave module.

Oscillator controller module 48 controls and powers the rotating shafts 176*a*, 176*b* and linear actuators 180*a*, 180*b* of oscillator 16 which reciprocate welding torch 14 during welding operations. Motor driver 356 of oscillator controller module 48 includes an optically isolated H-bridge (not shown) which provides up to 10 amps of motor drive power at 24 volts to drive motor 182. Oscillator program 348 of microcontroller 346 monitors quadrature encoder 208 and provides positioning control of linear actuators 180*a*, 180*b* to 0.005 inches. Velocity control for linear actuators 180*a*, 180*b* ranges from 0.5 IPM to 50.0 IPM and is controlled to 0.1 IPM by oscillator program 346. Safety operations provided by oscillator program 346 include excessive position error detection and thermal shutdown control, with automatic recovery capability. Parallel I/O 352 receives optically isolated inputs from position index indicator 357 and can additionally receive relays for control of flux feed by flux dispenser 298 or other devices associated with welding system 10.

The motor control interface 354 of oscillator control module 48 is preferably a separate application specific integrated circuit (ASIC), which is directed by the oscillator control program 348. Off loading of the motor control functions from microcontroller 346 to a separate ASIC allows oscillator control program 348 to better control the entire oscillation sequence, and also to provide better accuracy at higher slide velocities. Motor control interface 354 communicates with microcontroller 346 and oscillator control program 348 over an 8-bit parallel bus (not shown). Motor control interface 354 reads inputs from quadrature encoder 208 which provide position and velocity feedback to oscillator control program 348. An interrupt to oscillator control program 348 is generated if motor controller interface 354 detects an out-of-position error with regard to linear actuators 180*a*, 180*b*. This allows oscillator control program 348 to shut down the drive system before the stalled motor 182 and motor driver 356 can overheat and undergo damage. Commands for motor controller interface 354 are generated by the oscillator control program 348 from parameters received from operator control panel 46.

Oscillator control program 348 tracks the absolute position of linear actuators 180*a*, 180*b* of oscillator 16 (and thus welding torch 14), since motor control interface 354 operates relative to a zero position. Oscillator control program 348 retains the absolute position and other control parameters in the battery backed memory of microcontroller 346. Control parameters are specified from operator control panel 46 for travel direction (right and left travel) for all of the automatic weld states of the automated weld cycle. These parameters include velocity, dwell time, and width of oscillation. Another parameter is centerline position, which is the same between all operating modes. The position index 357 is used as a reference point that allows oscillator control program 348 to compare absolute position of linear actuators 180*a*, 180*b* against known stationary positions. The oscillation control parameters are set by the operator while in Program mode using the appropriate Speed, Width, Center Line and Dwell switches 394, 396, 398, 400 on operator control panel 46.

The system supervisor program 342 of operator control panel 46 issues a data request packet to oscillator controller module 48 every 100 milliseconds. These packets are provided for the benefit of welding power supply controller 52, which needs to know when oscillator 16 is dwelling at the end of a traverse. Oscillator 16 is inactive when the operator control panel 46 is in Program mode, allowing the operator to safely set up the parameters for oscillator 16 without having to worry about shorting the guide tube 96 against welding shoe 62*a* or 62*b*. If motor controller interface 354 has interrupted oscillator control program 348 due to a detected out-of-position error with linear actuators 180*a*, 180*b*, system supervisor control program 342 will determine that a critical fault has occurred when it checks the error flags in the data reply packet from oscillator control module 48.

Wire feed controller 50 drives motor 260 of rotary wire feeder straightener assembly 18 with a voltage controlled servo amplifier 372. Position and velocity accuracy depends on the nature of motor 260 and resolution of encoders 366 associated with motor 260 or the drive system of assembly 18. Parallel I/O 364 receives inputs from encoders 366. Other on-board I/O may include optically isolated inputs from switches and relays (not shown) for control of other external devices associated with welding system 10. A separate ASIC for motor control interface is not required in the wire feed controller module 50 since the welding wire feed rates for most welding operations do not require the high accuracy motor control necessary for oscillator 16.

Wire feed program 360 uses a feed-forward algorithm to control motor 260 of rotary straight wire feeder assembly 18, because the controlled parameter is wire velocity or feed rate, and no positioning logic is required as with oscillator controller module 48. Output from a standard digital to analog converter (not shown) is used to set the output level of voltage-controlled servo amplifier 372. The direction of motor 260 is selected by switching the output of servo amplifier 372 with relays (not shown). Wire velocity or feed rate is used as the control parameter, rather than the current output (amps) of welding power supply 42, because current output depends on a number of other variables (other than wire feed rate) which are difficult to control. The use of wire feed rate as a control parameter also reduces the workload of microcontroller 358 on wire feed controller module 50, since microcontroller 358 does not need to monitor network data packets for current (amp) data from the welding power supply 42 through welding power supply controller module 52.

An "amp-to-wire feed rate" look-up table is stored in the memory of microcontroller 358, which allows the welding operator to enter the amps for a welding condition on control panel 46, rather than entering wire feed rate. The amp-to-wire feed rate table is created during a calibration weld, and will according to the nature of welding power supply 42 and the gauge and type of welding wire 102. During the calibration weld, wire feed controller 50 monitors data request replies from welding power supply controller 52 and extracts the current output data. This current output data from welding power supply controller 52, together with input from encoder 366 and the output voltage level to servo amplifier 372 is used to build the amp-to-wire feed rate conversion table.

Wire feed direction can be both forward and reverse, but during an automated welding cycle the wire feed direction is generally limited to the forward direction. When operator control panel 48 is in manual mode, the operator can jog the welding wire in either direction to position the wire for welding or for maintenance of the DWCS. Wire jog velocity can be stored in the memory of microcontroller 358 as a separate value from wire feed rate and is based on a percentage of output from servo amplifier 372.

Welding power supply controller 52 provides welding voltage control and feedback from welding power supply 42. Outputs of welding power supply controller 52 consist of a SPST relay which controls the welding power supply contact and a digital to analog converter (not shown), which provide a 12-bit +/−12V output supporting various control voltage requirements of different welding power supplies 42. Voltage and current input from welding power supply 42 is transmitted to the operator control panel 48 and other modules on the network via welding power supply controller module 52. Welding power supply controller module 52 also includes a water flow detection input from water flow detector 388. The digital to analog converter and associated analog input circuits are optically isolated from the logic and communications section (microcontroller 374) of the circuit board for controller 52, as well as from each other. This isolation allows each section to float at a different voltage and keeps the EMI from the welding power supply inputs from interfering with operation of the welding power supply controller module 52.

During an automated welding cycle, the operator control panel 48 polls welding power supply controller module 52 for output levels of volts and amps from welding power supply 42. This information is used to monitor the weld cycle and is displayed to the operator on LCD 338 on operator control panel 46. Operator control panel 46 also receives a set of flags from welding power supply controller module 52 indicating the status of welding power supply 42 and the cooling water flow system. Welding power supply controller module 52 will shut down welding power supply 42 if detector 388 indicates that the cooling water flow has failed, and will not close the contactor to activate welding power supply 42 if there is no cooling water flow. Operator control panel 46 will not allow a welding cycle to start if there is no cooling water flow detected, and will shut down a weld cycle upon notification by welding power supply controller module 52 that cooling water flow is not detected. The operator is also informed of the problem on LCD 338.

From the standpoint of a welding operator, the welding system 10, together with its distributed welding control system 326, performs as a single integrated system. This integration is achieved through a network of independent microcontrollers on various controller modules, each controlling a single portion of welding system 10. These microcontrollers are supervised by a master system supervisor program 342 that provides setup information to each of these controller modules, and polls the modules for data, which is used to monitor and control welding system 10. The system supervisor program 342 does not need to know how each individual module performs its task, but only the information required for setup of each module and the data that can be received from each module. This arrangement provides flexibility and scalability in the structure, configuration and design of the distributed welding control system 326, as modules with different capacities can be exchanged to control different aspects of welding system 10 without requiring reprogramming of the distributed welding control system 326. System supervisor program 342 can even adapt the control and operator interface depending upon the modules found on the network bus 54. It also allows individual modules to shut down on critical fault conditions, regardless of the instructions received from supervisor program 342.

The welding control system 326 of the invention advantageously provides for recording all events and parameters which are used or occur during each weld cycle. Means for digitally recording welding data are provided in the form of serial port 421 on operator controls 336, which allows interfacing of the control system 326 to a conventional flash memory card interface or floppy disk drive (not shown) or like conventional digital recording device. Thus, all data entered onto operator controls 336 by an operator during a weld cycle, as well as all data communicated to the operator control panel 46 by the various modules 48, 50, 52 of control system 326 during a weld cycle, can be recorded on a flash memory card or floppy disk or other storage media and stored for future use. In the event that a particular weld fails in the future, all of the pertinent weld data regarding that weld are available for quick and easy review. Due to the magnetic fields generated by arc welding, data storage on flash memory cards is generally preferably to use of floppy disks.

A flux dispenser control module (not shown) may also be included with control system 326 and interfaced with bus 54. The flux dispenser control module preferably includes an internal microcontroller containing programming means for controlling the rate of flux dispensing by flux dispenser 298 in response to weld voltage and weld current. Generally, during a vertical weld, the depth of the flux puddle and stability of the weld will affect the weld current and weld voltage. When the weld puddle becomes too deep, the weld is very quiet and stable. When the weld puddle becomes too shallow, the weld becomes unstable and the weld voltage and weld amperage undergo pulsing or spiking. The weld voltage and weld current are detected by control system 326 and communicated to the flux control module, which then dispenses flux from dispenser 298 at a rate which is responsive to the detected weld voltage and weld current. The programming means associated with the flux dispenser control module includes pre-determined weld voltage and weld current limits which correspond to flux puddle depth and which are used to control increase or decrease of the flux dispensing rate from flux dispenser 298. The flux dispensing rate is physically controlled by the speed of belt 304 which is varied by the flux dispenser control module.

Referring generally to FIG. 1 through FIG. 26, the method of using the welding system 10 is described in terms of use with an I beam 56 and stiffener plate 58 as workpieces. As noted above, the use of welding system 10 with I-beam 56 and stiffener plate 58 is merely exemplary, and welding system 10 may be used with a variety of different metal substrates, workpieces or base metal items depending upon the particular application desired for welding system 10. Thus, the particular steps and order of the steps described below should not be considered limiting.

In using welding system 10, an operator will generally position I-beam 56 horizontally across supports 60a, 60b at floor level, with web 89 of I-beam 56 generally parallel to floor 44, and with the flanges 86a, 86b of I-beam 56 generally perpendicular to floor 44. Stiffener plate 58 is cut and trimmed to fit between flanges 86 so that when stiffener plate 58 is placed between flanges 86a, 86b, a suitable gap, such as ¾" to 1", remains between the ends of stiffener plate 58 and flanges 86a. Stiffener plate 58 is welded to web 89 using conventional flux-cored wire horizontal welding techniques.

Prior to the horizontal welding of stiffener plate 58 to web 89, the welding operator positions welding fixture 12 on I-beam 56 with flange 86a located within openings 84a, 84b of fixture 12, and with center line 64 and guide tube 96 located generally near the center of the gap between the edge of stiffener plate 58 and the adjacent flange 86a, as seen most clearly in FIG. 6. Welding fixture 12 is secured to flange 86a by hand-actuated locking screws 78a, 78b, so that flange 86a is securely held between braces 80a, 80b and braces 82a, 82b. Right-handed/left-handed positioning screw 68 is rotated by turning knob 76 or wheel 72 to bring welding shoes 62a, 62b together adjacent the gap between flange 86a and the end of stiffener plate 58 to define vertical welding cavity 104, with guide tube 96 and welding wire 104 located generally in the center of welding cavity 104 along center line 64. The insulated coatings 106 on welding shoes 62a, 62b face towards welding cavity 104. Cooling water or air is circulated through welding shoes 62a, 62b in a conventional manner. Drop tube 320 from flux dispenser 298 is positioned to provide flux to weld cavity 104, and flux powder is supplied to weld cavity 104 by activating motor 310 to drive flux dispenser belt 304.

Using operator control panel 46, the welding operator puts control system 326 in Program mode using program switch 408, and then enters or presets welding parameters or conditions for an automated welding cycle using the appropriate switches on operator control panel 46. As noted above, the parameters include arc voltage, arc current, wire feed rate and oscillator settings. The particular values of the parameters will vary depending upon the dimensions of stiffener plate 58 and I-beam 56 and the size and shape of weld cavity 104. Additionally, the selected parameters will generally differ for the various states of the automated weld cycle. After the welding parameters have been entered, control system 326 is switched to Automated mode using program button 408.

The operator activates the Cycle Start switch 410 to activate the Start-Up weld condition or state, which continues until a molten flux puddle has formed in the bottom of welding cavity 104. Welding wire 102 is advanced by rotary straight wire feeder assembly 18 so that the end of wire 104 contacts the base metal (web 89) and strike an arc, which begins the Initial weld state. Welding torch 14 and guide tube 96 are oscillated by oscillator 16 within weld cavity 104 according to the predetermined settings or parameters. At the end of the Initial weld state or period, the control system 326 then ramps up the weld voltage and wire feed rate and switches to Program Weld state. The weld progresses upward toward the top of flange 86 and plate 58 as weld cavity 104 is filled. As the weld approaches the top of flange 86 and plate 58 and nears completion, the operator activates Cycle Stop switch 412 on operator control panel 46. During the Program weld state, welding wire 102 and guide tube 96 are consumed to fill up weld cavity 104 to form a weld connecting flange 86a to the adjacent edge of stiffener plate 58. The Cycle Stop switch 412 ramps down the weld voltage and wire feed rate and initiates the Final weld state until a power supply contactor in welding power supply 42 is dropped to terminate the arc and wire feeding stops. The Finishing state occurs after the wire feed has stopped, and allows welding wire 102 to burn back from the weld, preventing wire 102 from becoming trapped in the cooling weld puddle.

When the weld is thus completed, control system 326 is returned to manual mode via program switch 408 on operator control panel 46. The details of the welding operation can be downloaded to an external personal computer and/or recorded on floppy disk if desired. Welding shoes 62a, 62b are drawn apart by hand actuation of positioning screw 68, and welding fixture 12 is detached from flange 86a by loosening locking screws 78a, 78b. Welding fixture 12 is then moved adjacent the opposite end of stiffener plate 58 and suitably positioned and secured on flange 86b, and the above process is repeated to weld the opposite edge of stiffener plate 58 to flange 86b.

When both edges of stiffener plate 58 have been welded to the opposing flanges 86a, 86b of I-beam 56 as describe above, welding fixture 12 may be moved to another location on I-beam 56 for welding another stiffener plate thereon, or I-beam 56 may be rotated 180° so that a stiffener plate can be welded onto the opposite side of I-beam 56. No backup bars or braces are required to hold stiffener plate 58 or welding shoes 62a, 62b in place, and the entire physical setup time for each weld generally takes less than one minute. No repositioning of I beam 56 is required for any of the welds to stiffener plate 58. Since welding fixture 12, together attached welding torch 14 and oscillator 16, as well as operator control module 46 are light weight and portable, a single person can operate the welding system 10 of the invention and install multiple stiffeners onto an I-beam in a relatively short time. In the event that welding wire 102 fuses to guide tube 96 during the weld cycle, the downward force exerted by rotary straight wire feeder 224a on wire 102 is transferred to guide tube 96, moving guide tube 96 downward into the molten weld puddle where the heat of the weld unfuses wire 102 from guide tube 96, allowing the weld cycle to continue without interruption. The insulating coating 106 on copper welding shoes 62a, 62b prevents catastrophic shorting of guide tube 96 against shoes 62a, 62b as can occur in previously used electroslag welding techniques.

The use of welding system 10 may alternatively be carried out manually, rather than with an automated welding cycle, by operation in Manual mode. As a further alternative, the distributed welding control system 326 can be omitted from welding system 10, and an operator can set welding parameters for welding operations in a standard fashion by means of controls associated individually with welding power supply 42, oscillator 16 and wire feeder straightener assembly 18. If wire straightening is not desired, welding wire 102 can be fed by conventional wire feeder 32, rather than rotary straight wire feeder assembly 18, to welding torch 14 and guide tube 96.

A variation of the above-described method of using welding system 10 for installing stiffener plates onto I-beams is illustrated generally in FIG. 27 through FIG. 30, wherein like reference numerals denote like parts. In the method shown in FIG. 27 through FIG. 30, a slot 422 is first cut in web 89 of I-beam 56, and an elongated stiffener plate 424 is prepared that is structured and configured such that, when centrally positioned in slot 422, stiffener plate 424 extends outward from web 89 on both sides of I beam 56 to define an upper plate portion 426 and a lower plate portion 428. Thus, a single plate 424 provides stiffeners for both sides of I-beam 56, and I-beam 56 requires only minimal repositioning to install stiffeners on both sides of I-beam 56.

In order to use welding system 10 with elongated stiffener plate 424 and with a slot 422 in web 89, welding system 10 preferably also comprises a welding shoe clamping assembly 430 which is used in conjunction with welding fixture 12. Welding shoe clamping assembly 430 is generally positioned on the lower side of I-beam 56 when welding operations are carried out as described further below. However, it is generally easier for a welding operator to set up a weld with welding clamp assembly 430 positioned on the top side or portion of I-beam 56, and then subsequently rotate I-beam 56 prior to welding so that welding clamp assembly 430 is located on the lower side of I-beam. Thus, for reasons of clarity, the lower portion of stiffener plate 428 is depicted as facing upward in FIG. 27 through FIG. 30, in the manner which would be observed by a welding operator using the invention.

Welding shoe clamping assembly 430 generally comprises a first pair of welding shoes 432a, 432b, and a second pairs of welding shoes 434a, 434b, with the first and second pairs of welding shoes being pivotally and adjustably linked together as described further below. Welding shoes 432a, 432b, 434a, 434b are preferably made of copper and each include conventional means for circulating cooling water (not shown) such as internal circulation ducts and cooling hose connectors. Welding shoes 432a, 432b, 434a, 434b also preferably include an insulating coating (not shown) of the type described above on one or more faces of each shoe. Welding shoes 432a, 432b, 434a, 434b are shown as structured and configured to closely fit against web 98 and flanges 86a, 86b of I-beam 56, as well as stiffener plate 424.

Means for positionally adjusting first pair of welding shoes 432a, 432b relative to second pair of welding shoes 434a, 434b are provided with clamping assembly 430, and preferably comprise a pair of positioning screw assemblies 436a, 436b, each of which includes an internally threaded sleeve 438a, 438b respectively. Internally threaded sleeves 438a, 438b each include an internal right-hand threaded section (not shown) adjacent one end, and an internal left-hand threaded section (not shown) adjacent the opposite end. Positioning screw assemblies 436a, 436b also each include a right-hand threaded screw 440a, 440b respectively, and a left-hand threaded screw 442a, 442b respectively, which are threadably engaged in the corresponding right-hand threaded and left-hand threaded portions of sleeves 438a, 438b. Right hand-threaded screws 440a, 440b are pivotally coupled to welding shoes 432a, 432b respectively by hinges 444a, 444b, and left-hand threaded screws 442a, 442b are pivotally coupled to welding shoes 434a, 434b respectively by hinges 446a, 446b. By rotating sleeves 438a, 438b, first pair of welding shoes 432a, 432b can be drawn towards or pushed away from second pair of welding shoes 434a, 434b, depending upon the rotational direction of sleeves 438a, 438b. In this manner, welding shoes 432a, 432b, 434a, and 434b can be positionally adjusted with respect to flanges 86a, 86.

Welding shoe clamping assembly 430 also includes means for positionally adjusting first pair of welding shoes 432a, 432b relative to each other. The positional adjustment means preferably comprises a positioning screw assembly 448 having an internally threaded sleeve 450 with internal right-hand and left-hand threaded portions (not shown), and a right hand threaded screw 452 and left hand threaded screw 454 which are threadably engaged in the corresponding internal right-hand and left-hand threaded portions of sleeve 450. Right-hand threaded screw 452 is pivotally coupled to a shoe support 456 by nut 458, and left-hand threaded screw 452 is pivotally coupled to a shoe support 460 by nut 462. Support 456 is coupled to welding shoe 432a by mount 464, and support 460 is coupled to welding shoe 432b by mount 468. Rotation of sleeve 450 serves to draw welding shoes 432a, 432b together or apart, depending upon the direction of rotation, and allows positional adjustment of welding shoes 432a, 432b relative to each other and to lower portion 428 of stiffener plate 424.

Means for positionally adjusting second pair of welding shoes 434a, 434b relative to each other are also provided with welding shoe clamping assembly 430, and preferably comprise a positioning screw assembly 470 having an internally threaded sleeve 472 with internal right-hand and left-hand threaded portions (not shown), and a right hand threaded screw 474 and left hand threaded screw 476 which are threadably engaged in the corresponding internal right-hand and left-hand threaded portions of sleeve 472. Right-hand threaded screw 474 is pivotally coupled to a shoe support 478 by nut 480, and left-hand threaded screw 476 is pivotally coupled to a shoe support 482 by nut 484. Support 478 is coupled to welding shoe 434a by mount 486, and support 482 is coupled to welding shoe 434b by mount 488. Rotation of sleeve 472 serves to draw welding shoes 434a, 434b together or apart, depending upon the direction of rotation, and allows positional adjustment of welding shoes 434a, 434b relative to each other and to lower portion 428 of stiffener plate 424.

Welding shoe clamping assembly 430 is utilized by first cutting a suitable slot 422 in web of I-beam 56, and cutting stiffener plate 424 such that, when stiffener plate 424 is positioned within slot 422, an upper portion 426 and lower portion 428 of stiffener plate 424 extend outward from web 89, and with a gap located between the edges of stiffener plate 424 and the adjacent flange 86a, 86b of I-beam 56. Stiffener plate 424 is then tack welded into position. At this point, I-beam 56 and stiffener plate 424 are preferably positioned so that lower portion 428 of stiffener plate is pointing or directed upward, rather than downward, to facilitate setting up welding shoe clamp assembly 430. Welding shoe clamping assembly 430 is positioned such that the first pair of welding shoes 432a, 432b are positioned adjacent flange 86a or 86b, and the second pair of welding shoes 434a, 434b are positioned adjacent the opposite flange. As shown, welding shoes 432a, 432b are located adjacent flange 86a, and welding shoes 434a, 434b are located adjacent flange 86b. Lower portion 428 of stiffener plate 424 is positioned between welding shoes 432a, 432b, and between welding shoes 434a, 434b. Sleeves 438a, 438b are rotated until welding shoes 432a, 432b closely fit against flange 86a, and welding shoes 434a, 434b closely fit against flange 86b as shown in FIG. 27 through FIG. 30. Sleeve 450 is rotated until welding shoes 432a, 432b fit closely about and "clamp" onto lower portion 428 of stiffener plate 424, and sleeve 472 is rotated until welding shoes 434a, 434b closely fit about lower portion 428 of stiffener plate 424. Welding shoe clamping assembly 430 is thus fixedly attached or coupled to lower portion 428 of stiffener plate 424. Sleeves 438a, 438b are rotated so that welding shoes 432a, 432b, 434a, 434b exert an outward pressure against flanges 86a, 86b to aid in holding assembly 430 in place.

When welding shoe clamping assembly 430 is thus positioned, a first lower vertical welding cavity 490 is defined generally between welding shoes 432a, 432b, flange 86a, and the edge of lower portion 428 of stiffener plate 424. A second lower vertical welding cavity 492 is likewise defined generally between welding shoes 434a, 434b, flange 86b, and the opposite edge of lower portion 428 of stiffener plate 424. A sump block (not shown) is tack welded to flange 86a and lower portion 428 of stiffener plate 424, such that the sump block closely fits against welding shoes 432a, 432b, flange 86a and lower portion 428 of stiffener plate 424. In this manner, the bottom of first lower weld cavity 290 is sealed off by the sump block and will prevent molten metal from escaping from lower weld cavity during welding. Another sump block (not shown) is tack welded to flange 86b and lower portion 428 of stiffener plate 424, such that the sump block closely fits against welding shoes 434a, 434b, flange 86b and lower portion 428 of stiffener plate 424, to prevent loss of weld metal from second lower weld cavity 292 during welding.

Stiffener plate 424 is welded to web 89 using conventional web-to stiffener welds which are carried out by conventional horizontal welding techniques, preferably using a welding gun with flux-cored welding wire. The conventional web-to stiffener welds typically comprise four fillet welds, four double bevel groove welds, or two single bevel groove welds. Economic considerations will generally determine which conventional web-to-stiffener weld type is used by an operator. The web-to-stiffener fillet welds can be carried out without re-positioning I-beam 56.

Following attachment of the sump blocks and making the web-to-stiffener fillet welds as described above, I-beam 56 is rotated about its longitudinal axis so that lower portion 428 of stiffener plate 424 is oriented downward, and welding shoe clamping assembly 430 is located beneath I-beam 56. Referring again to FIG. 2 through FIG. 6, as well as FIG. 4 through FIG. 30, the welding operator then positions and secures welding fixture 12 on I-beam 56 adjacent upper portion 426 of stiffener plate 424, with flange 86a located within openings 84a, 84b of fixture 12, and with center line 64 and guide tube 96 located generally near the center of the gap between the edge of upper portion 426 of stiffener plate 424 and the adjacent flange 86a. Welding shoes 62a, 62b on fixture 12 are positioned via positioning screw 68 in the manner described above to define an upper vertical welding cavity (not shown) between upper portion 426 of stiffener plate 424 and flange 86a. The upper welding cavity will generally resemble welding cavity 104 shown in FIG. 6, and the upper welding cavity is generally contiguous with lower welding cavity 490 to define an elongated welding cavity which extends along the entire edge of both upper and lower portions 426, 428 of stiffener plate 424. A guide tube is used on welding torch 14 which is of sufficient length to extend the length of the combined upper and lower welding cavities. The vertical weld is then carried out in the manner described above by entering the desired parameters for an automated weld cycle, and running the automated weld cycle, with the only difference being the vertical length or depth of the weld which is formed. When the weld is completed, welding fixture 12 is moved to flange 86b, and the procedure is repeated to form a second vertical weld extending along the length of an upper weld cavity (not shown) and second lower weld cavity 492. When both elongated vertical welds are completed, welding shoe clamping assembly 430 is loosened from stiffener plate 424 and flanges 86a, 86b by suitable rotation of sleeves 438a, 438b, 450 and 472.

Several welding shoe clamping assemblies 430 may be set up simultaneously on an I-beam which requires multiple stiffener plates. A plurality of slots are cut in the web of the I-beam at the points which require stiffener plates, and elongated stiffener plates are inserted in the slots and secured therein by tack welding. A welding shoe clamping assembly 430 is then set up on each stiffener plate in the manner described above. Once all of the welding shoe clamping assemblies are attached in place, a welding operator can move down the I-beam with welding fixture 12 performing all vertical welds without requiring repositioning the I-beam between welds. This arrangement minimizes repositioning of the heavy I-beam.

Welding shoe clamping assembly 430, together with welding fixture 12, thus allow stiffeners to be installed on both sides of I-beam 56 with only two only two vertical welds, with one vertical weld connecting flange 86a along the edge of both upper and lower portions 426, 428 of stiffener plate, and one vertical weld connecting flange 86b to the opposite edge of both upper and lower portions 426, 428 of stiffener plate 424. The need for cutting and beveling two separate stiffener plates for each side of I-beam 56, and setting up and carrying out four separate vertical welds, is eliminated by using elongated stiffener plate 424 through slot 422 in web 89 of I-beam 56, together with welding shoe clamping assembly 430 and welding fixture 12 in the manner described above.

Figure 31:
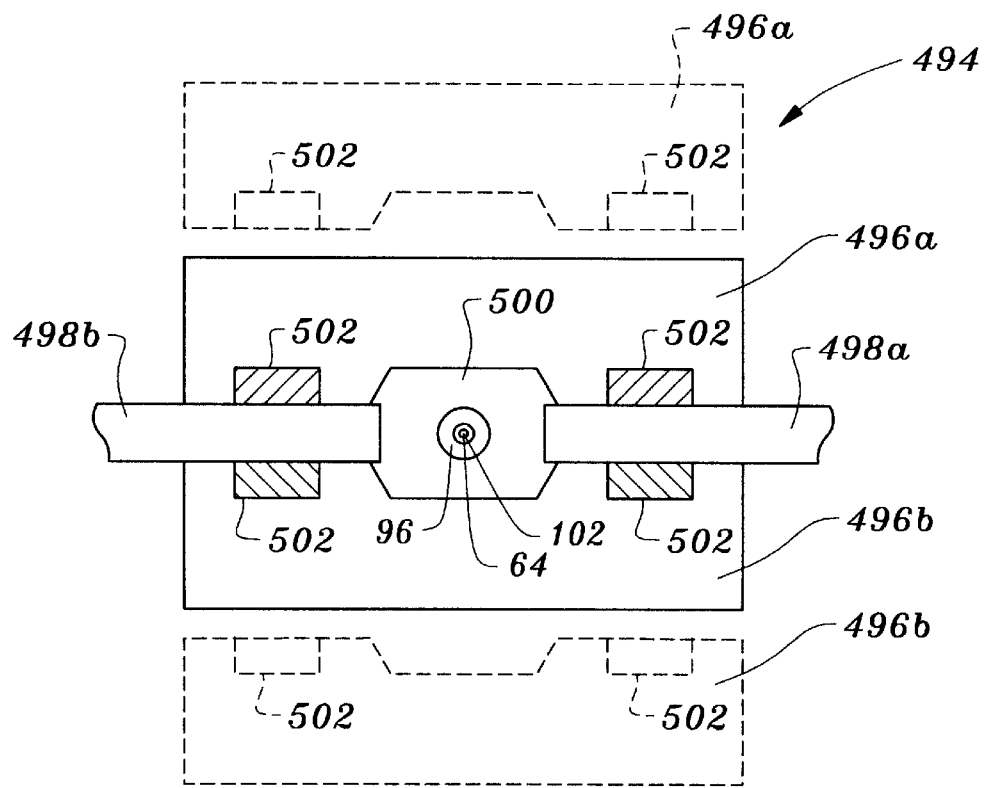
FIG. 31 is an alternative embodiment welding shoe arrangement for use with the invention in "butt"-welding operations.

Referring now to FIG. 31, and alternative embodiment welding shoe assembly 494 is shown, wherein like reference numbers denote like parts. The welding shoe assembly 494 of FIG. 1 is used with the invention for forming "butt" welds, whereas the welding shoe arrangement shown in FIG. 6 is used for "T"-welds. Welding shoe assembly 494 includes a pair of welding shoes 496a, 496b which are structured and configured for butt-welding operations between a pair of opposing plate ends 498a, 498b. Welding shoes 496a, 496b define a welding cavity 500 between plate ends 498a, 498b. Welding shoes 496a, 496b are used with welding fixture 12 and are coupled to the movable arms 66a, 66b (FIG. 4) of welding fixture 12, and welding shoes 496a, 496b undergo positional adjustment in the manner described above for welding shoes 62a, 62b. The retracted positions of welding shoes 496a, 496b are shown in phantom. Welding fixture 12 is positioned such that centerline 64, welding wire 102 and guide tube 96 are positioned within welding cavity 500 between plate ends 498a, 498b. Welding shoes 496a, 496b are preferably made of copper, and preferably include thermal and/or electrical insulating coatings or portions 502 in the manner described above.

Referring next to FIG. 32, an alternative embodiment guide tube 504 in accordance with the invention is shown in cross section. As noted above, rotary straight wire feeder assembly 18 can straighten and feed two welding wires simultaneously to a weld, and welding torch 14 can be structured and configured to receive two welding wires and direct two welding wires into a weld puddle. Guide tube 504 is a webbed guide tube and includes a web 506 located between a pair of guide tubes 508, 510 which accommodate welding wire (not shown). Webbed guide tube 504 is structured and configured to spread welding arc energy over a wider area than would occur with use of two conventional guide tubes. Webbed guide tube 504 is made from a pair of opposing elongated plates 512, 514. Plate 512 includes a pair of longitudinal channels 516a, 516b, and plate 514 likewise includes a pair of elongated channels 518a, 518b, which are formed by conventional metal bending or roll forming techniques. Plates 512, 514 are placed together and joined along the edges by welds 520, 522 such that channels 516a, 518a define tube 508, and so channels 516b, 518b define tube 510.

The method of using the invention in the above manner will be more fully understood by reference to the flow chart shown generally in FIG. 33, as well as FIG. 27 through FIG. 30. At step 600, a stiffener plate 424 is set up on an I beam 56, with stiffener plate 424 positioned generally perpendicular to web 89 and flanges 86a, 86b, and with a gap located between stiffener plate 424 and flanges 86a, 86b. Preferably, this step includes the step of cutting a slot 422 (FIG. 27) in web 89 of I-beam 56, and elongated stiffener plate 424 is structured and configured such that, when centrally positioned in slot 422, stiffener plate 424 extends outward from web 89 on both sides of I beam 56 to define an upper plate portion 426 and a lower plate portion 428.a stiffener plate is set up on an I-beam. When stiffener plate 424 is positioned within slot 422, an upper portion 426 (FIG. 28) and lower portion 428 of stiffener plate 424 extend outward from web 89, and with a gap located between the edges of stiffener plate 424 and the adjacent flange 86a, 86b of I-beam 56. Stiffener plate 424 is then tack welded into position and is subsequently welded to web 89 using conventional web-to stiffener welds which are carried out by conventional horizontal welding techniques, preferably using a welding gun with flux-cored welding wire.

As noted above, welding system 10 may be used for installing stiffeners on an I-beam both with or without a slotted web. Where a slot is not included in the web, step 600 is generally carried out by welding a stiffener plate to the web in the manner described above.

Figure 30:
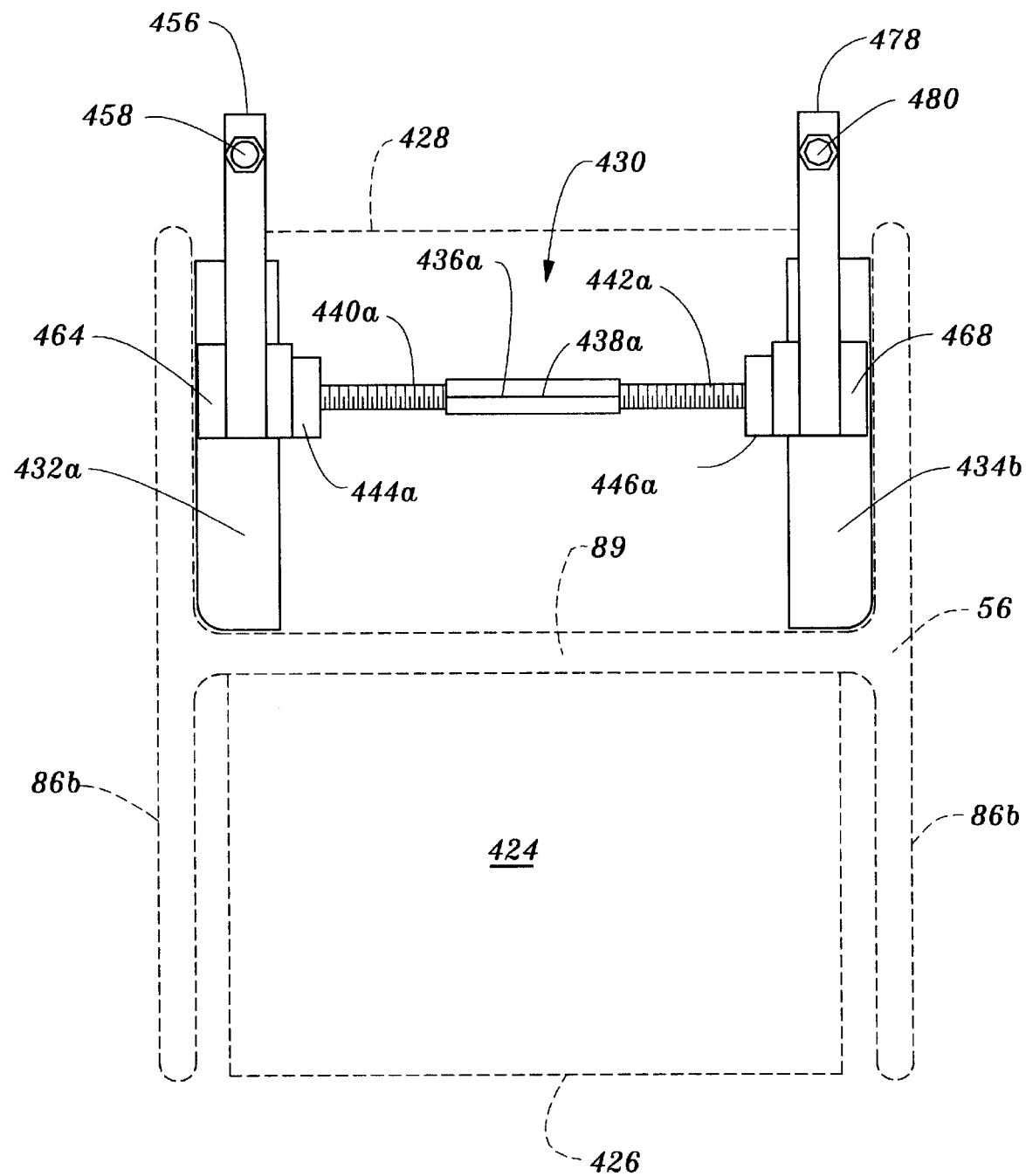
FIG. 30 is an end view of the welding shoe assembly, I-beam and stiffener plate of FIG. 28.

At step 610, the welding shoe bottom clamping assembly 430 (FIG. 28) is attached to I-beam 56. As noted above, welding shoe clamping assembly 430 is positioned such that the first pair of welding shoes 432a, 432b are positioned adjacent flange 86a or 86b, and the second pair of welding shoes 434a, 434b are positioned adjacent the opposite flange. The lower portion 428 of stiffener plate 424 is positioned between welding shoes 432a, 432b, and between welding shoes 434a, 434b. Sleeves 438a, 438b are rotated until welding shoes 432a, 432b closely fit against flange 86a, and welding shoes 434a, 434b closely fit against flange 86b as shown in FIG. 228 through FIG. 30. Sleeve 450 is rotated until welding shoes 432a, 432b fit closely about and "clamp" onto lower portion 428 of stiffener plate 424, and sleeve 472 is rotated until welding shoes 434a, 434b closely fit about lower portion 428 of stiffener plate 424. Welding shoe clamping assembly 430 is thus fixedly attached or coupled to lower portion 428 of stiffener plate 424. Sleeves 438a, 438b are rotated so that welding shoes 432a, 432b, 434a, 434b exert an outward pressure against flanges 86a, 86b to aid in holding assembly 430 in place.

When welding shoe clamping assembly 430 is thus positioned, a first lower vertical welding cavity 490 (FIG. 29) is defined generally between welding shoes 432a, 432b, flange 86a, and the edge of lower portion 428 of stiffener plate 424. A second lower vertical welding cavity 492 is likewise defined generally between welding shoes 434a, 434b, flange 86b, and the opposite edge of lower portion 428 of stiffener plate 424. A sump block (not shown) is tack welded to flange 86a and lower portion 428 of stiffener plate 424 to seal off the bottom of first lower weld cavity 290, and another sump block (not shown) is tack welded to flange 86b and lower portion 428 of stiffener plate 424 to seal off second lower weld cavity 292 during welding.

At step 620, welding fixture 12 is provided and attached to I-beam. As noted above, welding shoe clamping assembly is generally installed on the top portion of I-beam, and then I-beam 56 is subsequently rotated about its longitudinal axis so that lower portion 428 of stiffener plate 424 is oriented downward, and welding shoe clamping assembly 430 is located beneath I-beam 56. Referring also to FIG. 2 through FIG. 6, as well as FIG. 27 through FIG. 30, welding fixture 12 is secured onto I-beam 56 adjacent upper portion 426 of stiffener plate 424, with flange 86a located within openings 84a, 84b of fixture 12, and with center line 64 and guide tube 96 located generally near the center of the gap between the edge of upper portion 426 of stiffener plate 424 and the adjacent flange 86a.

At step 630, welding shoes 62a, 62b on fixture 12 are positioned via positioning screw 68 in the manner described above to define an upper vertical welding cavity (not shown) between upper portion 426 of stiffener plate 424 and flange 86a. The upper welding cavity generally resembles welding cavity 104 as shown in FIG. 6, with the upper welding cavity being generally contiguous with lower welding cavity 490 to define an elongated welding cavity which extends along the entire edge of both upper and lower portions 426, 428 of stiffener plate 424. The guide tube 96 on welding torch 14 preferably extends the length of the combined upper and lower welding cavities.

At step 640, the combined weld cavities are filled with molten metal to form a weld connecting stiffener plate 424 to flange 86a of I-beam. As described above, this step is preferably carried out by the weld operator in the manner described above by entering the desired parameters into control system 326 (FIG. 24A and FIG. 24B via operator control 336 (FIG. 25) for an automated weld cycle, and running the automated weld cycle to fill up the combined lower and upper weld cavities and create the stiffener-to flange weld. Step 640 may additionally include the step of straightening welding wire and feeding welding wire to welding torch 14, and the step of oscillating welding torch 14.

Following completion of step 640, welding fixture 12 is then moved to flange 86b, and the procedure is repeated to form a second vertical weld extending along the length of an upper weld cavity (not shown) and second lower weld cavity 492. When both elongated vertical welds are completed, welding shoe clamping assembly 430 and welding fixture 12 are removed from flange 56 and stiffener plate 424.

Accordingly, it will be seen that this invention provides a welding system and method which allows quick and easy fabrication of high quality vertical welds under varying conditions without requiring extensive set up time or use of heavy equipment, and which is particularly effective at installing stiffener plates onto structural beams or columnns. Although the above description contains many specificities, these should not be considered as limiting the scope of the invention but as merely providing illustrations of some of the presently preferred embodiments of the invention. Thus, the scope of this invention should be determined by the appended claims and their legal equivalents.

What is claimed is:

1. A welding system in which a first workpiece and a second workpiece are brought together so that a gap exists between the workpieces, comprising:

(a) a stationary welding fixture, said welding fixture positioned to releasibly couple with at least one workpiece, said welding fixture including a pair of opposing welding shoes which are placed on each side of said gap to form a welding cavity between said workpieces and said welding shoes, said welding fixture configured to symmetrically position said welding shoes about said welding cavity; and (b) a welding torch configured to receive a guide tube which is placed into said welding cavity, said welding torch coupled to said welding fixture.

2. A welding system as recited in claim 1, further comprising an extensible, pivoting articulating boom, said welding fixture associated with an end of said articulating boom.

3. A welding system as recited in claim 1, further comprising means for straightening welding wire and feeding welding wire to said welding torch.

4. A welding system as recited in claim 1, further comprising means for oscillating said welding torch within said welding cavity.

5. A welding system as recited in claim 1, further comprising a winged guide tube, said winged guide tube releasibly coupled to said welding torch, said winged guide tube including first and second elongated plates, said first and second elongated plates each including a longitudinal channel, said first and second plates joined together with said channels positioned opposite to and adjacent to each other, said channels defining a central tube.

6. A welding system as recited in claim 1, further comprising a welding wire, said welding wire comprising between approximately 0.0001% and approximately 0.05% of boron.

7. A welding system as recited in claim 1, further comprising flux dispensing means for providing flux to a welding site adjacent said welding torch.

8. A welding system as recited in claim 1, further comprising a distributed control system, said distributed control system comprising a plurality of controller modules, said distributed control system comprising a common bus connecting each of said plurality of control modules, said plurality of control modules including an operator control panel module.

9. A welding system as recited in claim 1, wherein said welding shoes further comprise a thermally and electrically insulating coating on each said welding shoe.

10. A welding assembly as recited in claim 1, further comprising a welding shoe clamping assembly, said welding shoe clamping assembly comprising:
    (a) first and second pairs of welding shoes;
    (b) means for positionally adjusting said first pair of welding shoes relative to each other;
    (c) means for positionally adjusting said second pair of welding shoes relative to each other; and
    (d) means for positionally adjusting said first pair of welding shoes relative to said second pair of welding shoes.

11. A welding system in which a first workpiece and a second workpiece are brought together so that a gap exists between the workpieces, comprising:
    (a) a stationary welding fixture, said welding fixture including means for releasibly coupling to at least one workpiece, said welding fixture including a pair of opposing welding shoes which are placed on each side of said gap to form a welding cavity between said workpieces and said welding shoes, said welding fixture including means for symmetrically positioning said welding shoes adjacent said welding cavity;
    (b) a welding torch, said welding torch coupled to said welding fixture adjacent said center line; and
    (c) means for oscillating said welding torch within said cavity.

12. A welding system as recited in claim 11, further comprising means for straightening welding wire and feeding welding wire to said welding torch.

13. A welding system as recited in claim 12, wherein said wire straightening and feeding means comprises:
    (a) an input bearing set, said input bearing set including a plurality of canted bearings;
    (b) an output bearing set, said output bearing set including a plurality of canted bearings; and
    (c) an adjustable offset radial bearing, said adjustable offset radial bearing positioned between said input and output bearing sets.

14. A welding system as recited in claim 11, further comprising an articulating boom, said welding fixture associated with an end of said articulating boom.

15. A welding system as recited in claim 11, further comprising a winged guide tube, said winged guide tube coupled to said welding torch adjacent said center line, said winged guide tube including first and second elongated plates, said first and second elongated plates each including a longitudinal channel, said first and second plates joined together with said channels positioned opposing and adjacent to each other, said channels defining a central tube between said first and second plates.

16. A welding system as recited in claim 11, wherein said welding torch comprises means for preventing a welding wire from fusing to a guide tube during welding operations.

17. A welding system as recited in claim 16, wherein said welding torch comprises:
    (a) an outer tube;
    (b) a central tube, said central tube slidably mounted within said outer tube;
    (c) means for applying bias to said central tube;
    (d) an input adapter;
    (e) chuck means for releasibly holding a guide tube; and
    (f) a flexible conductor, said conductor connected to said input adapter and said central tube.

18. A welding system as recited in claim 11, wherein said oscillating means comprises:
    (a) first and second elongated, parallel rotating shafts
    (b) first and second linear actuators, said first and second linear actuators movably mounted on said first and second rotating shafts;
    (c) means for longitudinally translating said first and second linear actuators along said first and second shafts as said first and second shafts rotate;
    (d) means for sensing movement of said linear actuators; and
    (e) a protective housing, said protective housing enclosing said first and second rotating shafts, said first and second linear actuators, said longitudinally translating means, and said sensing means.

19. A welding system as recited in claim 11, further comprising a welding wire, said welding wire comprising between approximately 0.0001% and approximately 0.05% of boron, and between approximately 0.01% and approximately 0.10% of nickel.

20. A welding system as recited in claim 11, further comprising a flux dispenser, said flux dispenser comprising:
    (a) a hopper;
    (b) a rotating belt, said rotating belt positioned below said hopper;
    (c) a belt block, said belt block including a recessed area, said drive belt located in said recessed area; and
    (d) at least one drop tube, said drop tube associated with a lower portion of said recessed area.

21. A welding assembly as recited in claim 11, further comprising a welding shoe bottom clamping assembly, said welding shoe clamping assembly comprising:
    (a) first and second pairs of welding shoes;
    (b) means for positionally adjusting said first pair of welding shoes relative to each other;

(c) means for positionally adjusting said second pair of welding shoes relative to each other; and (d) means for positionally adjusting said first pair of welding shoes relative to said second pair of welding shoes.

22. A welding system as recited in claim 11, further comprising a distributed control system, said distributed control system comprising:

(a) a plurality of controller modules, at least one of said control modules comprising an operator controller module; and (b) a bus, said bus connecting said plurality of control modules.

23. A welding system as recited in claim 22, wherein said distributed control system further comprises programming means for carrying out the operations of:

(a) reading control parameter input from a user, said control parameters comprising welding arc voltage, welding arc current, oscillator motion, and welding wire feed rate;

(a) controlling welding arc voltage during an automated weld cycle;

(b) controlling welding arc current during said automated weld cycle;

(c) controlling oscillator motion of said welding torch during said automated weld cycle;

(d) controlling flux dispensing in response to said welding arc voltage and said welding arc current during said automated welding cycle; and (d) controlling welding wire feed rate during said automated weld cycle.

24. A welding system as recited in claim 22, wherein said distributed control system comprises an oscillator controller module, a wire feed controller module, and a welding power supply controller module.

25. A welding system as recited in claim 11, wherein said welding shoes further comprise a thermally and electrically insulating coating on at least one face of each said welding shoe.

26. A method for welding metal substrates, comprising the steps of:

(a) providing a welding fixture, said welding fixture being stationary and including means for releasibly coupling to at least one substrate, said welding fixture including a pair of opposing welding shoes, said welding fixture including means for symmetrically positioning said welding shoes about a center line, said welding fixture including a welding torch and a guide tube, said guide tube adjacent said center line;

(b) positioning first and second substrates adjacent to each other with a gap between said first and second substrates;

(c) attaching said welding fixture to at least one of said substrates, said welding fixture positioned with said center line located adjacent said gap between said substrates;

(d) positionally adjusting said opposing welding shoes of said welding fixture relative said center line to define a welding cavity between said welding shoes and said substrates, said guide tube and said center line positioned within said welding cavity; and (e) filling said weld cavity with molten metal to form a weld connecting said substrates.

27. A method for welding metal substrates as recited in claim 26, further comprising the step of feeding a welding wire through said welding torch and guide tube.

28. A method for welding metal substrates as recited in claim 27, further comprising the step of oscillating said guide tube and said welding wire within said weld cavity.

29. A method for welding metal substrates as recited in claim 26, wherein said first substrate comprises is an I-beam, and said second substrate is a stiffener plate, said I-beam including a pair of flanges, said I-beam including a web connecting said flanges, said stiffener plate positioned generally perpendicular to said web and said flanges, one said gap located between each said flange and said stiffener plate.

30. A method of welding metal substrates as recited in claim 29, further comprising the step of cutting a slot in said web and positioning said stiffener plate within said slot.

31. A method of welding metal substrates as recited in claim 30, further comprising the step of attaching a welding shoe clamping assembly to said stiffener plate and said I beam, said welding shoe clamping assembly comprising:

(a) first and second pairs of welding shoes;

(b) means for positionally adjusting said first pair of welding shoes relative to each other;

(c) means for positionally adjusting said second pair of welding shoes relative to each other; and (d) means for positionally adjusting said first pair of welding shoes relative to said second pair of welding shoes.

\* \* \* \* \*

UNITED STATES PATENT AND TRADEMARK OFFICE
CERTIFICATE OF CORRECTION

PATENT NO. : 6,297,472 B1
DATED : October 2, 2001
INVENTOR(S) : William L. Bong et al.

It is certified that error appears in the above-identified patent and that said Letters Patent is hereby corrected as shown below:

<u>Title page,</u>
Item [73], Assignee, should read -- Arcmatic Integrated Systems, Inc. --.

Signed and Sealed this

Fifteenth Day of February, 2005

JON W. DUDAS
*Director of the United States Patent and Trademark Office*